US012766400B2

(12) United States Patent
Church et al.

(10) Patent No.: US 12,766,400 B2
(45) Date of Patent: Oct. 20, 2026

(54) MILITARY ACQUISITION GAME

(71) Applicant: United States of America as Represented by The Secretary of the Army, Vicksburg, MS (US)

(72) Inventors: Joshua Q. Church, Vicksburg, MS (US); Megan E. Gill, Vicksburg, MS (US); James E. Richards, Vicksburg, MS (US); Richard C. Salter, Vicksburg, MS (US); Maria A. Seale, Clinton, MS (US); Alicia I. Ruvinsky, Madison, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 560 days.

(21) Appl. No.: 17/956,745

(22) Filed: Sep. 29, 2022

(65) Prior Publication Data

US 2024/0108969 A1 Apr. 4, 2024

(51) Int. Cl.
*A63F 13/822* (2014.01)
*A63F 1/04* (2006.01)
*A63F 3/00* (2006.01)

(52) U.S. Cl.
CPC ............ *A63F 3/00072* (2013.01); *A63F 1/04* (2013.01); *A63F 13/822* (2014.09); *A63F 2001/0483* (2013.01); *A63F 2003/00066* (2013.01); *A63F 2003/00996* (2013.01)

(58) Field of Classification Search
CPC .......... A63F 13/822; A63F 2003/00066; A63F 2003/00996
See application file for complete search history.

(56) References Cited

U.S. PATENT DOCUMENTS 6,237,915 B1 * 5/2001 Ledet .................. A63F 3/00063 273/287
6,371,848 B1 * 4/2002 Ashby ................. A63F 3/00072 463/1
2005/0004789 A1 * 1/2005 Summers ............... G06Q 99/00 434/350
2005/0067782 A1 * 3/2005 D'Cruz ............... A63F 3/00006 273/243
2006/0202417 A1 * 9/2006 Delacruz-Newlan ..... A63F 3/02 273/242
2006/0244217 A1 * 11/2006 Yu ............................ A63F 3/02 273/292

(Continued)

*Primary Examiner* — David L Lewis
*Assistant Examiner* — Shauna-Kay Hall
(74) *Attorney, Agent, or Firm* — Brian C. Jones; Lawrence A. Schemmel

(57) ABSTRACT

The invention relates to a game simulating research and development of a product. The game may comprise a central board, function cards, form cards, a player board and HR Meeple. The central board may comprise an endless outside track. The game may comprise three phases. A concept phase may involve: creating a product requirements document; recoding the product requirements document; collecting starting resources; building an initial team; and assigning initial tasking. A development phase may comprise: following turn and round rules; completing player actions; and assigning HR units to a facility. A prototyping phase wherein a final product is made.

23 Claims, 52 Drawing Sheets

(56) References Cited

U.S. PATENT DOCUMENTS

| | | | | |
|---|---|---|---|---|
| 2007/0117601 | A1* | 5/2007 | Van Luchene | G06Q 30/04<br>463/1 |
| 2007/0296147 | A1* | 12/2007 | Jensen | A63F 3/0478<br>273/236 |
| 2015/0297984 | A1* | 10/2015 | Ogilvie | A63F 11/00<br>273/148 R |
| 2019/0091557 | A1* | 3/2019 | Joshi | A63F 1/04 |
| 2020/0282307 | A1* | 9/2020 | Hovey | G06F 3/0488 |
| 2020/0283207 | A1* | 9/2020 | Foreman | B60P 7/0807 |
| 2022/0347552 | A1* | 11/2022 | Svengalis | A63F 1/04 |
| 2022/0370888 | A1* | 11/2022 | Miller | A63F 3/00006 |
| 2023/0338821 | A1* | 10/2023 | Miller | A63F 3/00063 |

* cited by examiner

1110
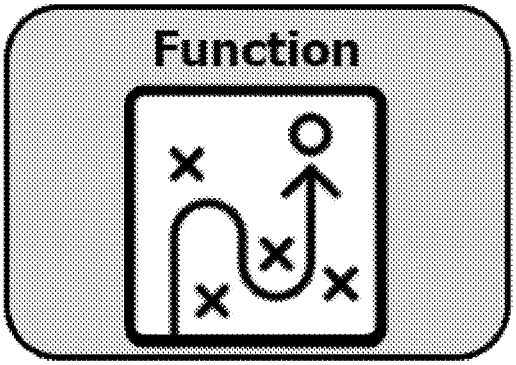
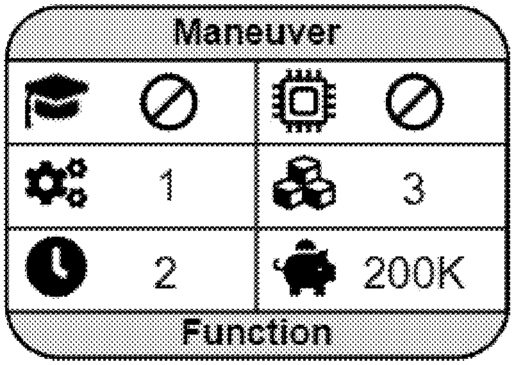
1120
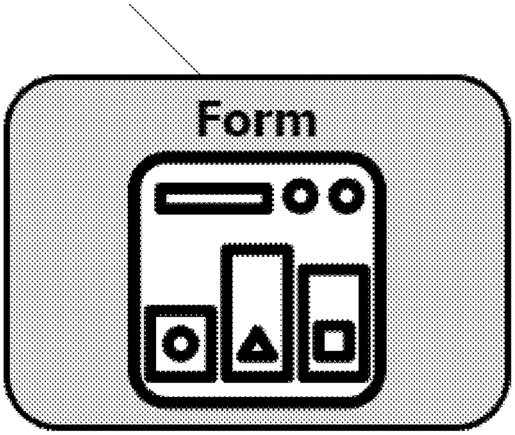
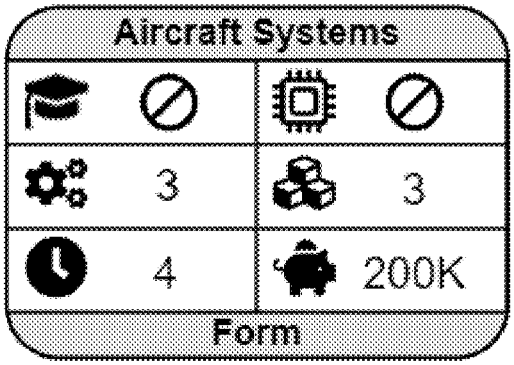
Fig. 11

1400

1800

1800

Central Component Setup 2100

Player Specific Setup 2200

Concept Phase 2400

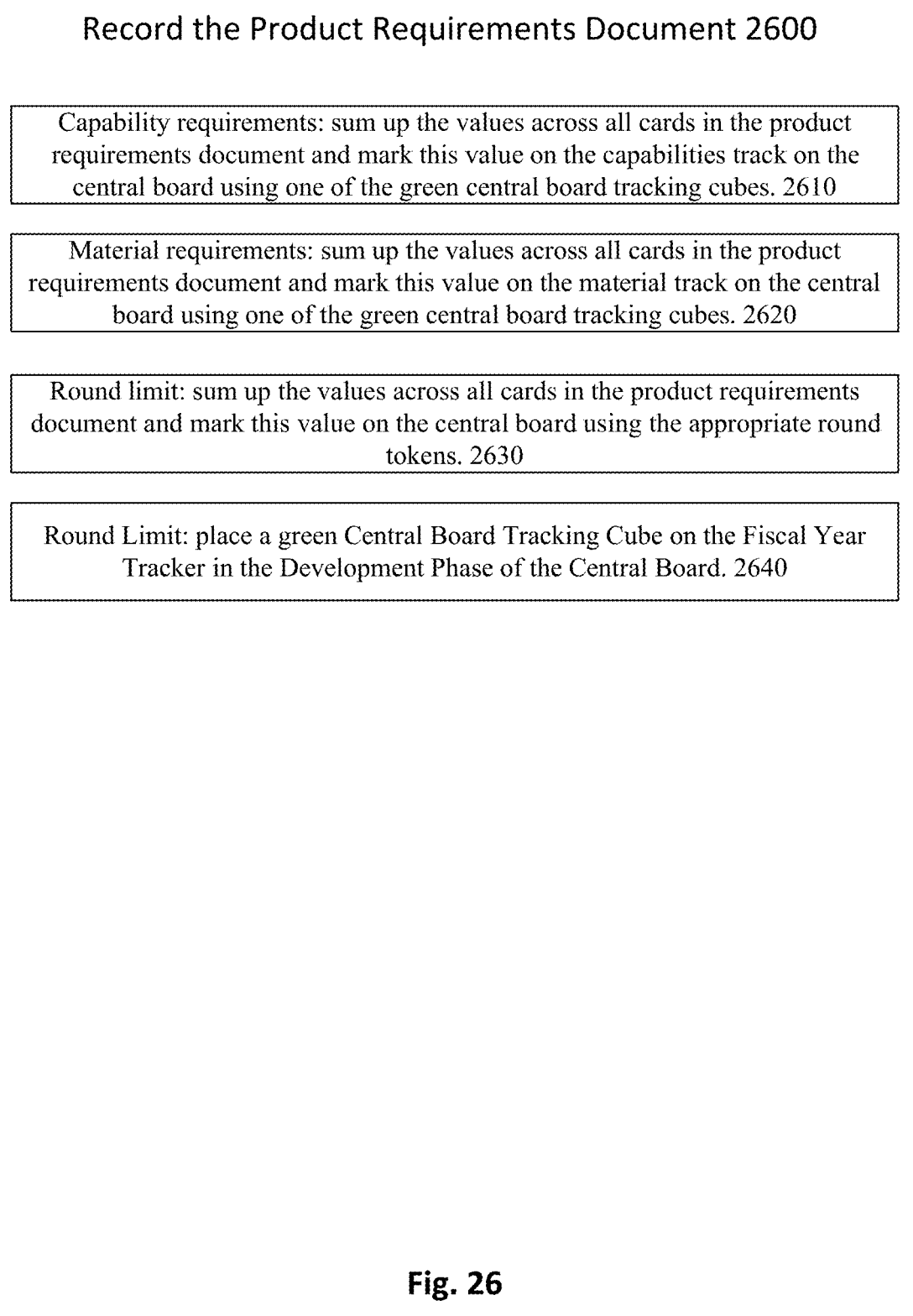

Record the Product Requirements Document 2600

Capability requirements: sum up the values across all cards in the product requirements document and mark this value on the capabilities track on the central board using one of the green central board tracking cubes. 2610

Material requirements: sum up the values across all cards in the product requirements document and mark this value on the material track on the central board using one of the green central board tracking cubes. 2620

Round limit: sum up the values across all cards in the product requirements document and mark this value on the central board using the appropriate round tokens. 2630

Round Limit: place a green Central Board Tracking Cube on the Fiscal Year Tracker in the Development Phase of the Central Board. 2640

Fig. 26

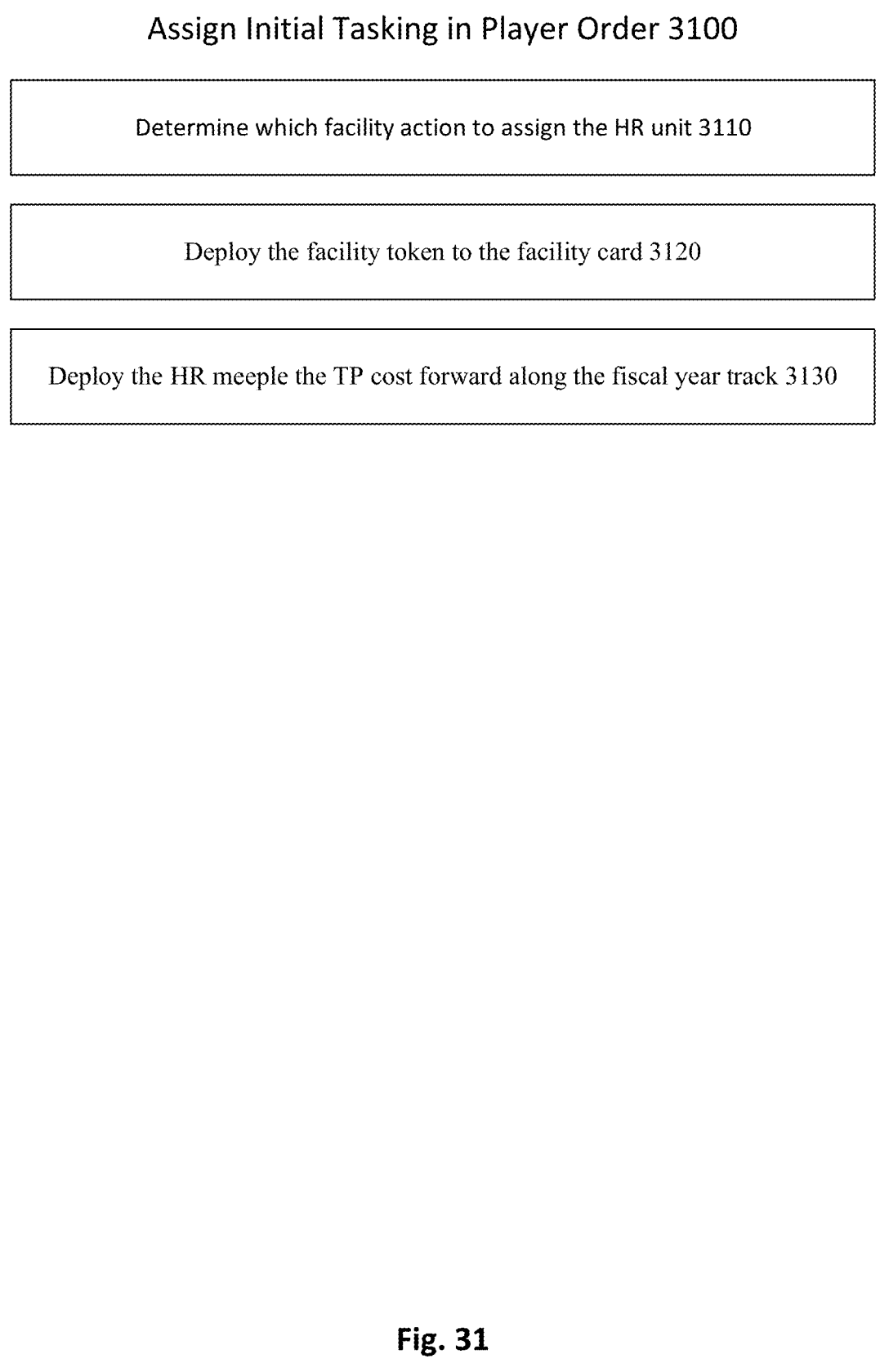

Assign Initial Tasking in Player Order 3100

Determine which facility action to assign the HR unit 3110

Deploy the facility token to the facility card 3120

Deploy the HR meeple the TP cost forward along the fiscal year track 3130

Fig. 31

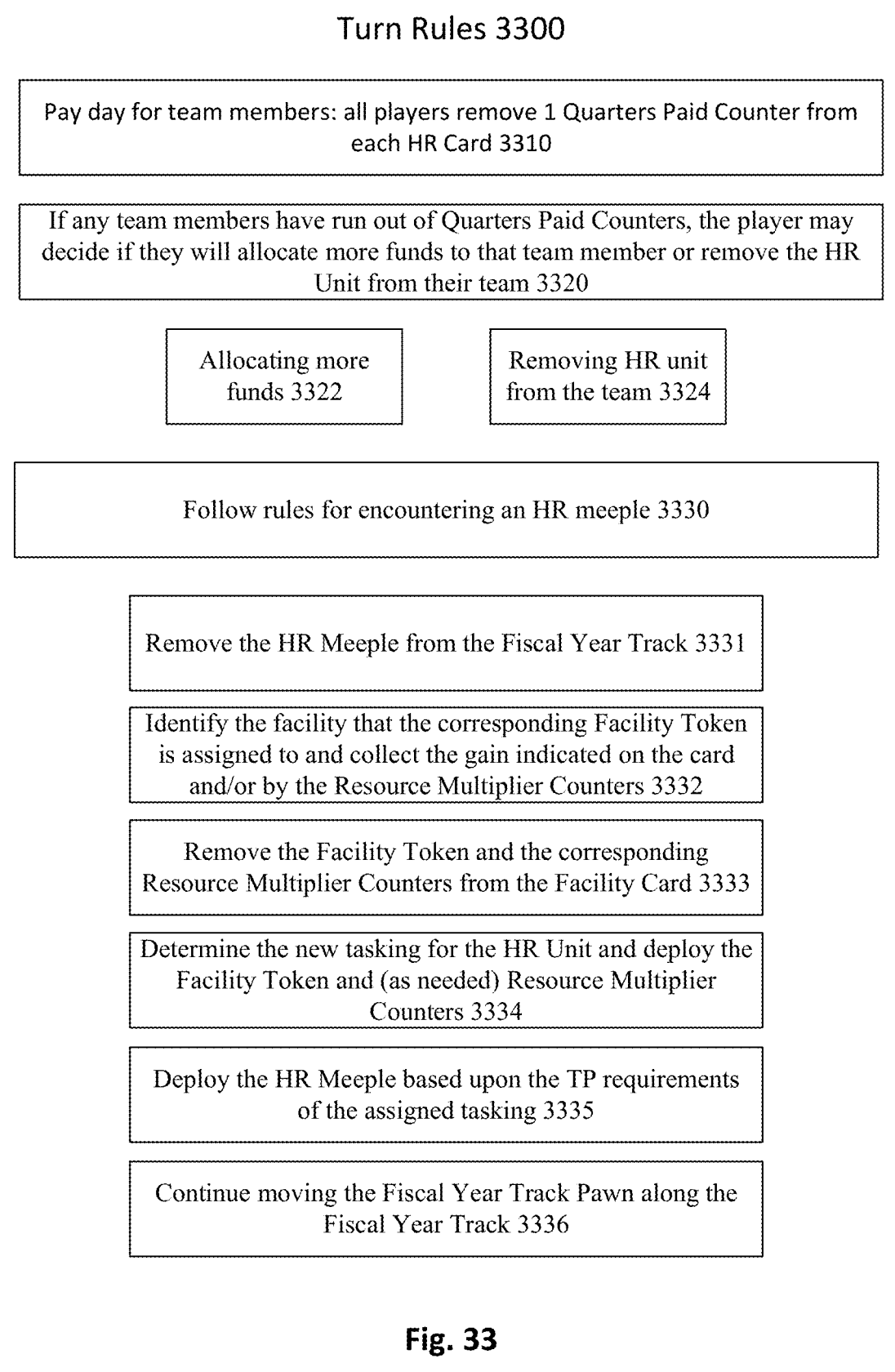

Turn Rules 3300

Pay day for team members: all players remove 1 Quarters Paid Counter from each HR Card 3310

If any team members have run out of Quarters Paid Counters, the player may decide if they will allocate more funds to that team member or remove the HR Unit from their team 3320

Allocating more funds 3322

Removing HR unit from the team 3324

Follow rules for encountering an HR meeple 3330

Remove the HR Meeple from the Fiscal Year Track 3331

Identify the facility that the corresponding Facility Token is assigned to and collect the gain indicated on the card and/or by the Resource Multiplier Counters 3332

Remove the Facility Token and the corresponding Resource Multiplier Counters from the Facility Card 3333

Determine the new tasking for the HR Unit and deploy the Facility Token and (as needed) Resource Multiplier Counters 3334

Deploy the HR Meeple based upon the TP requirements of the assigned tasking 3335

Continue moving the Fiscal Year Track Pawn along the Fiscal Year Track 3336

Fig. 33

Round Rules 3400

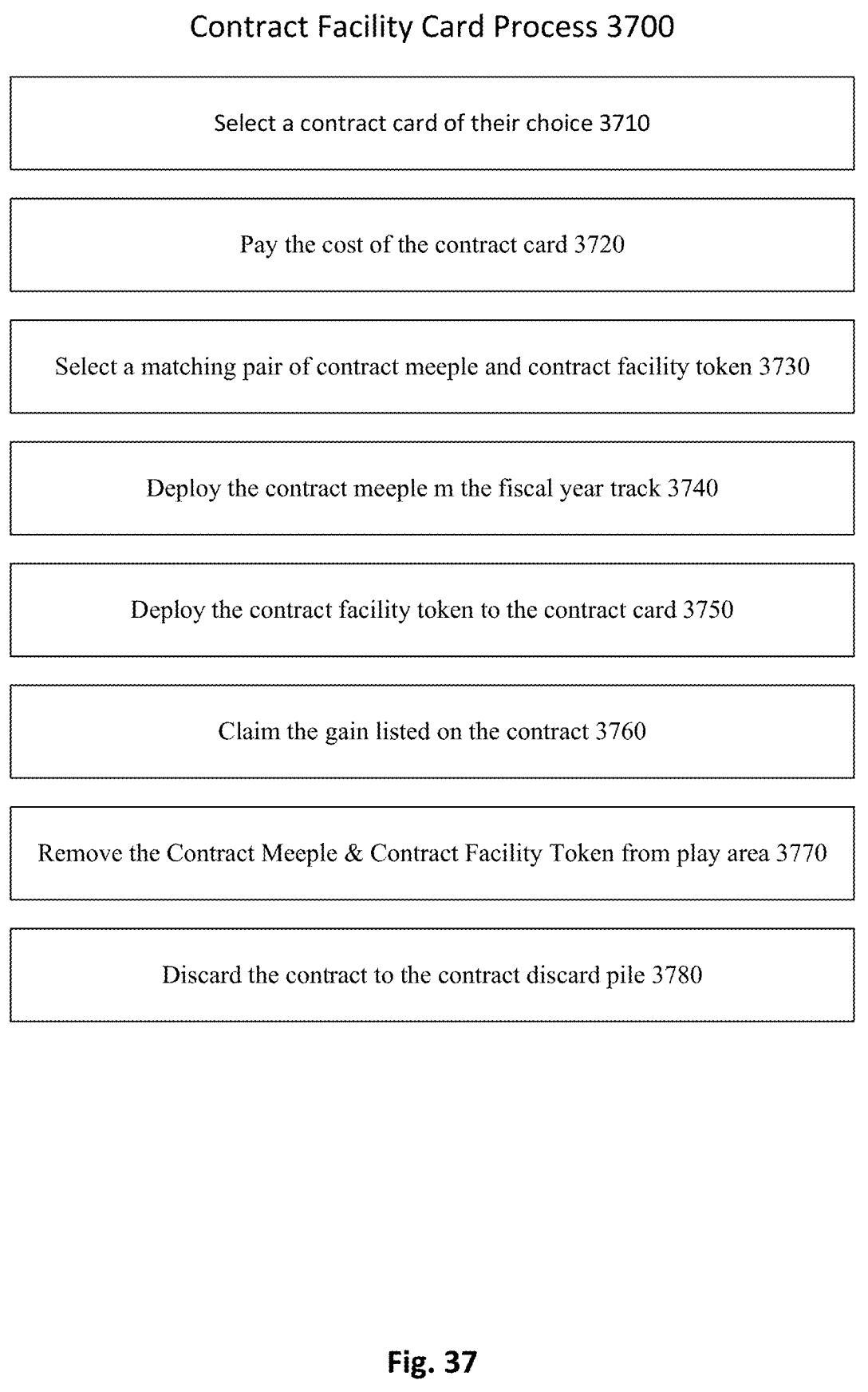

Contract Facility Card Process 3700

Select a contract card of their choice 3710

Pay the cost of the contract card 3720

Select a matching pair of contract meeple and contract facility token 3730

Deploy the contract meeple m the fiscal year track 3740

Deploy the contract facility token to the contract card 3750

Claim the gain listed on the contract 3760

Remove the Contract Meeple & Contract Facility Token from play area 3770

Discard the contract to the contract discard pile 3780

Fig. 37

Earmark Funds 3800

Fire HR Unit 3900

The player may declare the team member is leaving the team, remove the HR Meeple from the fiscal year track without gaining any resources, remove the facility token from assigned facility, and return the corresponding HR card to their HR card stack 3324

Fig. 39

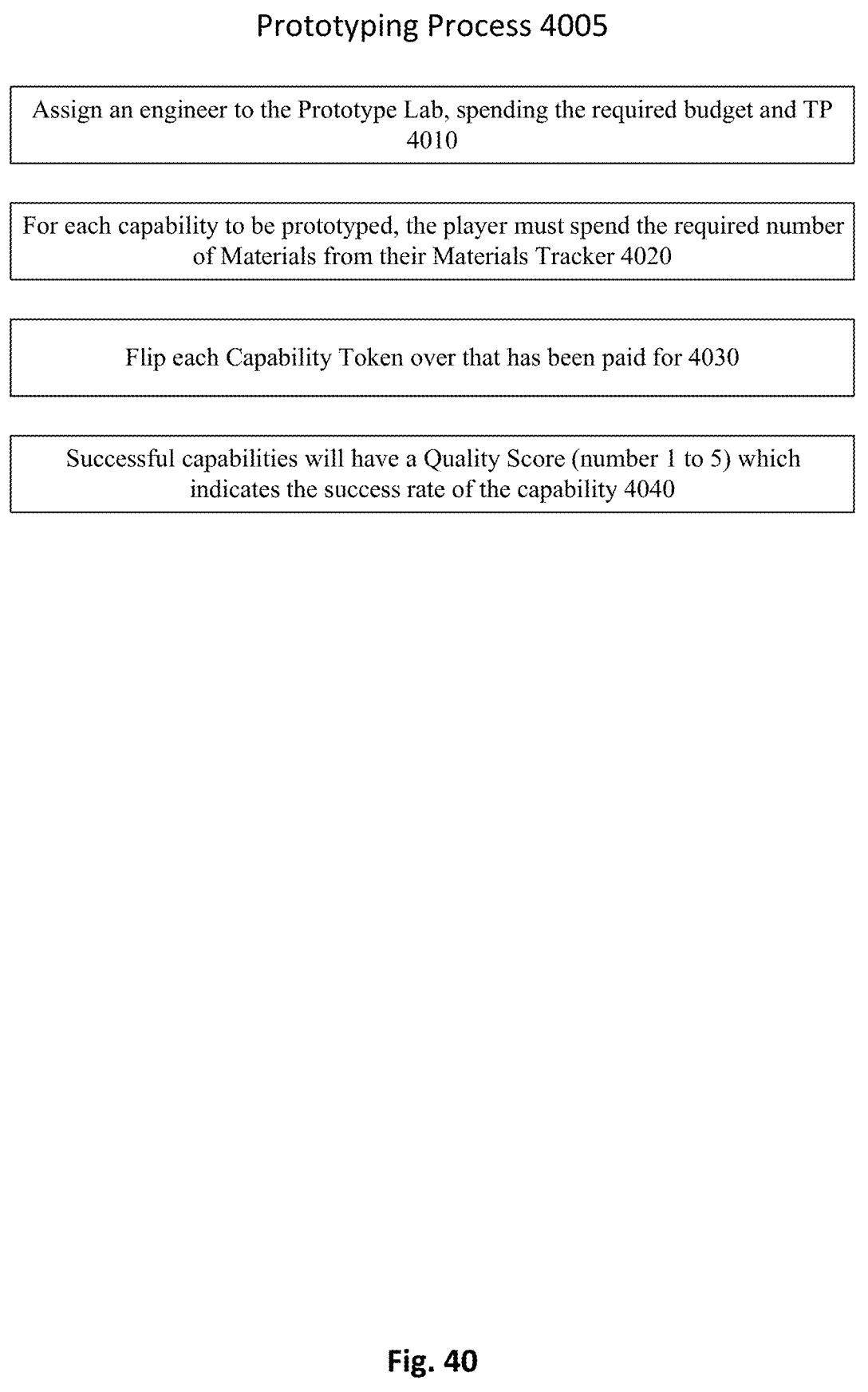

Prototyping Process 4005

Assign an engineer to the Prototype Lab, spending the required budget and TP 4010

For each capability to be prototyped, the player must spend the required number of Materials from their Materials Tracker 4020

Flip each Capability Token over that has been paid for 4030

Successful capabilities will have a Quality Score (number 1 to 5) which indicates the success rate of the capability 4040

Fig. 40

Scoring Rules 4100

Players will score their quality score directly to their Scoring System Track on their Player Board 4110

Scoring Rules 4200

Game ends if all players have finished production 4210

Games ends if the round limit reached 4220

If any players have failed to finish production, they may score any capabilities (up to the capabilities requirement) that have already been prototyped 4230

Fig. 41

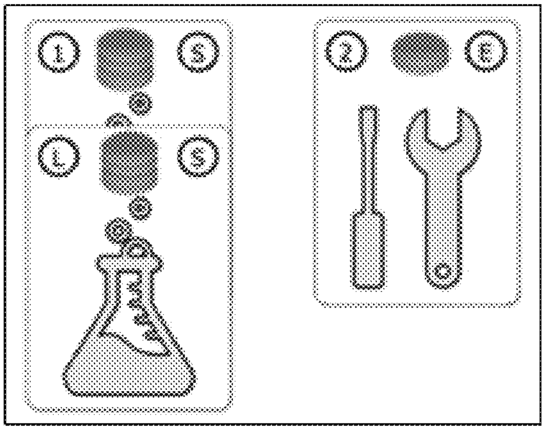
| | | |
|---|---|---|
| | Lead (4Q) | 120K |
| | Scientist (4Q) | 80K |
| + | Engineer (2Q) | 100K |
| | Total Cost: | 300K |
HR Salaries
Cost for Quarters by Position
| | 1Q | 2Qs | 3Qs | 4Qs |
|---|---|---|---|---|
|  | 30K | 60K | 90K | 120K |
|  | 25K | 50K | 75K | 100K |
|  | 20K | 40K | 60K | 80K |
Fig. 43

MILITARY ACQUISITION GAME

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

FIELD OF INVENTION

This invention relates to military/resource management board game and electronic board games.

BACKGROUND OF THE INVENTION

Dr Zachary Fitz Walter, "What is Gamification? Education, Business & Marketing (2021 Examples)." 2021. [1]

Y. Chou, "Octalysis: Complete Gamification Framework—Yu-kai Chou." 2013. [2]

Y. Chou, Actionable gamification: Beyond points, badges, and leaderboards. 2016. [3]

M. Saul, "Operant Conditioning (B. F. Skinner)|Simply Psychology," *simplypsychology,* 2018. [Online]. Available: https://www.simplypsychology.org/operant-conditioning.html. [Accessed: 5 May 2021]. [4]

M. Markowitz, "On Game Design," 1991. [Online]. Available: https://grognard.com/zines/so/so61.txt. [Accessed: 15 Jan. 2021]. [5]

BRIEF SUMMARY OF THE INVENTION

The invention relates to a game simulating research and development of a product. The game may comprise central components including: a central board, function cards, and form cards. The central components may further comprise: requirement modifier cards, a contract meeple, and contract facility tokens, capability tokens, round tokens, a fiscal year track pawn, central board tracking cube, resource multiplier counters, quarters paid counters, technology element cubes, research unit cubes, material cubes, and currency. The board game may include player components such a player board, HR cards, base facility cards, HR meeple, facility tokens, and score track cube. The central components are shared amongst all players and player specific components are colored to correspond to a specific player.

The central board may comprise an outer track having track markers. The outer track may have a bottom left corner of the outer track labelled Q1. The outer may comprise eight rectangles on each outer track edge of the central board; each rectangle corresponding to a location a HR meeple can move to.

The game may comprise a stack of 10 different form cards; the stack comprising a form card representing each of the following: aircraft systems, generic systems, missile systems, seas systems, space systems, ground vehicle systems, autonomous systems, information technology systems, unmanned systems, and cyber systems.

The game may comprise a concept phase region for receiving a form card, function card, and requirements modifier card. The form card, function card, and requirements modifier card may compose a product requirement document. The form card may comprise 6 symbols, each symbol having a value.

The symbols may be research unit, technology element, capability, material, round, and budget. The research unit may represent results of basic research and literature reviews that are required to begin developmental research for the product. The technology element may represent a result of developmental research, initial consideration of potential application and relations of knowledge gained. The capability may represent results of applied research; applied researching being where technology elements are applied to specific problems to craft specific solutions. The material may represents physical materials required in order to prototype capabilities into a final product design for the product. The research unit may represent results of basic research and literature reviews that are required to begin developmental research for the product. The rounds may represent a fiscal year; each fiscal year allocating a budget of money that a player can spend on that project.

The game may comprise a plurality of capability tokens. The capability tokens may represent a value of the product; each capability token comprising a value. A winner of the board game may be the player who has completed the product with capabilities represented by the capability tokens with a highest total value.

The game may be implemented as a digital video game playable on a gaming console or computer having a digital central board and player pieces. The game may be non-transitory computer readable code stored on tangible computer readable media configured to be executed by a microprocessor of gaming console or computer. The gaming console or computer may be configured to generate a digital version of the game.

BRIEF DESCRIPTION OF THE DRAWINGS

FIG. 11 illustrates function and form cards.

FIG. 26 illustrates a process to record the product requirements document.

FIG. 31 illustrates a process of assigning initial tasking in player order.

FIG. 33 illustrates the turn rules.

FIG. 37 illustrates a contract facility card process.

FIG. 39 illustrates a process of firing an HR unit.

FIG. 40 illustrates a prototyping process.

FIG. 41 illustrates an endgame resolution and scoring process.

FIG. 43 illustrates a payment schematic for lead, scientists, and engineers.

DETAILED DESCRIPTION

Figure 1:
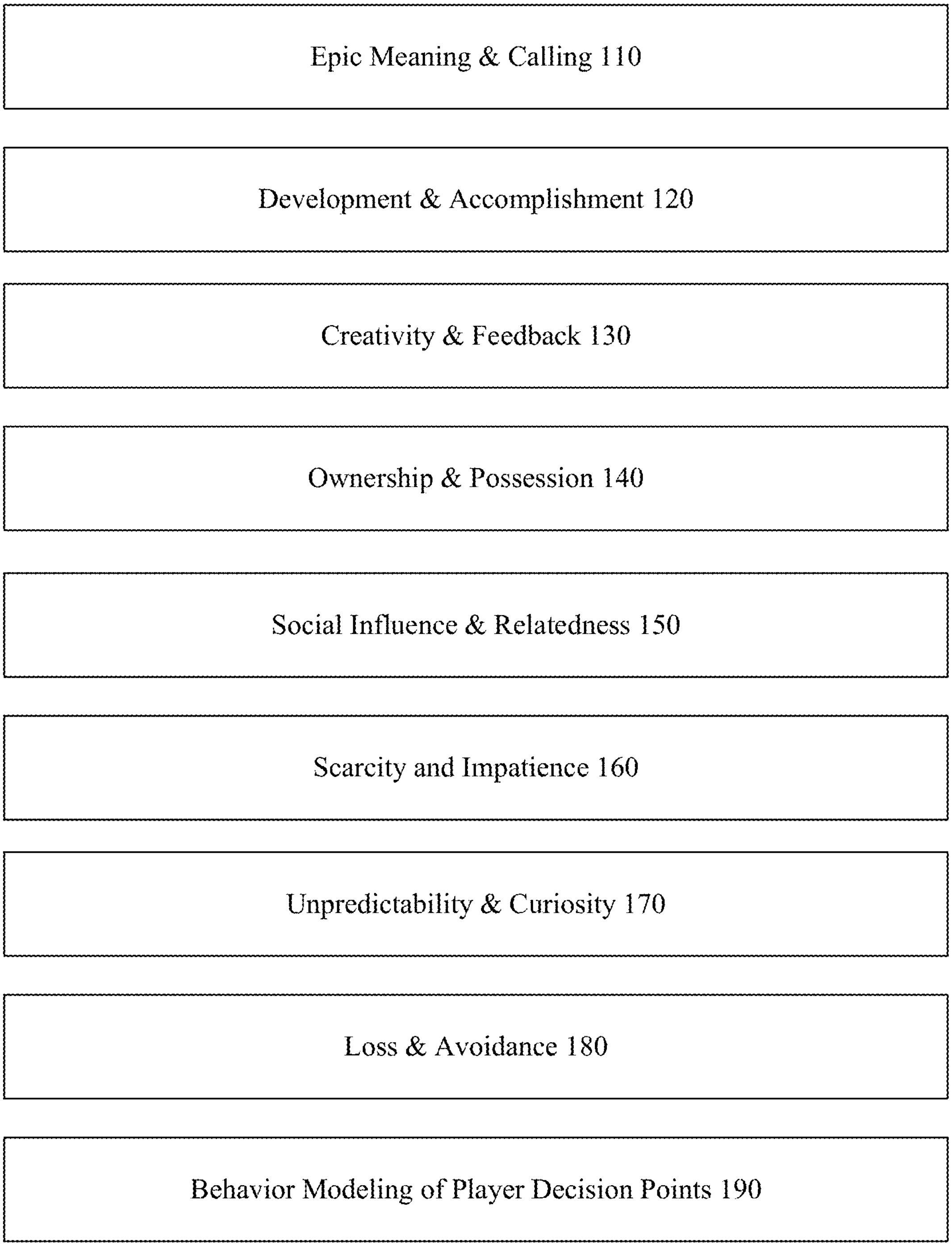
FIG. 1 illustrates a process for gamification.

Military acquisition is a multi-faceted, complex process with the purpose of managing national investments towards a national security strategy. The military acquisition process can be characterized by (1) processes and protocols, (2) asset(s) being acquired (i.e., product), and (3) national security characterization or context. Understanding how process, product, and context influence human decisions thereby impacting acquisitions will lead to an evaluation of vulnerabilities in acquisitions. Understanding vulnerabilities will inform mitigations leading to resilient and successful military acquisitions regarding cost, schedule, and performance.

A framework is defined for studying the interaction and effects of process, problem, and context on military acquisitions. For example, a gameplay simulation may consist of virtualizations of Russia and China acquisition processes applied to ground vehicles under a context of economic instability. This framework provides a construct for modeling acquisitions as a game with the goal of evaluating impact of process, product, and context on military acquisitions. The approach is generalizable to complex systems in which humans make decisions, i.e., HICS.

Complex Systems in which humans play a role, namely Human-Integrated Complex Systems (HICS), can be difficult to model or simulate due to the uncertainty introduced by the human component. Traditional modeling approaches such as physics-based modeling do not provide predictive insight towards situation awareness and management. War game designers, and game architects are familiar with HICS problem spaces, and use gamification (i.e., the translation of a real-world problem into a playable game) of such complex contexts as a means of modeling human behavior to inform, predict, and manage an HICS style problem. The game play thereby becomes a means of providing situation awareness and management of the HICS by using human action during game play as a heuristic for pruning the intractable possibility space of the problem at large into a likely probability subspace based on the actions players actually take when playing an HICS game simulation. This paper explores the approach of gamification of real-world HICS problem spaces for situation awareness and management. A gamification methodology is introduced and investigated through the use case of military acquisitions.

Military or defense acquisition has the purpose of managing government investments towards a national security strategy. As such, the military acquisitions process is generally a multi-faceted and complex process. The US defense acquisition system is expected to deliver the most capable, innovative, cost-effective equipment to the warfighter. Prior art solutions have proofed ineffective. As chairman of the Senate Armed Services Committee, the late Senator John McCain made the situation clear when he stated, "In short, our broken acquisition system is a clear and present danger to the national security of the United States."[2] The symptoms manifesting from the dysfunctional US defense acquisitions system amount to over reporting, perpetual checking and approving, exhaustive and persistent auditing, and the dreaded program cancellation. In 2005, a Pentagon report identifies the fundamental problem as that of lack of trust. "Oversight is preferred to accountability."[3] With this preference of oversight comes complexity as oversight is not process or pro-gram focused. Complex acquisition systems breed increases to cost and schedule and do not promote system success [3].

Military acquisition is a multidimensional activity that is both complex and complicated. At the highest level, nations articulate a national military strategy which defines the linkage of capabilities (means) with the desired end state of the nation (ends). Over the course of time, the nation will employ (ways) their capabilities (means) to achieve the desired effects (ends). Gaps in capability are realized as the nation works to achieve an end state or as military strategies change based on contextual and product development changes globally. The process of identifying gaps in military capability is formally known as capability planning. This activity occurs prior to the acquisition process, and it pushes the acquisition program toward a solution area, or product. The military acquisition process transforms needs into engineered systems capable of filling gaps in military capability. These systems are deployed to achieve the nation's specified end state(s). The military acquisition process is also used to manage the life cycle of deployed systems in order to maintain successful operations. The process of collectively identifying gaps and initiating acquisition activities to fill those gaps is known as enterprise programming and budgeting. Overall, the process of acquiring military systems is a part of an enterprise process whereby countries continuously work to achieve an ever-changing national military strategy.

Many nations around the world repeatedly evaluate their defense acquisition systems in an effort to increase efficiency in time (to develop or produce an asset), cost, and quality of instantiated weapon systems. The U.S. has not been immune to challenges within military acquisitions, which manifested recently in Congressional efforts (e.g., Weapons System Acquisition Reform Act) and policy initiatives (e.g., Better Buying Power initiative). Interestingly, some of these efforts are contrary to one another. For example, some call for the need for greater analysis and oversight, and others reject such requirements in favor of speed and flexibility. Such tensions in acquisition system execution motivate a holistic study of these factors to increase understanding. Overall, there is a persistent frustration with waste, mismanagement, fraud, cost overruns, delays, and performance shortfalls [5]. The reasons for these challenges identified through efforts to improve the process include the following: the limitations of the acquisition workforce, the inconsistency of the budgeting process, requirements volatility, organizational structure ambiguity, or inappropriate mandatory process elements.

Military acquisitions do not differ solely on the dimensions of product, process, and context, but also in how human's make decisions about acquisitions based on factors such as product, process, context. To understand how these three dimensions impact a successful acquisition, one may investigate how these dimensions influence human behavior, thereby impacting acquisitions. Aspects of the board game may relate to exploring the consideration of military acquisitions from the perspective of human-focused design versus the usual view of acquisitions from a function-focused design. In other words, thinking about acquisitions as a human, decision-making process rather than solely a functional, capability-construction process. An example of this distinction emphasizing the difference is contracting. From a functional perspective, the is the hiring of a contractor to execute a specified work statement. From a human perspective, this action requires time around which other people doing other tasks must be arranged and organized, and this action may encounter unexpected challenges or failings that must be mitigated and otherwise contended.

"Gamification is the application of game-design elements and game principles in non-game contexts." [1] It is an approach to process modeling that targets and exposes human motivation and action in a system instead of focusing on product or work done [2]. Gamification has been used historically to educate, entertain, engage, or distract. Common gamification mechanisms found in many applications intended to impact behaviors are points, badges, or leaderboards. For example, meal logging apps use points to keep up with food quality and quantity to motivate better eating habits. Running apps use badges as accolades to encourage and reward mileage. Learning apps use leaderboards to stimulate competition and continued use.

For complex problems like military acquisitions in which human behavior contributes to outcome, understanding what drives behaviors and how people behave under certain conditions or constraints within that problem space can provide a valuable heuristic for understanding the possibility space characterizing the complex problem.

FIG. 1 shows a process for gamification 100. Gamification is more effective when it exploits human fundamental drives. These drives may include one or more of the following principles. Epic Meaning & Calling 110—a core drive in which a player believes that s/he is doing something greater than her/himself; there is no single mechanic for this drive—this drive emergence from the overall game design. Development & Accomplishment 120—a core internal drive based on making progress, developing skills, and eventually overcoming challenges; this is also an emergent drive based on full game design rather than a single mechanic. Empowerment of Creativity & Feedback 130—the engagement in a creative process that includes (1) creation, (2) experiencing the impact of one's creation, (3) feedback, and (4) iteration; example mechanisms are creative composition including game play strategy composition. Ownership & Possession 140—motivation to improve or gain more of something based on a sense of owning it; an example mechanism is wealth-building. Social Influence & Relatedness 150—all social-based drives are categorized here, including mentorship, acceptance, and competition; this drive propels us to be more like people, places, or things we relate to; example mechanisms are socially oriented branding or advertising, information campaigns, etc. Scarcity and Impatience 160—the drive to want something because you can't have it; example mechanics are wait-lists, limited editions, or seating, etc. Unpredictability & Curiosity 170—the drive to know what will happen next; example mechanics include lottery or positive reinforcement such as that used in the Skinner Box experiment [4]. Loss & Avoidance 180—the drive to avoid something negative from happening such as pain or loss; examples of mechanics that leverage this driver are time-bounded opportunities such as sales or offers. Behavior Modeling of Player Decision Points 190—designing, understanding, and implementing gameplay mechanics, specifically mechanics focused on player decision points within the game, may be helpful in building a board game. Due to the complexity and high dimensionality of the problem space, there can possibly be a vast number of decisions a player can perform. It may be helpful to simplify the available actions while retaining a minimum level of details required to understand the process being simulated. This may help prevent a game from becoming too complex or the underlying game objective(s) may not be understood.

Decision points are stages within a game where a player can perform a specific action (e.g., purchase property in Monopoly or position troops in Risk), where each action has its subsequent results. A decision point can be generalized into three components: What action is the player allowed to do? How does the player perform the action? What are the results of the action?

These decision points should be defined at different stages within the SDM. It is necessary to model the available player decisions in order to understand what and why players can (and cannot) perform certain actions in the game. But how do the decision points get captured in a way that can be easily understood by the player?

Behavior modeling is a method to capture player decision points because it provides a capability to capture aspects in the possibility space by parameterizing the various decision points a player can perform. This provides a capability to not only identify what a player can do within the game, but it aids in identifying any unexpected side effects that possibly break the game by undermining rule elements. For example, if the Monopoly "jail" card didn't explicitly say "Do not collect $200," then going to jail would be a great way to make money without having to traverse the entire board. The intersection of two game rules (i.e., collect $200 upon completing a trip around the board and being penalized by going to jail) would result in the undermining of the purpose of both rules (i.e., the reward of $200 would be undeserved, and the penalty of going to jail would be mitigated by the payment). A behavior modeling tool would help expose such conflict.

System Dynamics Modeling is an ideal approach to translation modeling for gamifying acquisitions because system dynamics models (SDMs) can represent non-linear, complex behavior of human systems, as well as identify and characterize actions and interactions among objects in a system. SDMs represent objects and how they may move through a possibility space. From SDM model elements such as stocks, flows, or loops, game components and mechanics may be defined such as to elicit the movement captured in the SDM.

Figure 2:
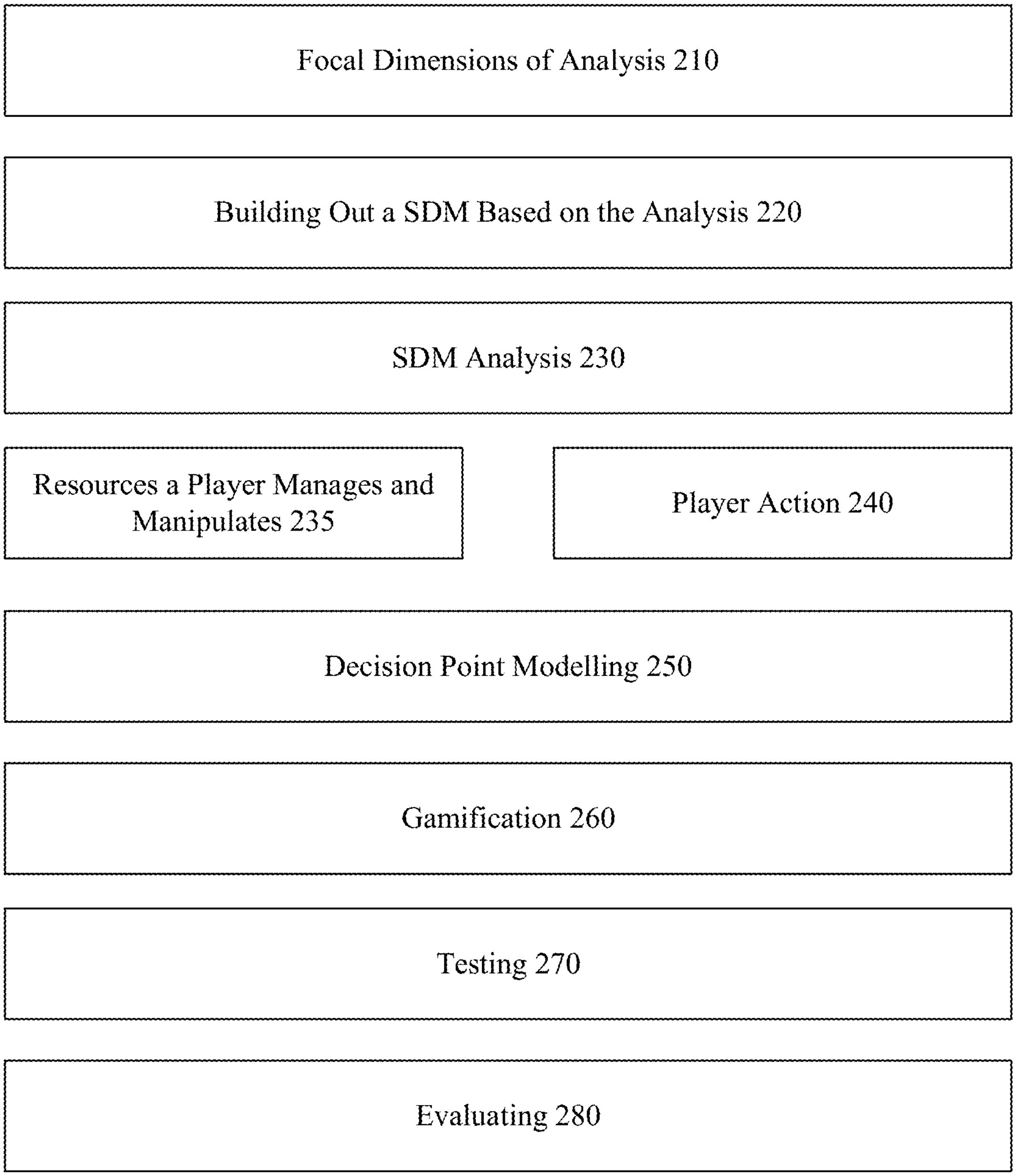
FIG. 2 illustrates a generalized approach for gamifying an HCIS.

FIG. 2 illustrates a generalized approach for gamifying an HCIS 200 may comprise several steps. To begin the process, the problem may be defined. Defining the problem may include an investigative phase. In this first step, the focal dimensions of analysis may be identified to organize and drive the investigation 210. Once the space is detailed, the second step may include building out a SDM based on the analysis 220. This step may include a detailed analysis comprising a reduction or abstraction of a subset of refined specifications or aggregations that are relevant to the target analysis, yet accessible within a game play context (i.e., can be represented in a game and can be manipulated by a player). The SDM may then be analyzed 230 to identify two primary elements, (1) resources a player manages and manipulates 235, and (2) player action 240. This analysis may provide an identification of decision points. These decision points may be modeled 250 via a behavioral modeling tool to delineate the decision space, observe and understand the connections between/among actions, and categorize paths that game play can take. Once decision points are modeled and game play trajectories are evaluated, one may proceed with gamification 260 in terms of identifying game mechanics and components and their interactions. The final step of the methodology may include testing 270 and evaluating 280 the game with iteration over the gamification step in order to mitigate conflict, loopholes, or errors in design.

Figure 3:
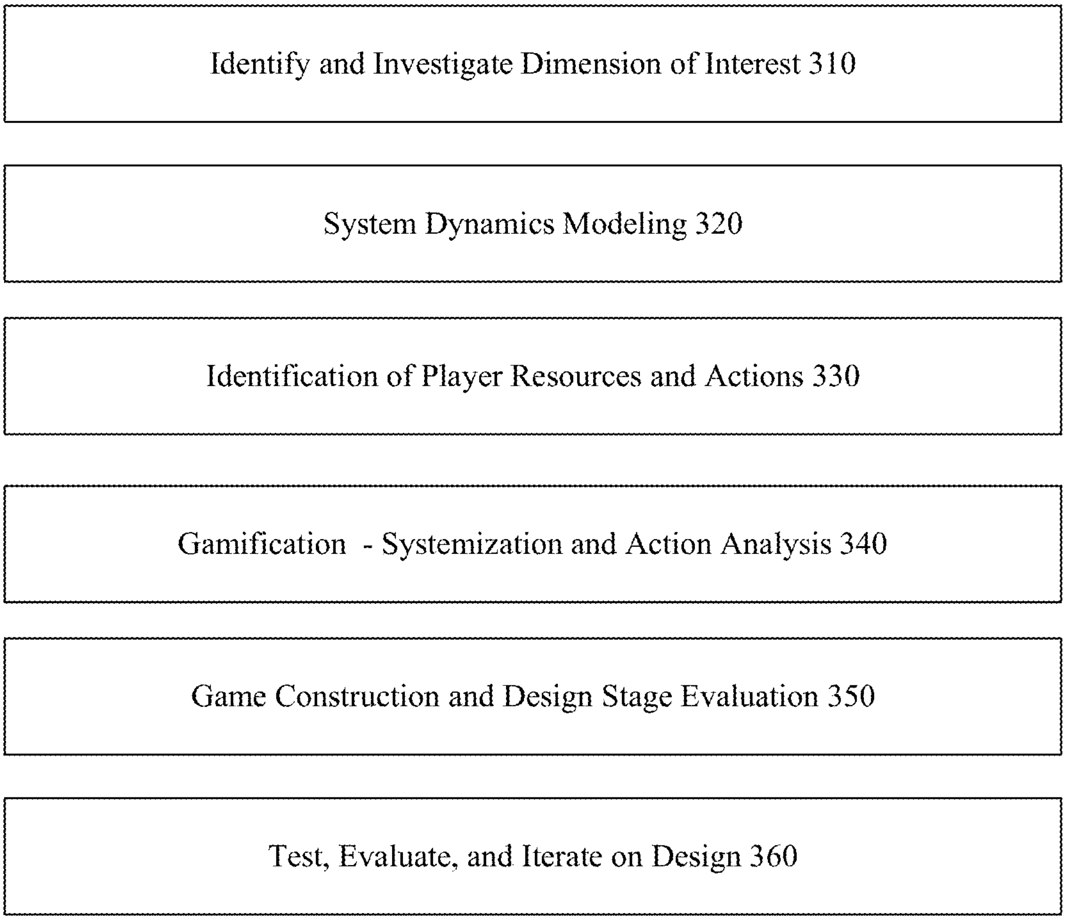
FIG. 3 illustrates a method for gamifying an HCIS.

FIG. 3 shows a method for gamifying an HCIS. The method may include: identify and investigate dimension of interest 310 to target problem. Research may result in the proliferation of complexity as vast details of the domain space are captured. Define a systemization of the problem with respect to the dimensions of interest. System Dynamics Modeling (SDM) 320 may include an initial mechanic for capturing a systematized construct. Systemization may include the game architect to "simplify" the details describing the problem for the purpose of building a game [5]. Identification of player resources and actions. 330 Behavior Modeling for evaluating action analysis and designing "kill chain" of the integrated game play. Gamification 340. In this step, the systemization and action analysis may be associated with specific game mechanics for enabling the required system/action construct into the game. Game Construction and Design Stage Evaluation 350 for assessing game components and mechanics iteratively. In this way, components or mechanics may be altered as needed upon evaluation before other components and/or mechanics are integrated into the game play. The target here is to assess the integration of mechanics for game flow. If a mechanic is considered a gear, this step evaluates whether or not the gears are connected and moving smoothly. Test, Evaluate, and Iterate on Design with respect to game purpose 360. The target of this next V&V phase is to assess whether or not the purpose of the game is being effectively tackled. Does the game allow for evaluating the proposed questions or hypotheses of HICS problem domains?

Country Selection

The Acquisitions Game can simulate any number of countries. For example: Afghanistan, Australia, Brazil, Canada, China, Egypt, France, Germany, India, Iran, Iraq, Israel, Japan, Kenya, Nigeria, North Korea, Russia, Saudi Arabia, Spain, South Africa, Turkey, Ukraine, United Kingdom, United States, and Venezuela.

Figure 4:
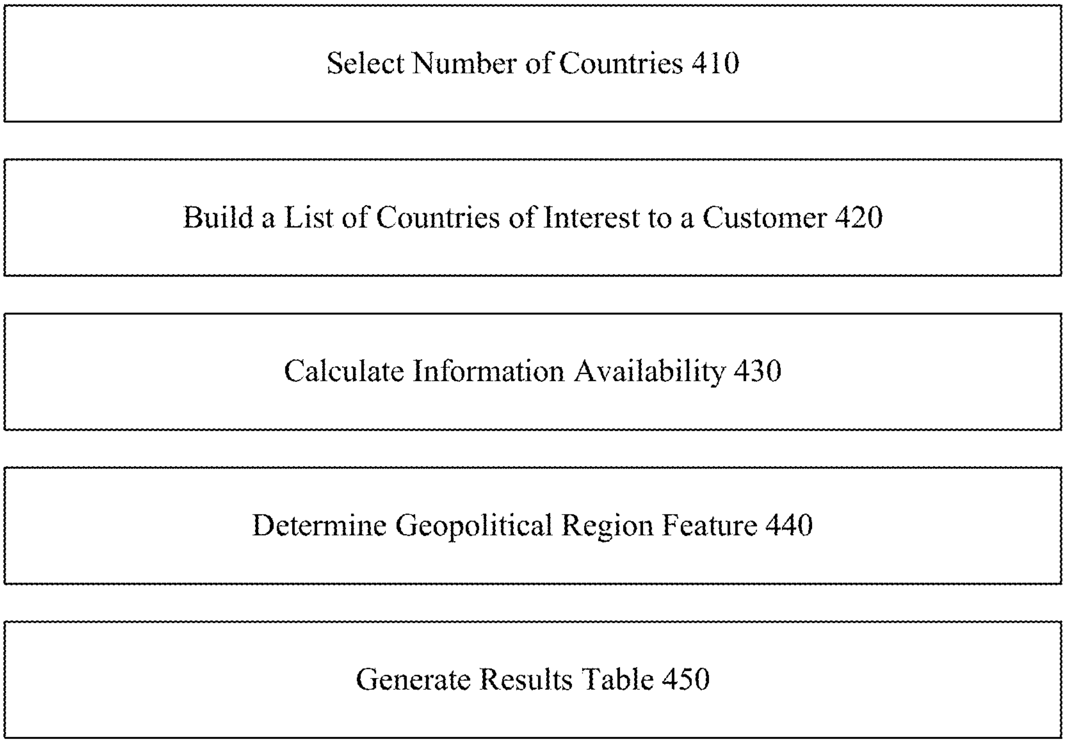
FIG. 4 illustrates a method of selecting countries to model in a HICS based game.
Figure 5A:
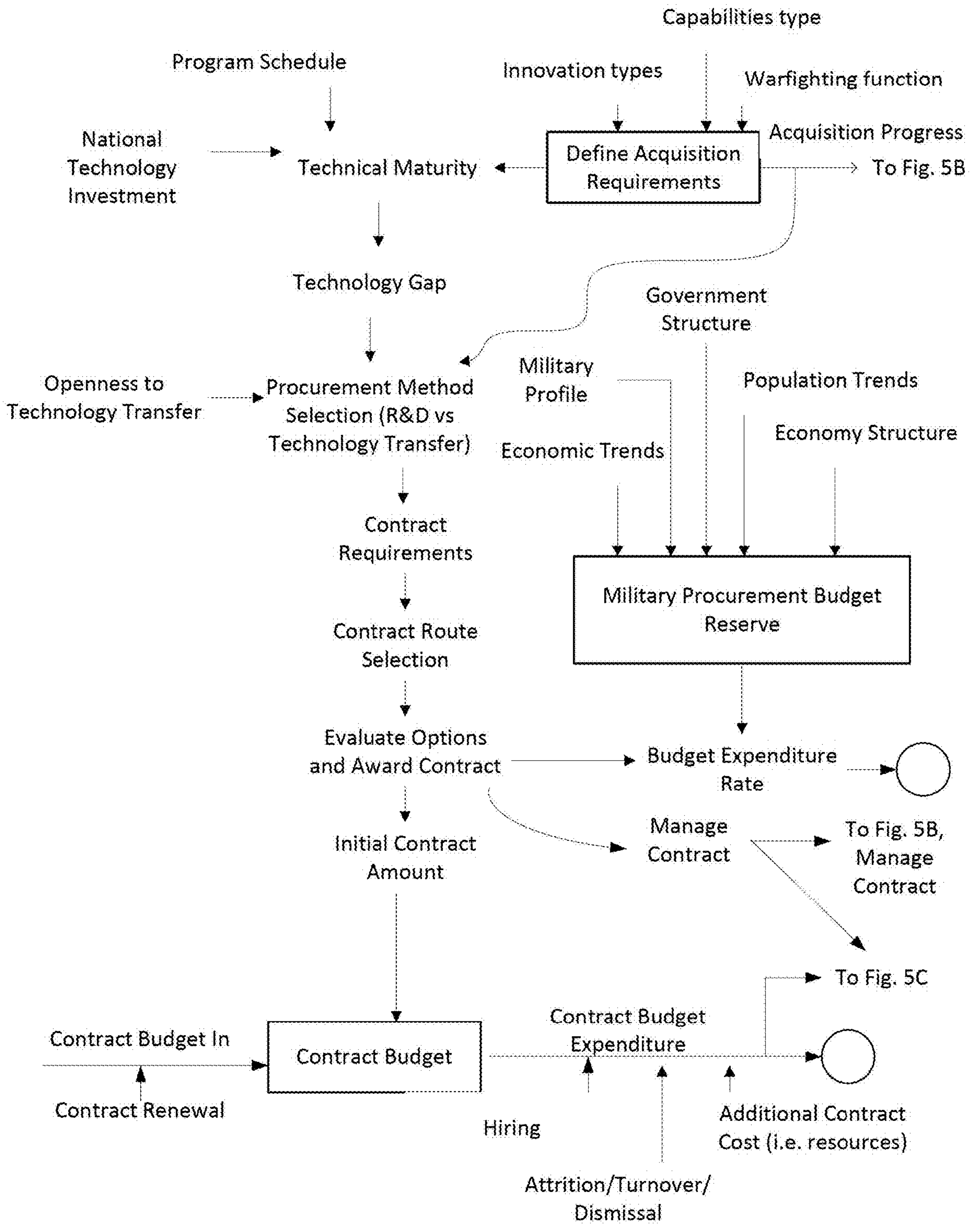
FIGS. 5A-5F illustrate a SDM complex flow.
Figure 5B:
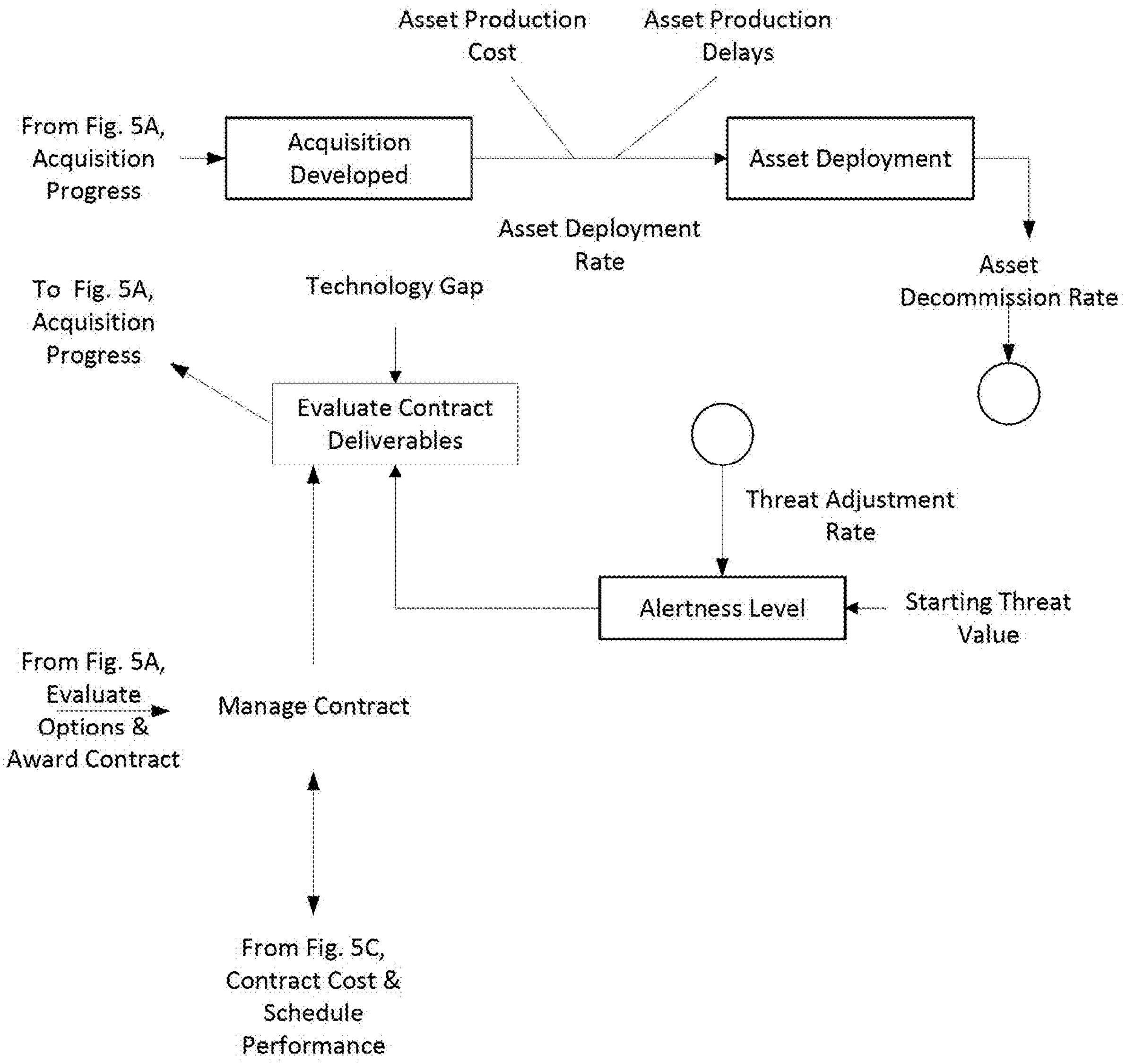
Figure 5C:
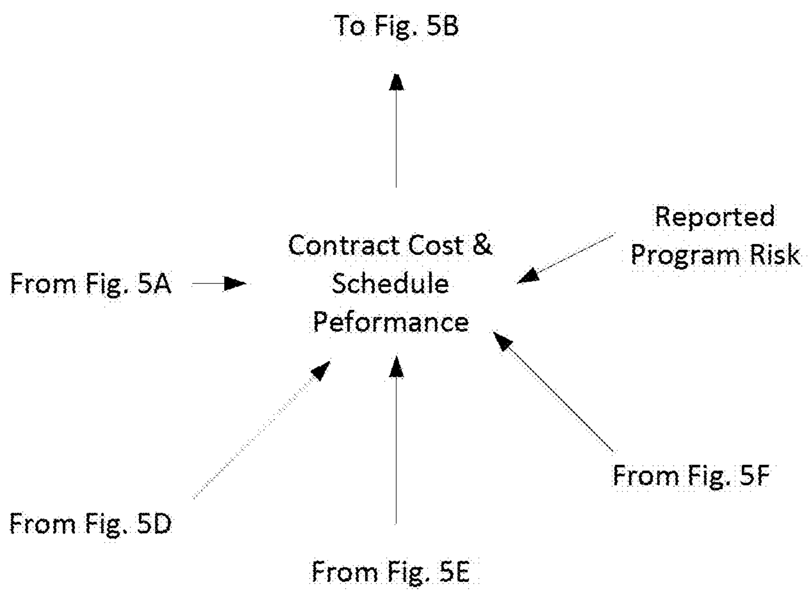
Figure 5D:
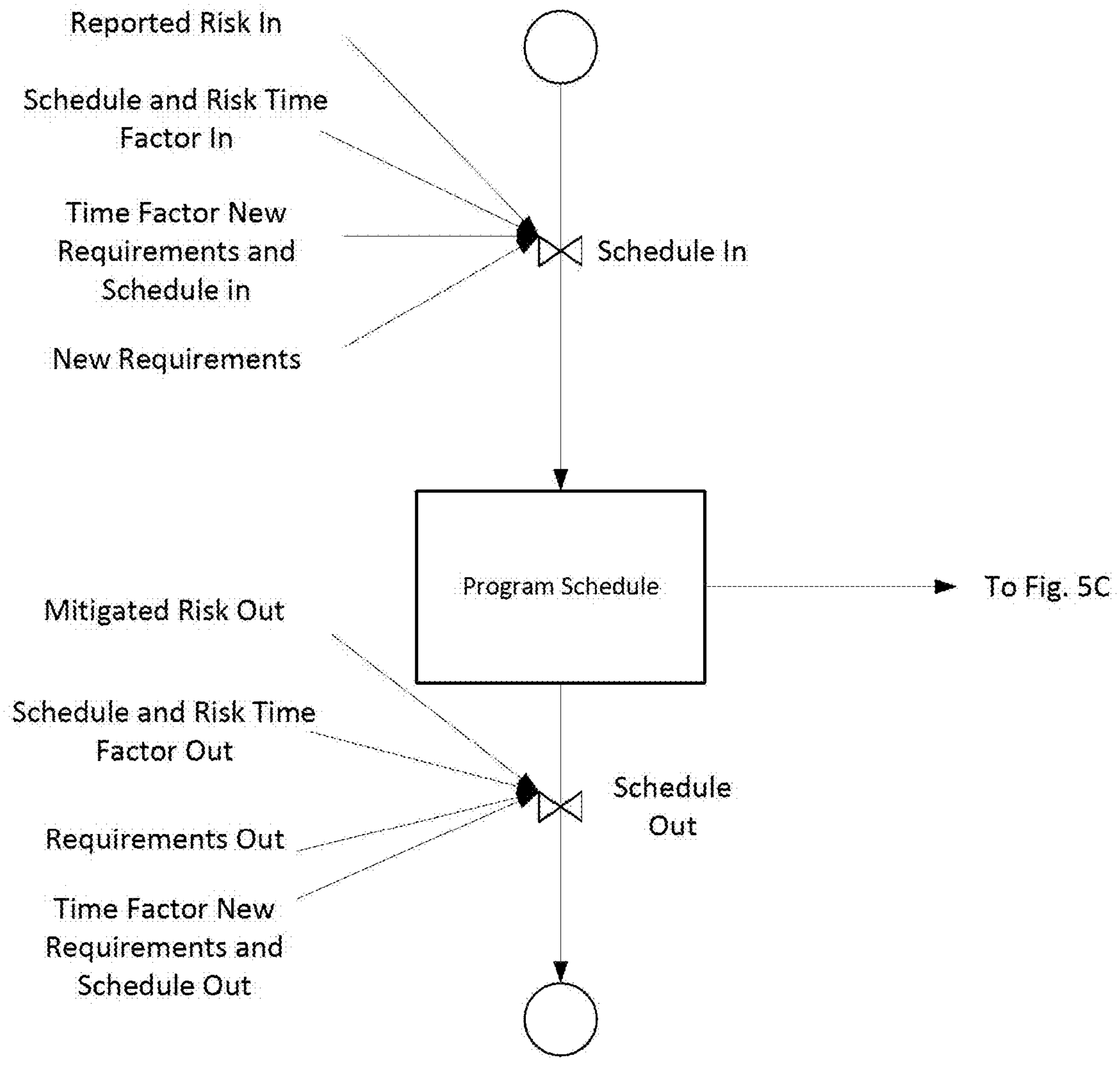
Figure 5E:
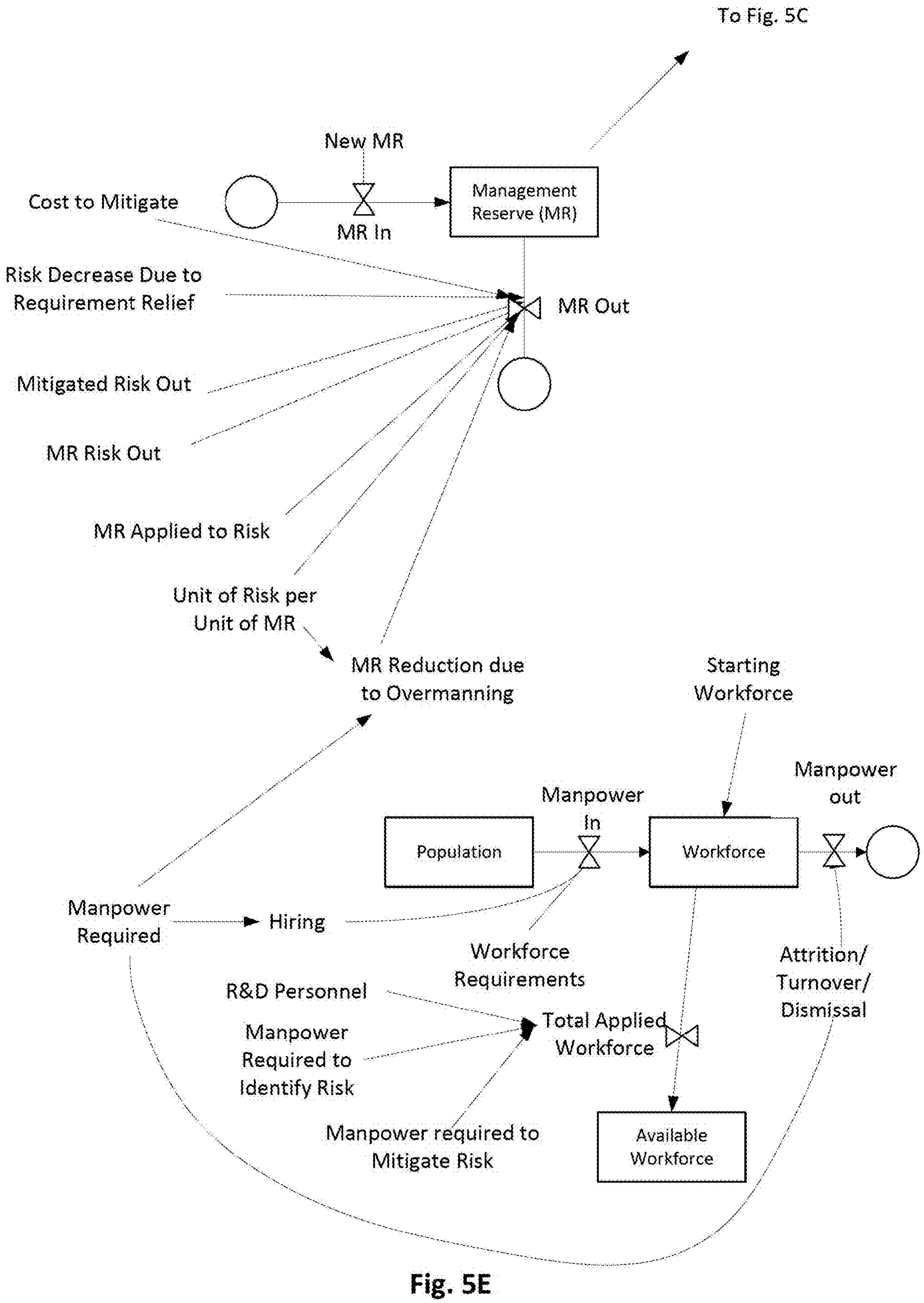
Figure 5F:
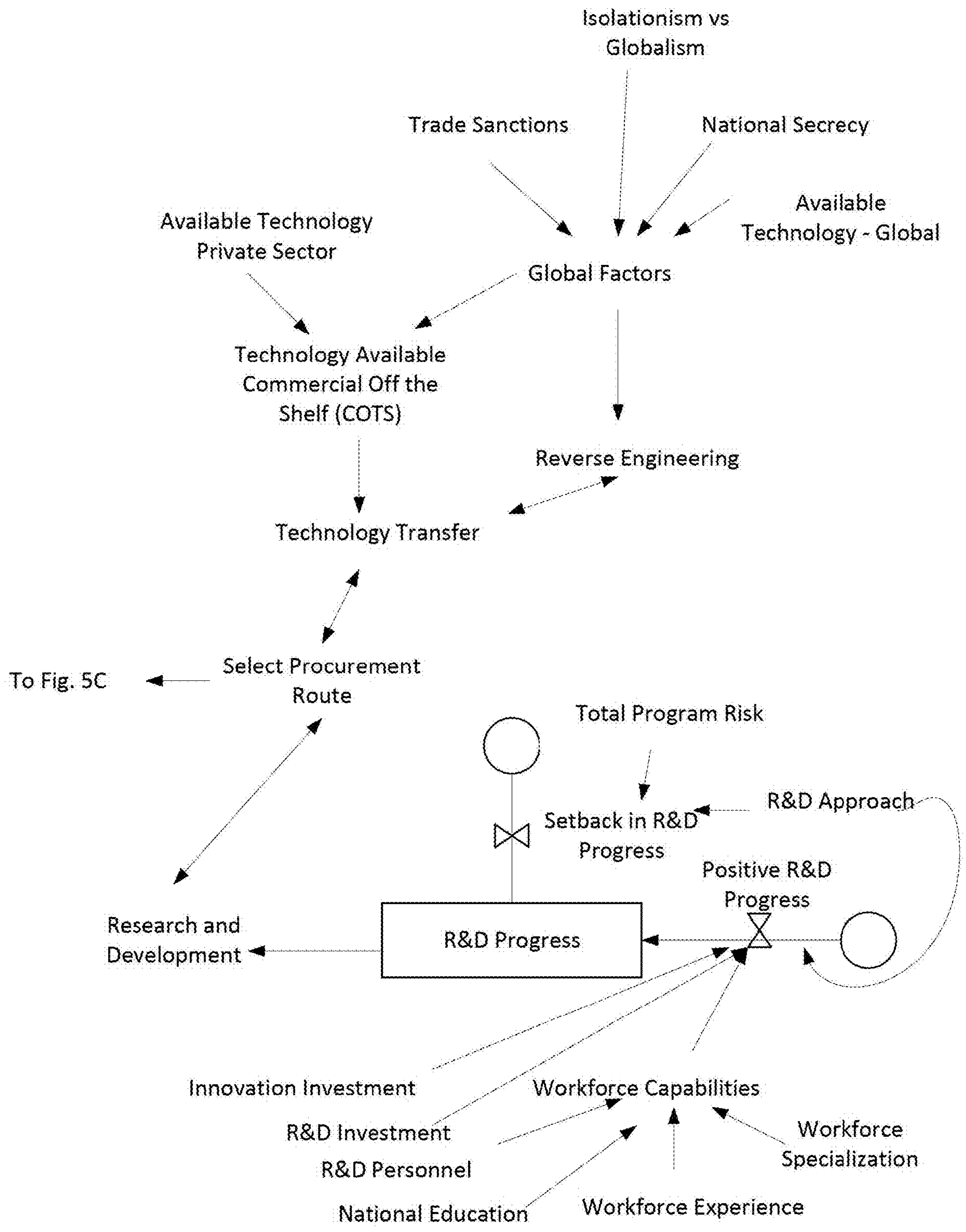

FIG. 4 shows a method of selecting countries to model in a HICS based game 400, one may select a number of countries for the game 410. For example, it could be 5 countries from the above list. Modeling a country may reveal strengths and weaknesses in its military acquisition capability. So, additional steps in selecting a country may include (1) interest to a customer 420, (2) information availability for the country (to improve accuracy) 430, and (3) geopolitical region (as a proxy for strategic variability) 440. Interest to a customer could a binary decision or could be a rating.

The "information availability" feature may be calculated based on an initial search for resources describing acquisitions for each country and availability of subject matter expertise. The number of accessible and relevant sites could be counted. If a SME was already identified and contacted, a SME weight of 5 was added to the site count. If a SME is readily identified based on a known contact, a weight of 2.5 was added to the site count. If a team member had identified a SME from research (not via a known contact), a weight of 1 was added, and finally, if no know means of identifying a SME had been resolved, a weight of 0 was added to the site count. The sums for each country were sorted to derive the "information availability" list.

For geopolitical region feature, a list of geopolitical regions was identified. For each region, the team identified at least one country to add to the original list. This is a categorical feature. The countries were sorted based on these factors, and the below table was produced 450.

| Customer Interest (Yes/No) | | Information Availability (Rank) | Geopolitical Region | Final Sorted List (Rank) | |
|---|---|---|---|---|---|
| YES | Afghanistan | 1 United States | Americas (AM) | 1 Russia | 1 |
| | Brazil | 2 Australia | Asia Pacific (AP) | 2 Canada | |
| | China | 3 United Kingdom | Europe (EU) | 3 Australia | |
| | Iran | 4 Germany | EU | 4 Turkey | |
| | Iraq | 5 Turkey | EU | 5 Germany | |
| | Israel | 6 France | EU | 6 South Africa | 2 |
| | Japan | 7 Ukraine | EU | 7 China | |
| | North Korea | 8 Brazil | AM | 8 Japan | |
| | Russia | 9 Spain | EU | 9 Ukraine | |
| | Saudi Arabia | 10 Canada | AM | 10 United Kingdom | |
| | Turkey | 11 South Africa | Africa (AF) | 11 United States | |
| | Ukraine | 12 Russia | Russia | 12 India | 3 |
| | Venezuela | 13 China | AP | 13 Brazil | |

-continued

| Customer Interest (Yes/No) | | Information Availability (Rank) | Geopolitical Region | Final Sorted List (Rank) | |
|---|---|---|---|---|---|
| NO | Australia | 14 Nigeria | AF | 14 Spain | |
| | Canada | 15 India | AP | 15 France | |
| | Egypt | 16 Japan | AP | 16 Nigeria | |
| | France | 17 Israel | Middle East (ME) | 17 Israel | |
| | Germany | 18 Kenya* | AF | 18 Kenya | 4 |
| | India | 19 North Korea* | AP | 19 North Korea | |
| | Kenya | 20 Afghanistan* | ME | 20 Afghanistan | |
| | Nigeria | 21 Saudi Arabia ** | ME | 21 Saudi Arabia | |
| | Spain | 22 Iraq ** | ME | 22 Iraq | |
| | South Africa | 23 Venezuela ** | AM | 23 Venezuela | |
| | United Kingdom | 24 Egypt ** | AF | 24 Egypt | |
| | United States | 25 Iran ** | ME | 25 Iran | |

*Limited resources available

** Very limited resources available

Proliferation Complexity

The approach taken by this research effort was to build out a representation of the workflow of military acquisitions that translated the real-world problem space into a tractable representation that included all features, measures, and actions that had been captured through the detailed research. The specific mechanism leveraged for this was System Dynamics Modeling (SDM). For the systemization step of the gamification methodology, all military acquisitions data was assembled into a notional stock and flow diagram to represent the connections and dependencies among features of interest and within our defined scope of military acquisition, from concept definition to production. (Actual production and deployment of the asset was scoped out of this effort.) The final diagram was large, nuanced, and incredibly complicated. (FIGS. 5 and 6.)

Figure 7A:
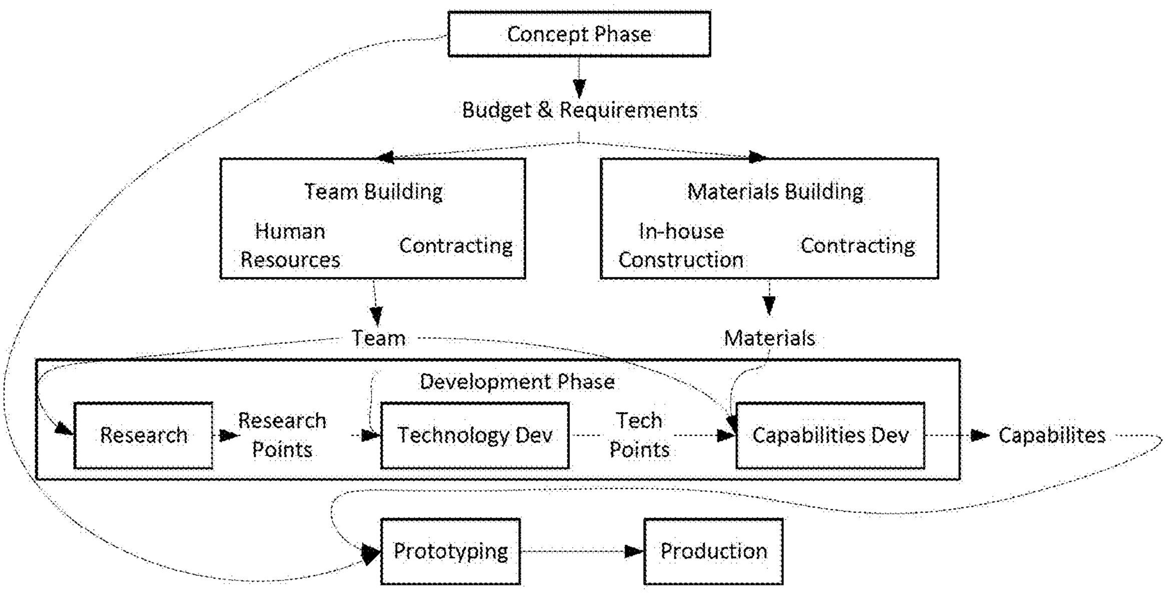
FIG. 7A illustrates schematic of the concept phase, development phase, prototyping, and production.

Simplification may include a process of trimming the problem space characterization into smaller parts. The process for doing includes aggregating the SDM representation into fundamental clusters of action purpose. This resulted in five action phases, namely, concept definition, team building, materials building, development, and prototyping+production. These phases and their workflow are represented in FIG. 7A.

Figure 6:
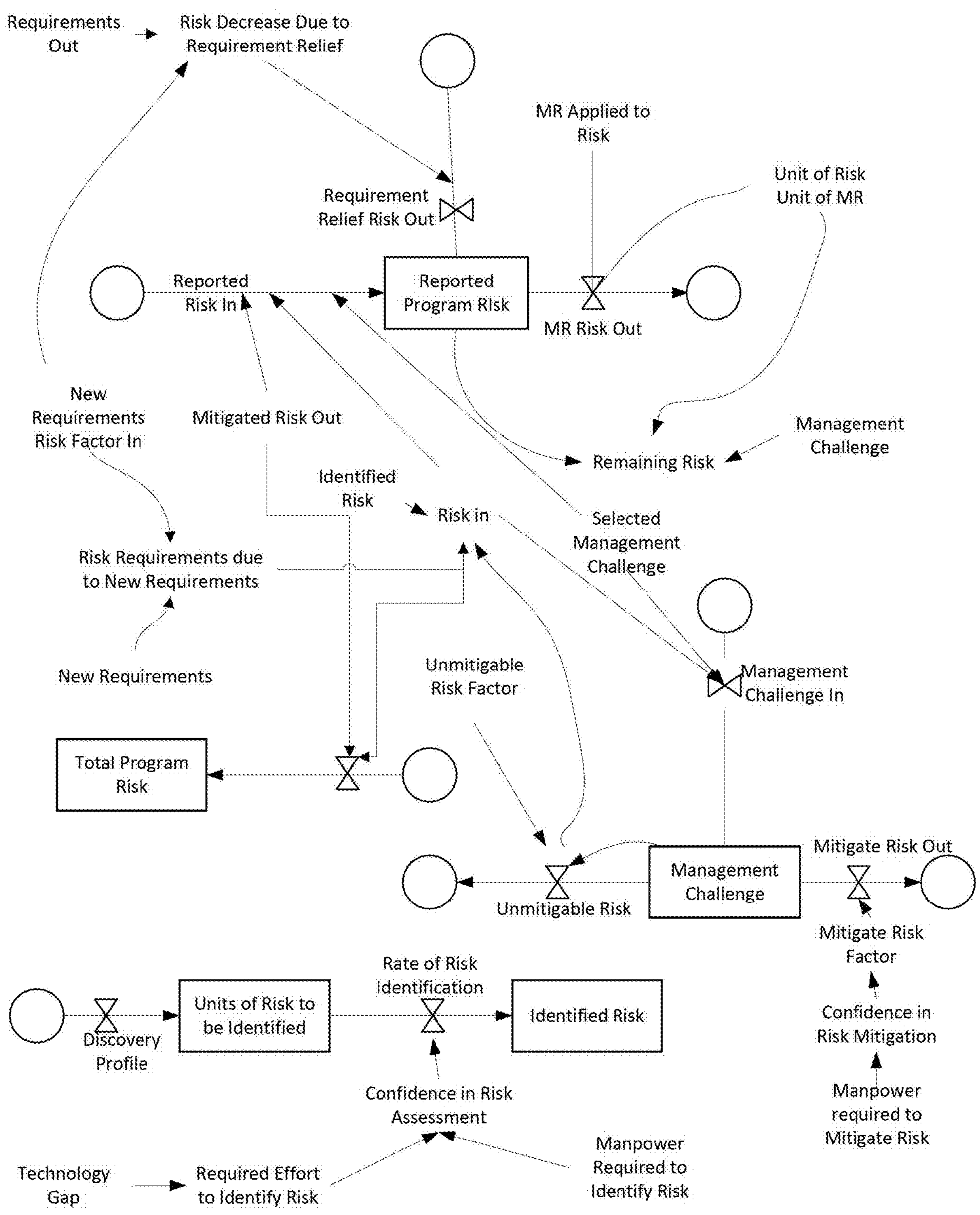
FIG. 6 illustrates an alternate SDM complex flow
Figure 7B:
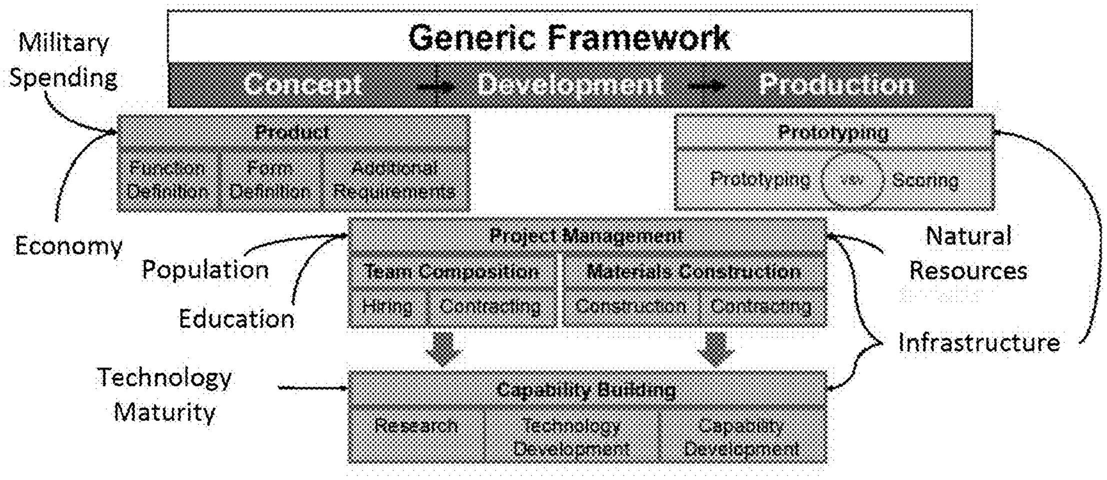
FIG. 7B illustrates an alternate schematic of the concept phase, development phase, prototyping, and production.

FIG. 7B show a simplified version of FIGS. 5 and 6. Following the process of simplification, the gameplay process can be represented as a framework consisting of three phases, concept, development, and production. The concept phase of the process captures the product dimension, and defines product in terms of function definition, form definition, and any additional requirements needed to enable the desired capability. The development phase consists of team composition, materials construction, and capability building. the production phase is reached by completing prototyping and successfully passing a verification and validation (V&V) evaluation, referred to as a V&V gate. Contextual factors im-pact efficiency of process execution, and manifest throughout the systemization.

Figure 7C:
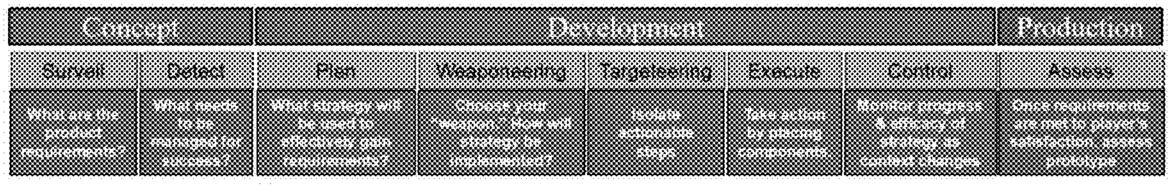
FIG. 7C illustrates an alternate schematic of the concept phase, development phase, prototyping, and production.

FIG. 7C shows an example of a kill chain for concept, development and production. A kill chain is an evolved military concept to define the composition of an attack. Kill chains are used to decide how one should invest our time, money, and other resources to build our capabilities and gain an advantage over our adversaries. The idea of a kill chain has been adapted to a variety of other domains including Lockheed Martin's adaptation of the Cyber Kill Chain which captures a cyber-attack in terms of phases of the attack and counter-measures of defense.

From the context of gameplay, the kill chain construct was used to specify and define categories of strategic actions in a game that lead to an effective and successful acquisition. Based on the systemization of the game, the defined kill chain is presented in FIG. 7C.

Game Strategy and Fortune

Some of the strategic areas of the game may include: worker placement and resource management. Additionally, deployment of the meeples may tie up worker placement and renouncement for a set amount of time. These aspects may simulate the process of managing an R&D team though the R&D process.

A more experienced player may be more aware of the uncertainties of the game. A more experience player may prepare for these kinds of unexpected events. For example, saving some money to tackle unexpected budget issues. An experienced player may also have a better feel for the resource and time costs associated with specific capability requirements. Thus, overall their strategies may be better that an inexperienced player because the experienced player may refined their experience to manage the team of meeples under their control. Inexperienced players may find they waste more resources in the beginning, until they become familiar with the timing and funding requirements for specific actions.

Major fortune-based (luck-based, random-based) components may include which cards are drawn such as contracting card. The addition of annual events and context cards that affect R&D development and annual event effects may be added to further include more luck-based elements.

A computer algorithm may be built to play as a computer component in the game. The game may include random and unexpected developments that occur during game play. The game may be configured such that these events have unpredictable elements. This may make it more challenging for a computerized opponent to win via an optimized strategic algorithm. Moreover, combinatorial explosiveness may make it difficult for a computerized opponent to take into all combinations of events in a possibility space.

Of course, humans do acquisitions in the real world. Human lead projects, allocate funds, respond to dynamics in the world. One of the aspects to the game may be to gain a better understanding of acquisitions. One aspect may involve evaluating human ability to create good decisions for acquisitions. In this way, human based opponents can provide improved simulation data for building and observing improving military acquisition models.

Atoms of the Game

Game grammar identifies the "atoms" or building blocks of a game, namely, nouns, verbs, and measurements of concern to the game. Nouns are the entities that make up the game. For AGS, some of the nouns that were identified are as follows:

1. Player: a player represents the strategic thinker for a virtual nation-state for a particular acquisition effort.
2. Virtual nation-state: a virtualized representation of a nation-state such that it has some features characterizing a nation-state, but it is not a complete or comprehensive representation; these features may be based on data of a real nation-state, or it may be entirely synthesized.
3. Product Requirements Document: represents the mission requirements that all players are attempting to fulfill.
4. Materials: represents the amount of physical components needed to develop a prototype of the acquisition.
5. Capabilities: represents the amount of research and technology development required to prototype the acquisition.

Verbs are actions that can be taken by a player that changes the composition of the board and the state of play. For example, a verb of "take a turn" may consist of rolling a die and moving a meeple on the board the designated number of spaces. This changes the board by altering the location of the meeple on the board. Some of the verbs identified for the AGS are:

1. Hiring: identifying the kind of personnel desired to execute an acquisition effort, and recruiting from the virtualized nation-state population to bring talent onto the team.
2. Contracting: hiring another company to execute work on the acquisition effort.
3. Tasking: identifying what an acquisition team member (either a scientist or engineering) is to be working on over a given period of time; team members (including contractors) will be developing capabilities or acquiring materials.
4. Funding: allocation of funds to continue executing on an effort.
5. Researching: the development of research points that will be transformed in Tech points and, ultimately, capabilities.
6. Prototyping: the instantiation of capabilities and materials into a proof of concept of the desired acquisition; depending on the level of success of the developed capabilities and the amount of materials built, prototyping may or may not be successful; successful prototyping constitutes the end of the game.

Measures or stats are measurable resources or defined metrics that are used throughout gameplay to measure progress, evaluate standings, and ultimately to decide the winner of the game. Some of the measures defined for AGS are:

1. Product Score: A prototyped acquisition will consist of a number of generated capabilities (represented as capability tokens). Successful capabilities will have a quality score (number 1 to 5) which indicates the success rate of the capability. The higher the quality score, the better the capability will perform. A failed capability is indicated with an "X" (e.g. a capability token with an X printed on it). The product score is the sum of the quality scores of the required number of capabilities for prototyping the acquisition.
2. Budget: how much money is allocated for execution towards the acquisition asset; budget is allocated per round and can be impacted by unexpected events; rate of expenditure and other measures of budget are associated with this metric.
3. Time: Time is measured in years and quarters; the measure of how long it takes to build capabilities and materials and, ultimately, to prototype the acquisition is a measure of effectiveness of an acquisition strategy.
4. Capabilities: Capabilities are generated by accumulating technology points which are generated by accumulating resource points. Various measure such as the amount of capability points generated and the rate of capability generation are relevant metrics for evaluating gameplay.

Once the kill chain and game grammar are instantiated, possible player actions and decision points can be identified and defined. By doing this, the game designers are clearly capturing targets for mechanization. Player actions and decision points for AGS are listed below:

1. Surveil: conceptual action; observe cumulative acquisition requirements;
2. Detect: conceptual action; identify stats to monitor & calculate targets
3. Plan: conceptual action and decision point; choose and/or design strategy; for example, decide to target material building before capability building.
4. Weaponeering: conceptual action and decision point; identify tools with which strategy will be instantiated; for example, decide to leverage contracting for materials building.
5. Targeteering: conceptual action and decision point: identify actionable steps; for example, identify contract and calculate time and money needed to acquire all needed materials leveraging contracting.
6. Execute: action point; implement plan by leveraging weapon of choice based on targeted actions.
7. Control: If changes in context merit strategic shift, iterate back to "plan."
8. Assess: If capability and resource requirements are met, and prototyping is desired, initiate prototyping. The "assess" phase will also be critical for after-action review by which different strategies are compared and evaluated for relative effectiveness with respect to context configuration.

The board game and/or electronic version thereof simulates simulate the steps involved in the acquisition of technology as a tabletop simulation. This includes defining the product requirements, developing the technology from basic research through developmental research to applied research, prototyping the capabilities, and sending the final asset to production.

The board game and/or electronic version (collectively, Acquisition Game Simulation (AGS)) is configured to simulate the steps involved in the acquisition of technology as a tabletop simulation. This includes defining the product requirements, developing the technology from basic research through developmental research to applied research, prototyping the capabilities, and sending the final asset to production.

AGS is a game for 1-4 players, although some configurations may support more players. AGS may be implemented as an online, computerized video game available to play on PC, MAC, gaming consoles, iPhone, iPads, and other mobile device. Examples of online, computerized board games include Dominion®, Scrabble®, Chess, Risk, and Catan.® In an online, computerized board game the computer displays a virtual board, virtual pieces, automatically tracks scoring, sets up the board, etc. Generally, players can make movements or take turns using a controller or mouse. AGS and the entire board game and ruleset may be implemented as a physical board game or it may be implemented as online, computerized video game. The game may be implemented as a digital video game playable on a gaming console or computer having a digital central board and player pieces. The game may be non-transitory computer readable code stored on tangible computer readable media configured to be executed by a microprocessor of gaming console or computer; the gaming console or computer configured to generate a digital version of the game.

In this game, each player takes on a role of a program manager/Primary Investigator (PI) seeking to develop a technology as defined by the central product requirements document. Players may assemble their research and development (R&D) teams and manage their project's progress through the tasking of their team members to facilities. These facilities facilitate the R&D process by generating Research Units (RU), Technology Elements (TE), and Capabilities. Additional facilities may allow for the PI to complete project management actions, such as buy materials, contracting, hiring additional team members, and prototyping. In some configurations, the player who submits the best prototype to production is the winner of the game.

Game Components

There may be two main types of components: (1) central components that are non-player specific components. Central components may be considered shared resources. (2) Player specific components. Player specific components may have a player specific color such as red, white, blue, and grey. In game setup, each player may assist in setting up the central components and they may take some or all of the player specific components in their player color. In some configuration, player specific components may not be color-coded to the player color.

Figure 19:
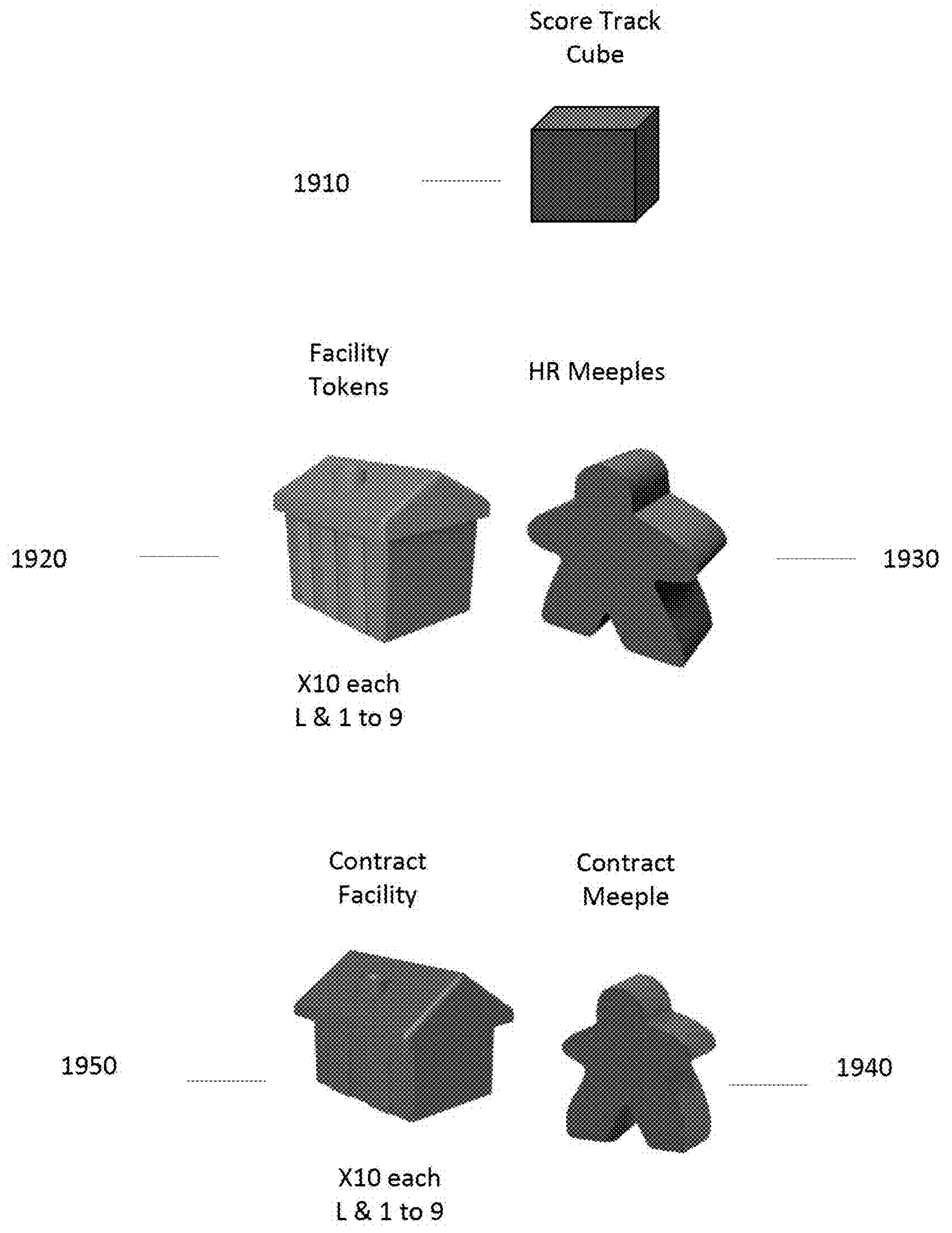
FIG. 19 illustrates a score track cube, facility toke, HR meeple, contract meeple, and contract facility.
Figure 20:
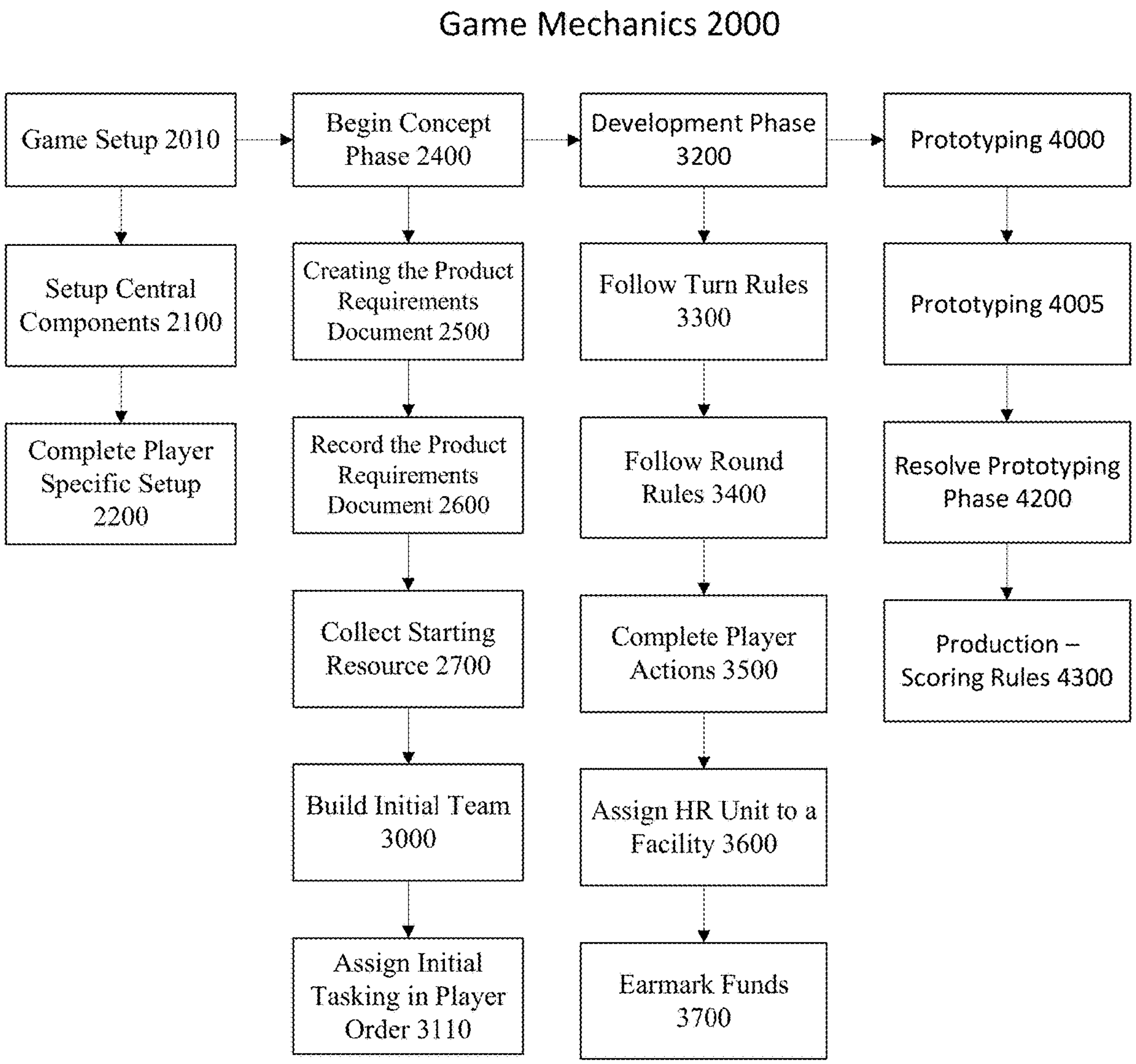
FIG. 20 illustrates a schematic of the game mechanics.

Central components may include: a central board 800 (FIG. 8), 6 function cards (1110, FIG. 11), 10 form cards (1120), 2 requirement modifier cards per level with 5 start levels (1200, FIG. 12), 60 capability tokens (1310, FIG. 13), 20 rounds tokens (1330), a fiscal year track pawn (1340), a central board tracking cube (1350), initiative card, currency, 30 contract cards (1400, FIG. 14), 120 resource multiplier counters (1510, FIG. 15), 120 quarters paid counters (1520), 30 technology element cubes (1530), 120 research unit cubes (1540), and 30 material cubes (1550), 4 initiative cards (1610, FIG. 16), AGS Currency (1620) in denominations of $1K, $5K, $10K, $20K, $50K, $100K, and $500K (other values are contemplated), a contract meeple (1940, FIG. 19), 10 contract facility tokens with leader facility and levels 1-9 (1950). The quantities and levels of the central components are exemplary only and may be adjusted based on the number of players and modifications to rules.

Figure 17:
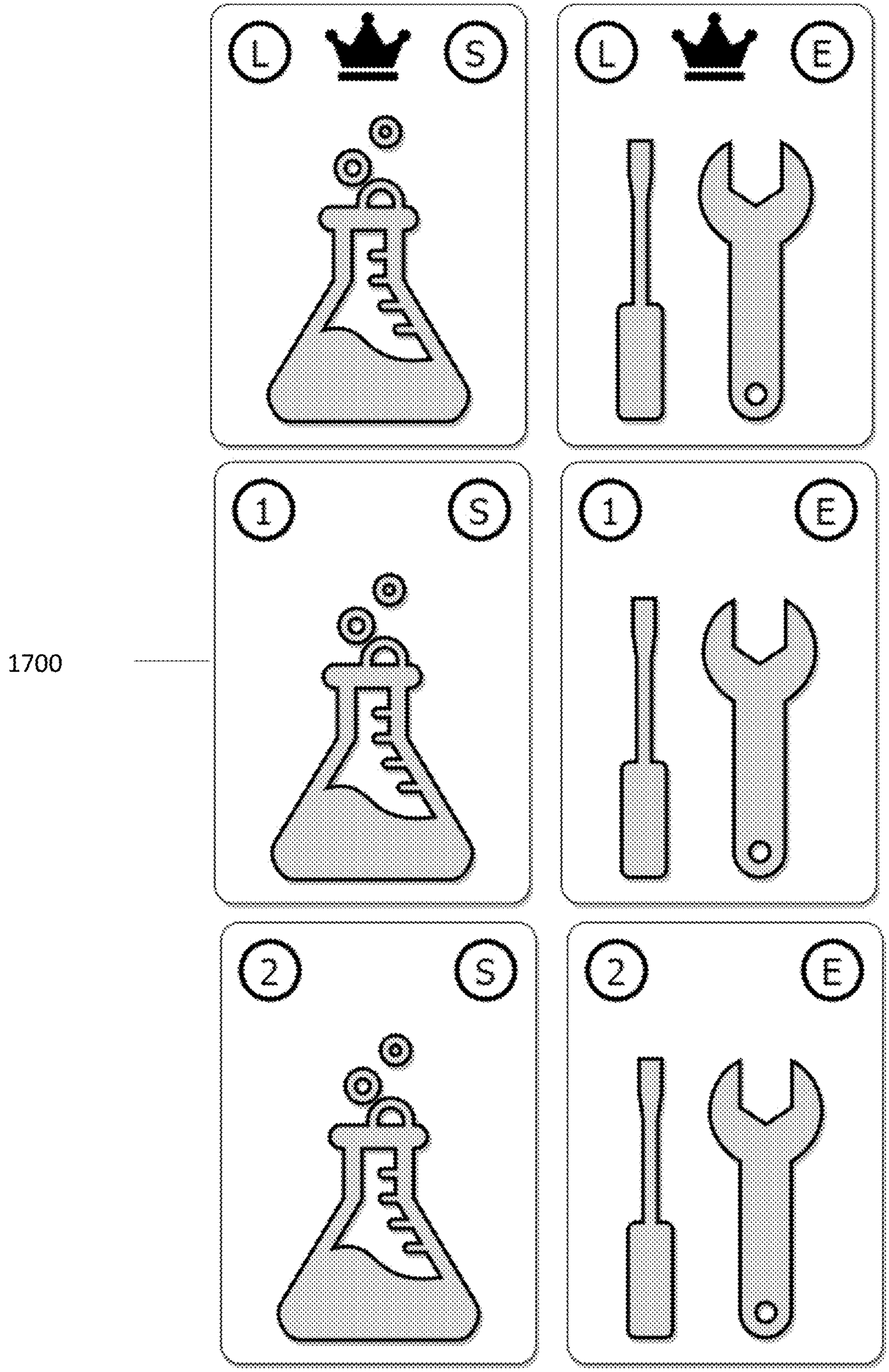
FIG. 17 illustrates HR cards configured to receive quarter paid counters.

Player specific components may include a player board (FIG. 9), 10 HR cards with a leader card and levels 1-9 (1700, FIG. 17), 7 base facility cards (1800, FIG. 18), HR Meeple (1940), 10 facility tokens (one leader and levels 1-9) 1950, and a score track cube 1910. The quantities and levels of the central components are exemplary only and may be adjusted based on the number of players and modifications to rules. In a four-player game, there may be four colors of player specific pieces. In the figures, Red, Blue, Gray, and White are shown, but other colors are contemplated. For example, HR Meeples 1930 will be the same color as the player color. Contract meeples may be color coded as well. They may all have a green head with a color specific body color or vice versa.

Figure 8:
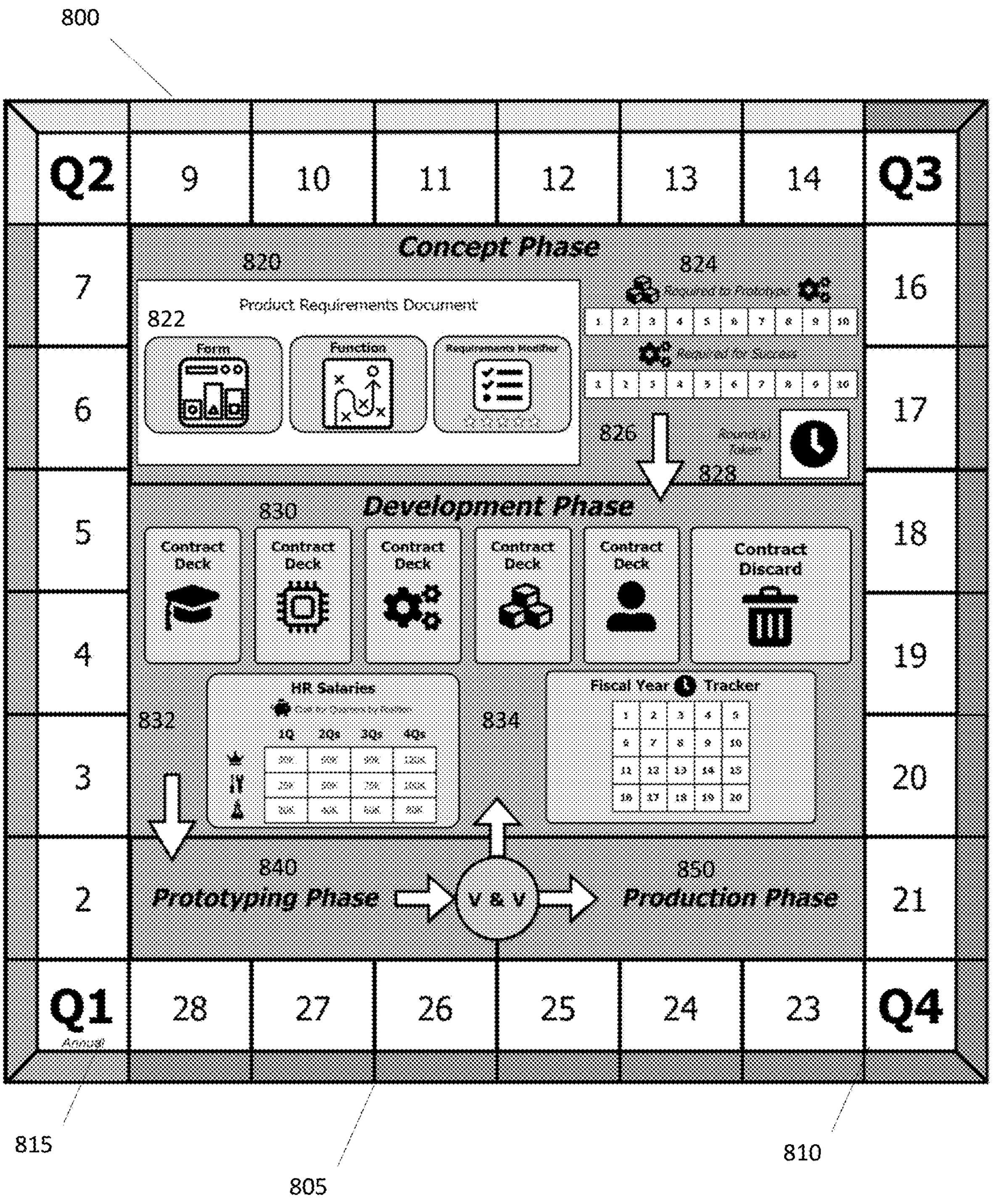
FIG. 8 illustrates a central board.

FIG. 8 shows an embodiment of the central board 800. The central board may have an outer track 805 having track markers. The board edge may comprise a plurality of track markers (8 track markers are shown per edge). Each corner 810 may be labeled to indicate a physical year quarter (such as Q1, Q2, Q3, Q4). The bottom left corner 815 make have an annual year marker. Each side of the board may comprise numbered tracks that continue in order. The numbering may be adjusted depending on the type of calendar being used. In the United States which uses the Gregorian calendar, there are 52 weeks in a year. In some configurations, there could be 13 track markers on side of the board. In such a configuration, the track markers may be labeled from Q1 (1)-52. In the configuration show, there are 8 track markers per side. Eight track markers per side allows for larger printing of each individual track without making the central board too large itself. Since there are 8 track marker per side, there are 28 total track markers on the embodiment of the central in this figure. Each rectangle corresponding to a location the HR meeple can move to. The inside of the central board may be divided into three or more regions: a concept phase, a development phase, and a prototyping phase.

The concept phase region 820 may phase may have a products requirements document region 822 with three markings for form cards, function cards, and requirements modifier cards. In some configurations, the form cards, function cards, and requirements modifier cards are two-sided having a front and a back. Together, these three cards form the product requirements document and are collectively referred to as the products requirements document cards. The form card may have a form design on the back, the function card may have a function design on the back, and the requirement modifier card may have a requirement modifier design on the back. The three markings may have the same or similar design as the backs of the product requirements document cards. A materials tracker 824 of materials required to prototype may be printed adjacent to the product requirement document. A capability tracker 826 of capability requirements for success may be printed adjacent to the products requirement document. A round marker 828 may also be printed in the concept phase. The trackers and the round marker may have features different designs. In the configuration shown, roman numerals 1-10 are printed in sequential order such that the player may place one the central board tracking cubes on the trackers to keep track of materials required to prototype and capabilities required for success. Other configurations are contemplated. The concept phase may have a down arrow to indicate to the players that the next phase is the development phase.

The development phase region 830 may be situated in the middle of the board, between the concept phase and prototyping/production phase. The development phase may comprise 5 markers . . . one for each type of contract card. A six marker for discarded contracts may be provided. The development phase may also have an HR salaries table 832 for keeping tracking HR salaries. The development phase may also comprise a fiscal year tracker. The development phase may comprise a down arrow to indicate to the players that the next phase is the prototyping and production phase.

The prototyping phase region 840 and production phase region 850 are shown in a single area, but in some configurations, prototyping may have its own area and production may have its own area. In between the prototyping and production phase is the verification and validation circle (V&V) with arrows flowing from prototyping to V&V to production. V&V may comprise an up arrow indicating to the players that a player with a failed prototyping may need to reenter the development phase.

The central board serves many purposes. For example, the central board may track the requirements defined by the product requirements document. These requirements (Material cost, capability requirements for success and round limits) are for all players and influence the ability of players to complete their mission. The central board may also track the required time to complete tasks using the fiscal year track. Quarter markers may be positioned around the fiscal year track. Quarter markers may serve as reminders to attend to quarter tasks. Q1 may have the word "Annual" to serve as a reminder to tend to annual tasks—such as increasing the fiscal year tracker. The central board may also provide players a reminder of general gameplay showing the flow of gameplay from the concept phase to the development phase through prototyping & production. These phases will be discussed in their own sections below.

Although the central board is shown to have certain shapes such as rectangles for the concept phase, rounded rectangles for the form marker, a circle for V&V, other geometric shapes are contemplated.

Figure 10:
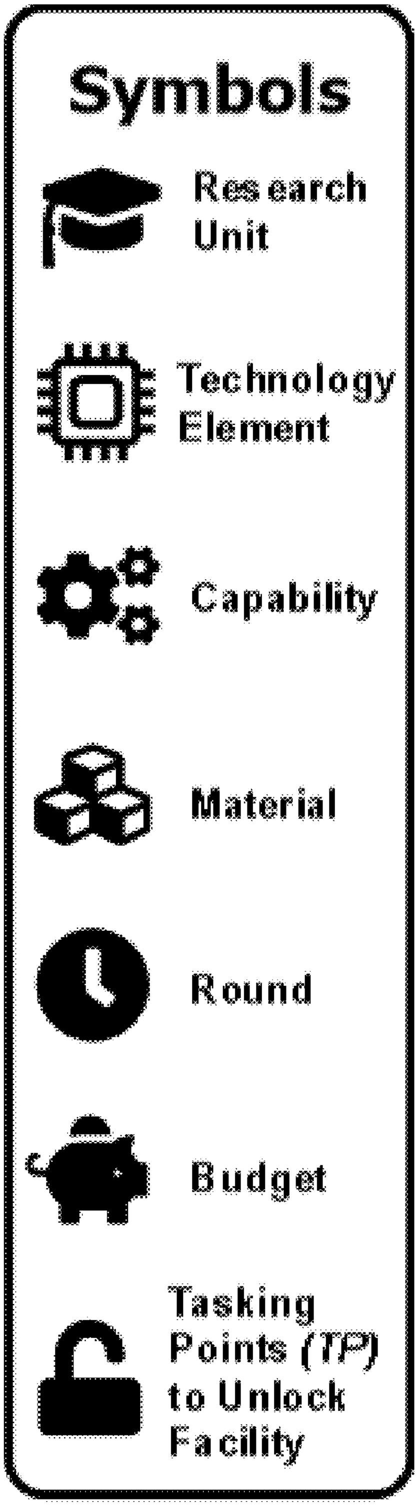
FIG. 10 illustrates six symbols used on the central board and other cards.
Figure 42:
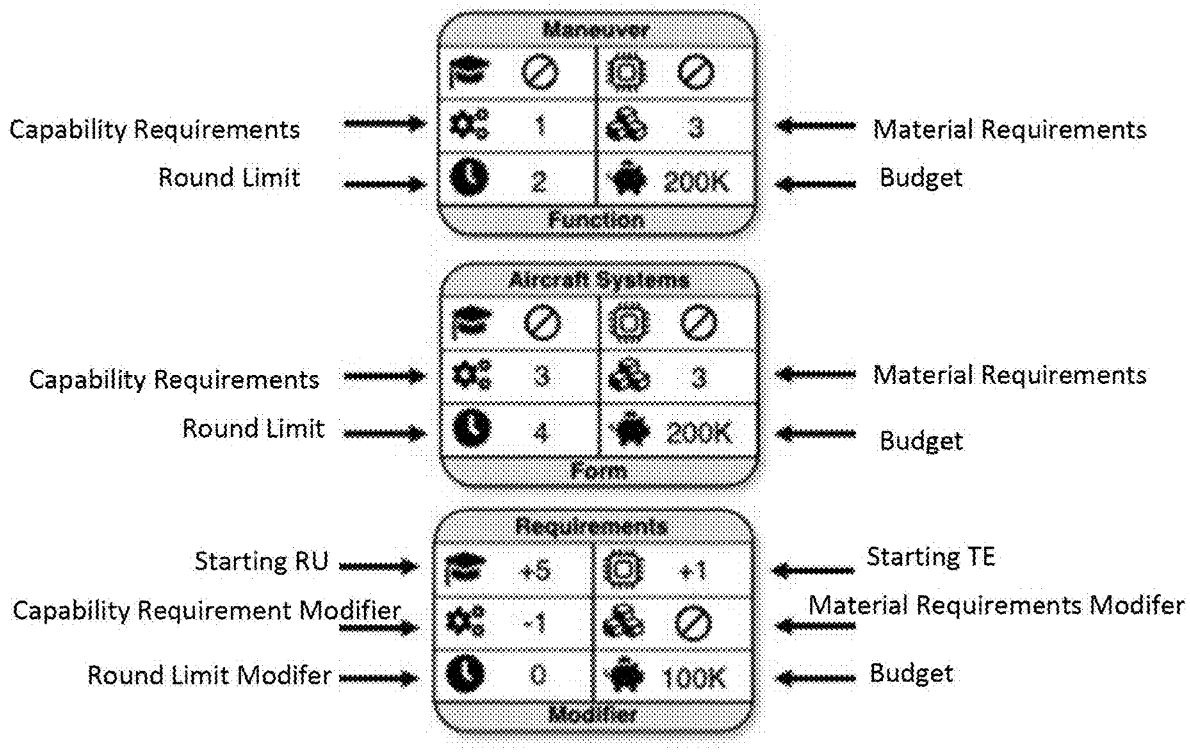
FIG. 42 illustrates labeled product requirements document cards.

As previously described, product requirement document may comprise form cards, function cards, and requirement modifier cards. As shown in FIG. 42, the form cards may comprise six symbols, each symbol having a value. Although more or less symbols may be used in alternate configurations. The seven symbols on the form card are shown in FIG. 42 and FIG. 10. The symbols may include: research unit, technology element, capability, material, round, budget, tasking points to unlock facility. The form card may have 6 or less symbols. The function and modifier cards may have these symbols. In some configurations the form and function cards will have a null value for research units and technology. While FIG. 42 depicts 6 different symbols more or less symbols could be used. The form card may represent one of the potential realms of capabilities in which the product may fall. For example, there may be 10 form cards: aircraft systems, generic systems, missile systems, seas systems, space systems, ground vehicle systems, autonomous systems, information technology systems, unmanned systems, and cyber systems. The form card shown features aircraft systems. In this configuration, there would be 9 other cards, one per capability.

The figures show six main symbols. Of, course other symbols could be substituted. These symbols can be printed on the players for ease of reference throughout the game. As shown in FIG. 10, the six symbols shown on the product requirement documentation are:

1. Graduation Cap: Research Unit: RU. Represents the results of basic research, literature reviews, etc. that are required to begin developmental research.
2. Circuit: Technology Element: TE. Represents the result of developmental research, the initial consideration of potential applications and relationships of the knowledge gained.
3. Gears: Capability. Represents the results of applied research, where technology elements are applied to specific problems to craft specific solutions.
4. Cubes: Material. The physical materials required in order to prototype capabilities into a final product design.
5. Clock: Rounds. Representing a fiscal year. The annual budget of money that a project has to apply towards their efforts. Each fiscal year allocating a budget of money that a player can spend on that project.
6. Piggy Bank: Budget
7. Padlock: Tasking Points to Unlock Facility: TP. The number of steps along the fiscal year track that a player must move to unlock an advanced facility.

FIG. 42 illustrates the product requirements document cards with all six symbols labeled.

As shown in FIG. 11, a function card 1110 may comprise six symbols, each symbol having a value. Although more or less symbols may be used in alternate configurations. The function card may represent one of the potential realms of capabilities in which the product may fall. For example, there may be 6 six potential warfighting functions: maneuver, fires, intelligence & information, sustainment, command & control, and force protection. The function card shown features maneuver. In this configuration, there would be 5 other cards, one per warfighting function.

FIG. 11 also shows an example of a form card 1120. A form card may have ten potential realms of capabilities in which the product may fall under: aircraft systems, generic systems, missile systems, seas systems, space systems, ground vehicle systems, autonomous systems, information technology systems, unmanned systems, and cyber systems. The form cards may also comprise six symbols and values. The combination of the function and form cards provide the basic requirements of the product.

Figure 12:
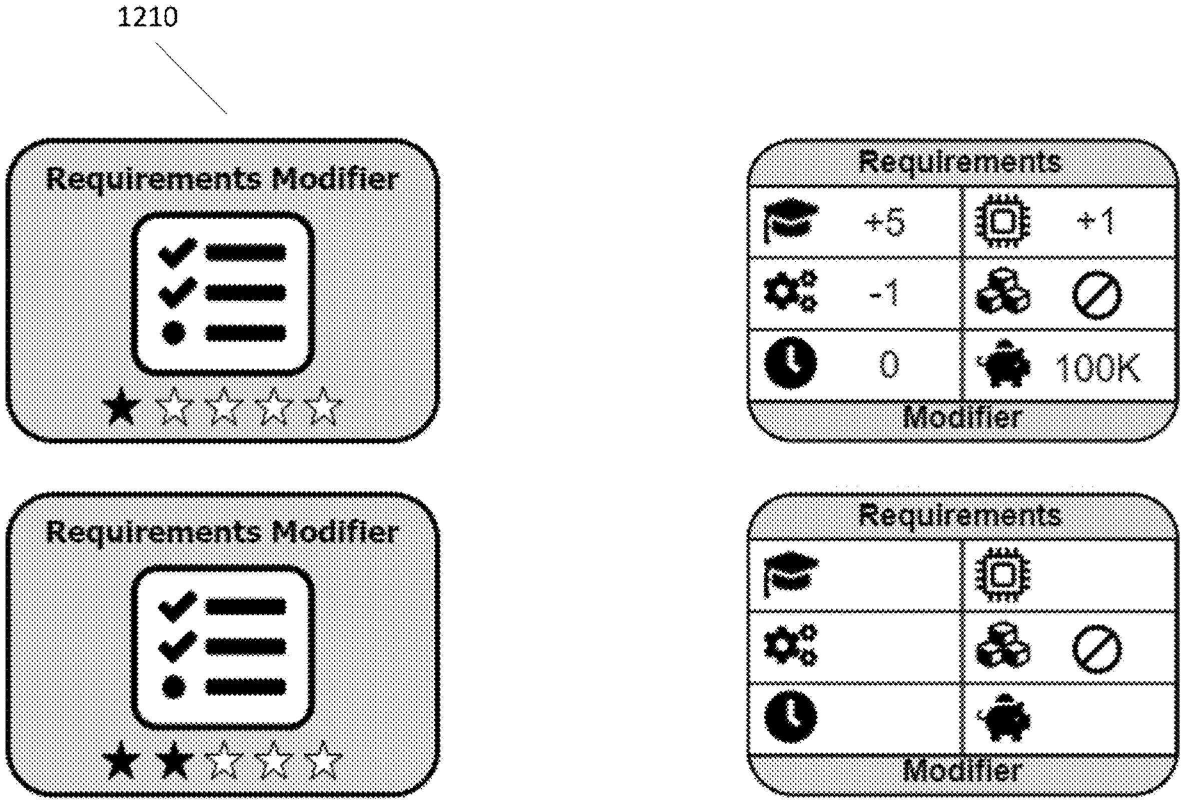
FIG. 12 illustrates requirement modifier cards.

As shown in FIG. 12, requirements modifiers cards 1210 may also comprise 6 symbols and value. The requirements modifier card may be configured to adjust the product requirements document. In the example shown, the requirement modifier card adds 5 RU, 1 TE, −1 capability requirement modifier, 0 material requirements modifier, 0 round limit modifier, and 100K budget. The back of the requirements modifier may comprise 1-5 stars. The number of stars may be indicative of the tier of the country being simulated.

Figure 13:
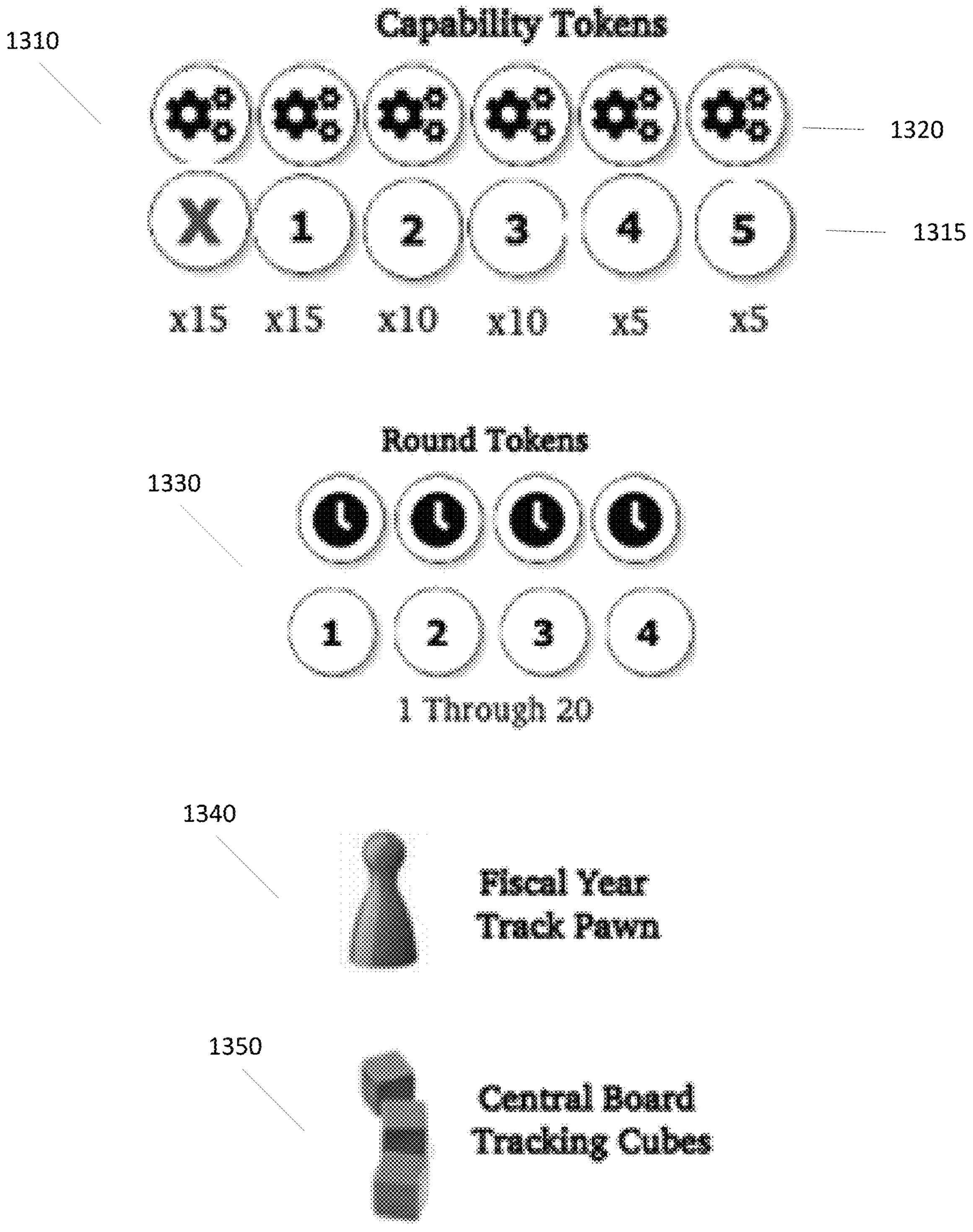
FIG. 13 illustrates capability tokens, round tokens, fiscal year track pawn, and central board tracking cubes.

FIG. 13 shows an example of the capability tokens 1310 for the AGS. In the example shown, there are 60 tokens: 15 have zero value, 15 have a value of 1, 10 have a value of 2, 10 have a value 4, 5 have a value of 4, and 5 have a value of 5. The capability tokens may have two sides (a front side 1215 and back side 1220.) The back side 1320 may have a gear icon to indicate capabilities. The AGS may also comprise 20 round tokens 1330. The round token may comprise 20 a clock symbol on the back side and numbering from 1-20 on the front. A fiscal year tracking pawn 1340 may be provided for tracking the fiscal year. Central board tracking cubes 1350 may be provided for the resource unit tracker, technology element tracker, and materials tracker (discussed below.)

Figure 9:
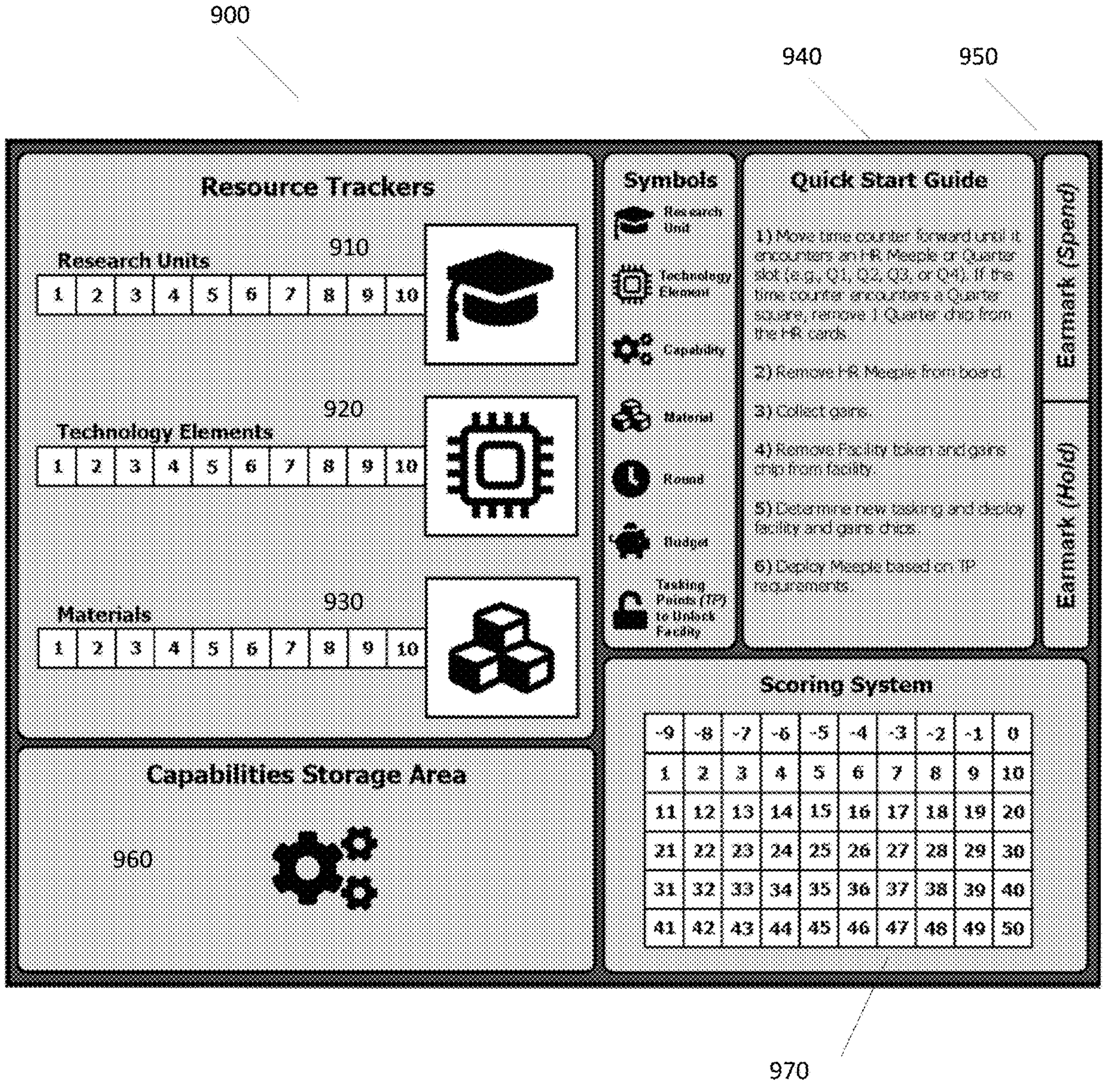
FIG. 9 illustrates a player card board.

FIG. 9 shows a player board 900 may comprise a resource unit tracker 910, technology element tracker 920, and materials tracker 930. The research unit tracker may comprise 10 denominations. The research tracker may be configured to receive a research unit cube for tracking a player's current research units. The technology element tracker may comprise 10 denominations. The technology element tracker may be configured to receive a technology element unit cube 1530 for tracking a player's current technology elements. The material tracker may comprise 10 denominations. The material tracker may be configured to receive a material cube for tracking a player's current materials.

The player board 900 also show the 6 symbols discussed in FIG. 10 for quick reference from a player. A quick start guide 940 may also be provided to assist the player in remember the flow of the game. Example language for the quick start guide may include:

1. Move time counter forward until it encounters an HR Meeple or Quarter slot (e.g., Q1, Q2, Q3, or Q4). If the time counter encounters a Quarter square, remove 1 Quarter chip from the HR cards.
2. Remove HR Meeple from board.
3. Collect gains.
4. Remove Facility token and gains chip from facility.
5. Determine new tasking and deploy facility and gains chips.
6. Deploy Meeple based on TP requirements.

Earmark 950 may be provided for holding money for the next fiscal year. Capability storage area 960 and a scoring system table 970 may also be provided.

Game Mechanics 2000

Figure 14:
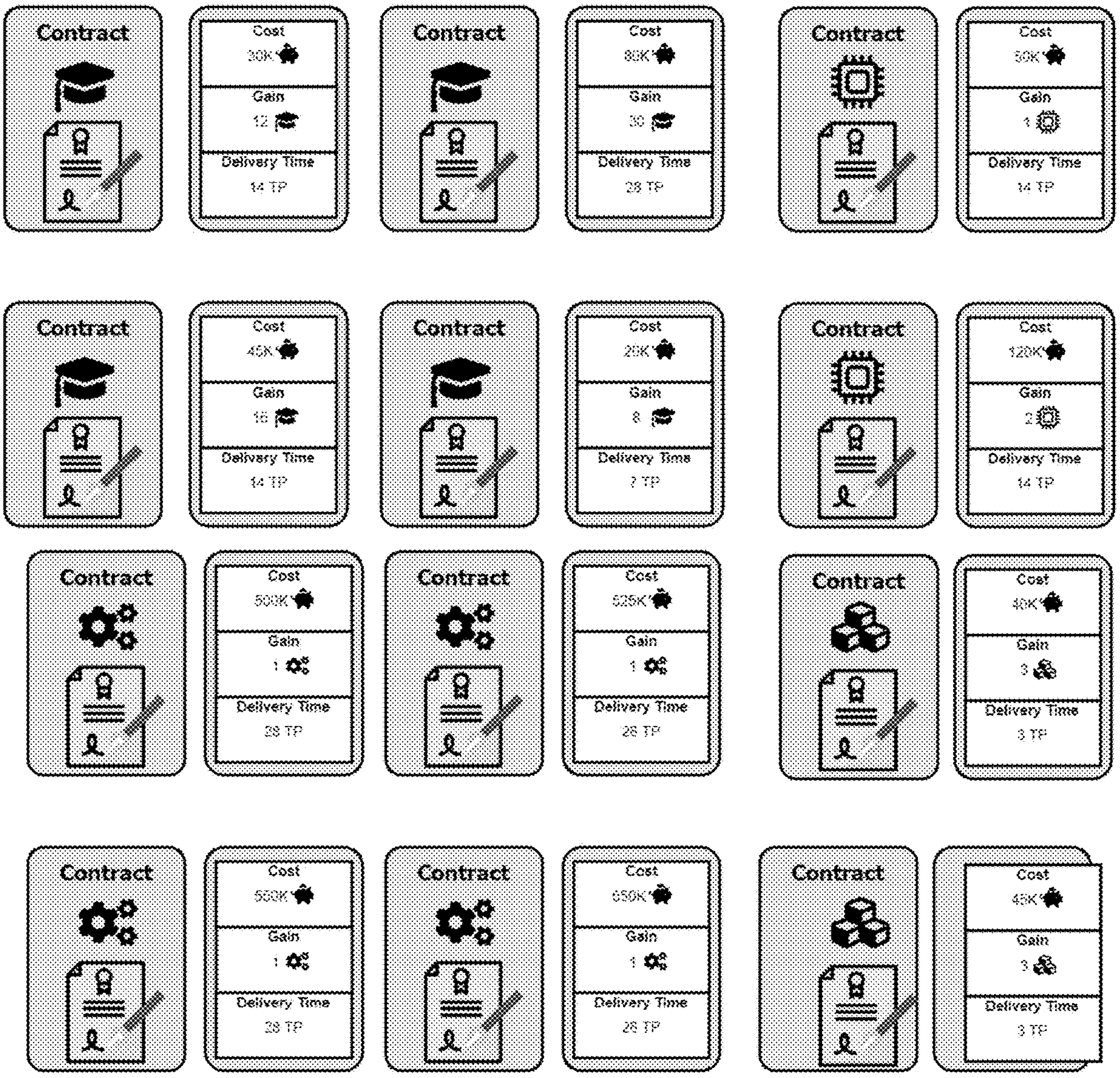
FIG. 14 illustrates Contract Cards.
Figure 15:
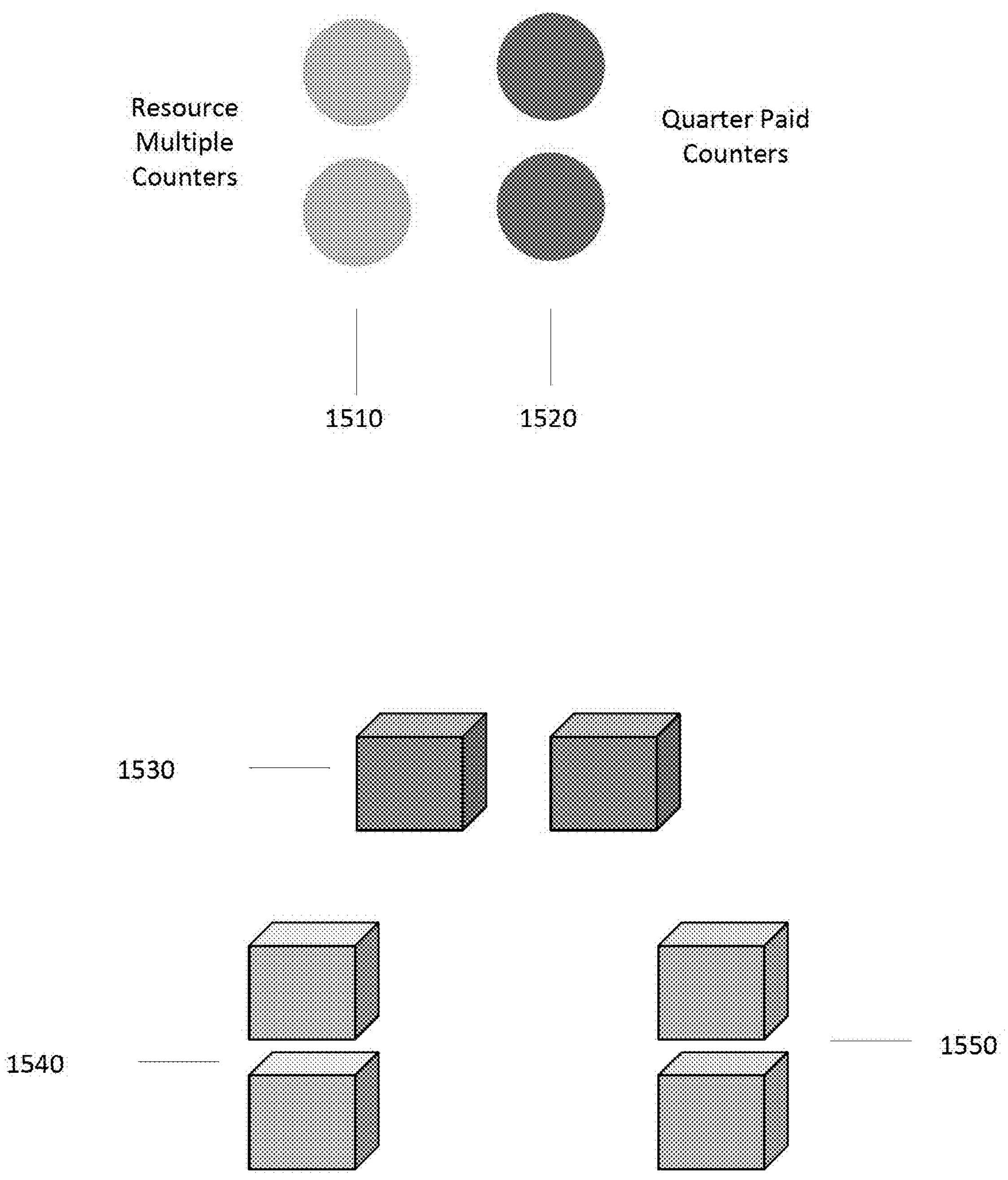
FIG. 15 illustrates resource multiplier counters, quarter paid counters, technology element cubes, research unit cubes, and materials cubes.

FIG. 14 shows an example method of the game mechanics including:

1. Game setup 2010
   a. Setup central components 2100
   b. Complete player specific setup
2. Begin Concept Phase 2400
   a. Creating the Product Requirements Document 2500
   b. Record the Product Requirements Document 2600
   c. Collect Starting Resource 2700
   d. Build Initial Team 3000
   e. Assign Initial Tasking in Player Order 3110
3. Development Phase 3200
   a. Follow Turn Rules 3300
   b. Follow Round Rules 3400
   c. Complete Player Actions 3500
   d. Assign HR Unit to a Facility 3600
   e. Earmark Funds 3800
4. Prototyping 4000
   a. Prototyping process
   b. Resolving prototyping phase
   c. Production scoring rules.

Game Setup

Setup Central Components 2100

Figure 16:
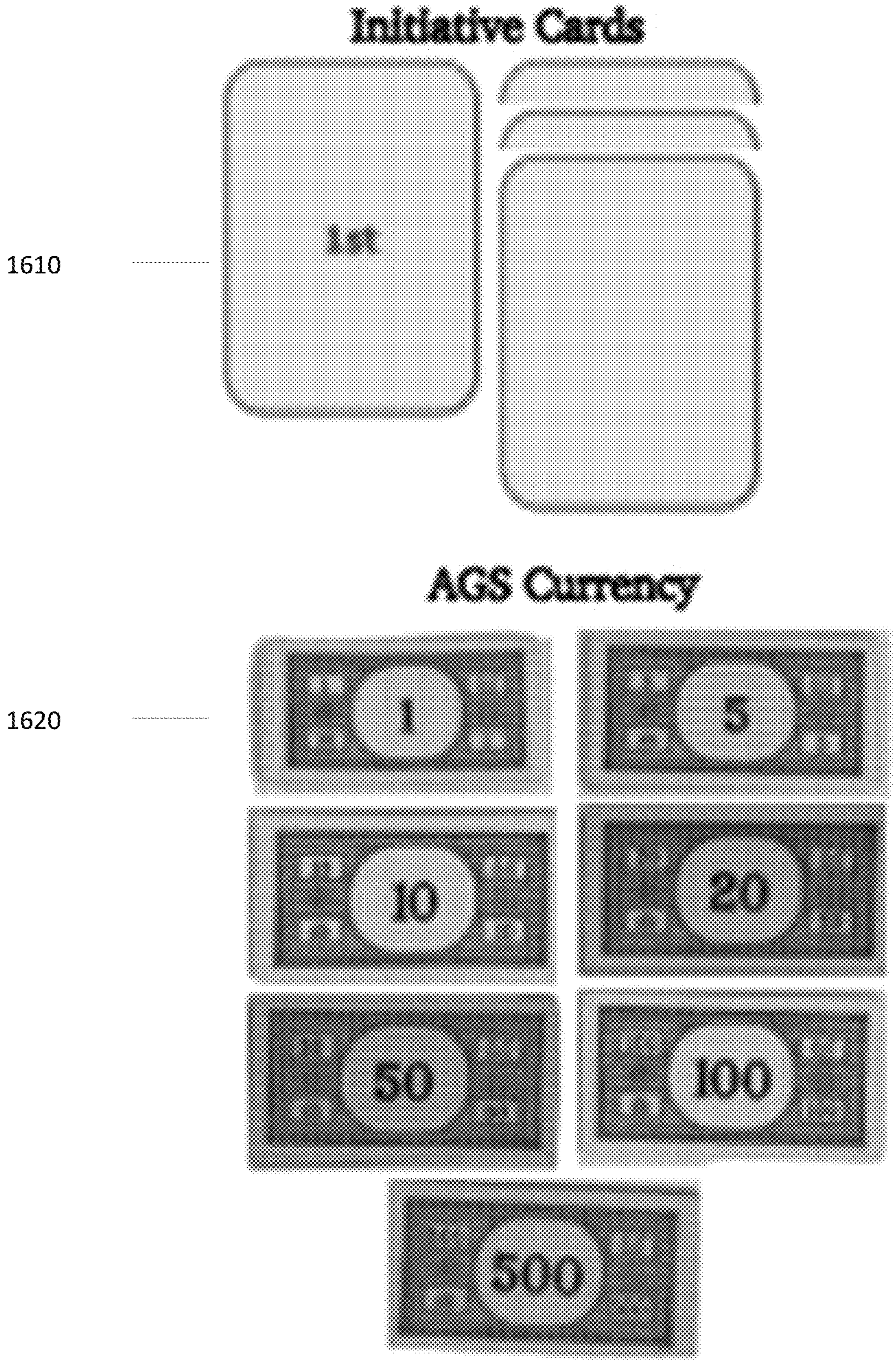
FIG. 16 illustrates initiative cards and AGS currency.
Figure 21:
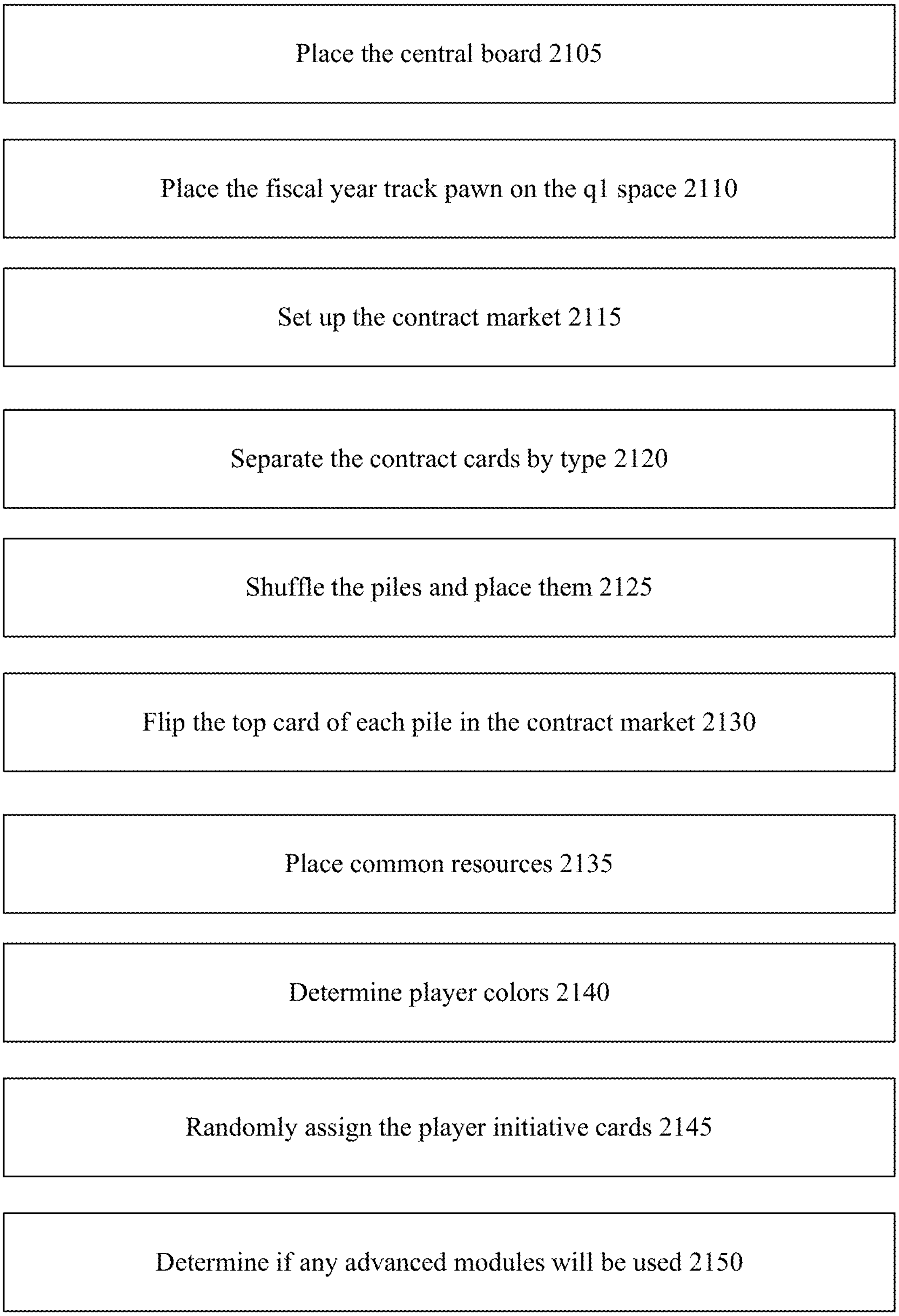
FIG. 21 illustrates a process for setting up the central component setup.

Initial setup may have two steps: the setup of the central components 2100, FIG. 21 (which can be done as a group) and the setup of player-specific components 1600, FIG. 16 (each player can handle for themselves.) Generally, the central board is placed on a playing surface such as a table. Item are placed near the players or near the central board. Near in this context means within about an arm's reach away (e.g., generally less than about three feet away). For example, when one places a token near a player, it means that player can reach the tokens from their current position. The token may be positioned on the playing surface as well.

The following steps may be followed in an exemplary setup.

1. Place the central board on table (playing surface) where all players can reach it. 2105
2. Place the fiscal year track pawn on the Q1 space of the fiscal year track on the central board. 2110
3. Set up the contract market. 2115
4. Separate the contract cards by type (the contract cards may have a specific symbol type on the back). 2120
5. Shuffle the piles and place them in their corresponding places on the central board face down. 2125
6. Flip the top card of each pile in the contract market. This represents the best contract of that type available to the players. 2130
7. Place common resources (capability tokens, resource tracker cubes, etc.) in an easy to access location. 2135
8. Determine player colors. These colors serve to enable easy tracking of player specific resources. 2140
9. Randomly assign the player initiative cards. The player who is dealt the First Player Card retains their card. The remaining initiative cards may be returned to a storage box as they might not be used for the rest of the game. 2145
10. Determine if any advanced modules will be used. Set up as described in the advanced module section. 2150

Complete Player Specific Setup 2200

Figure 22:
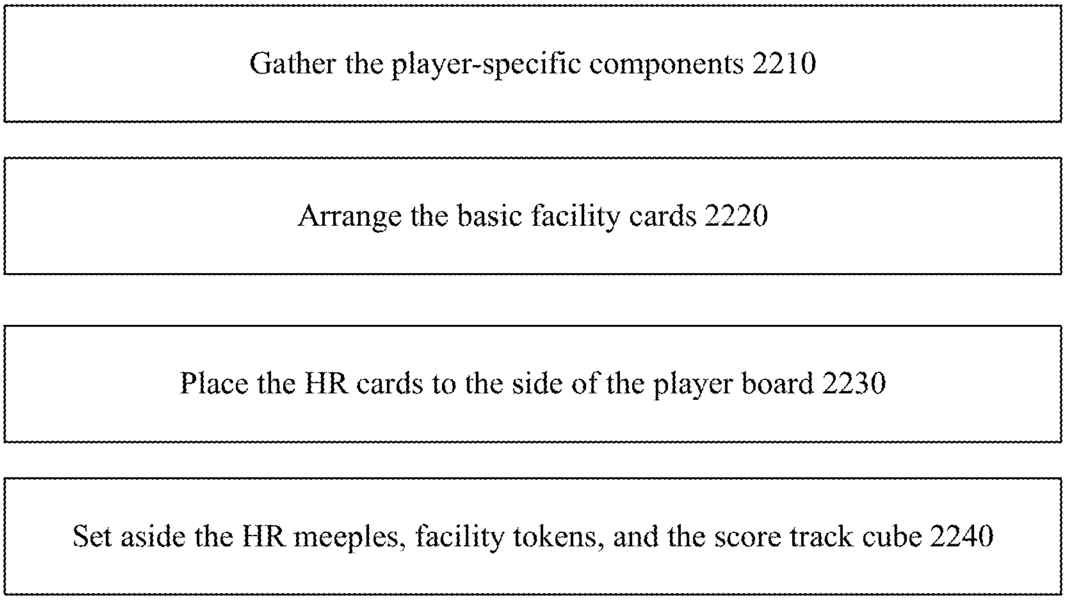
FIG. 22 illustrates a process for player specific setup.
Figure 23:
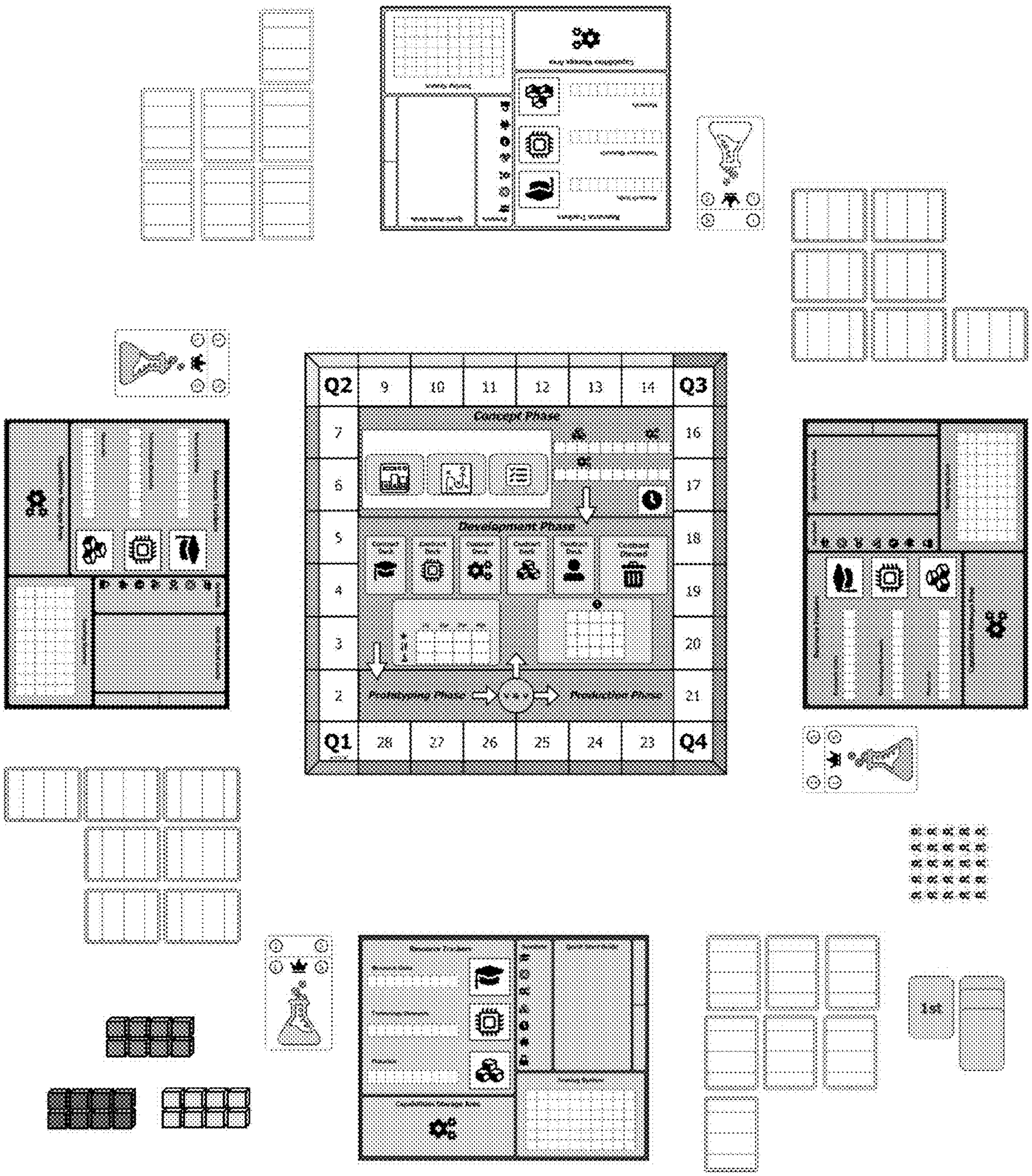
FIG. 23 illustrates a 4-player setup of the AGS game.

FIG. 22 shows a method for player specific setup 2200. The following steps may be followed in an exemplary setup.

1. Gather the player-specific components such as player board, HR cards, basic facility cards, 10 HR Meeples, 10 facility tokens, & score track cube. 2210
2. Arrange the basic facility cards in an easy to access grid near the player board. 2220
3. Place the HR cards to alongside of the player board. These will be set up in the concept phase. 2230
4. Set aside the HR Meeples, facility tokens, and the score track cube. 2240

Figure 18A:
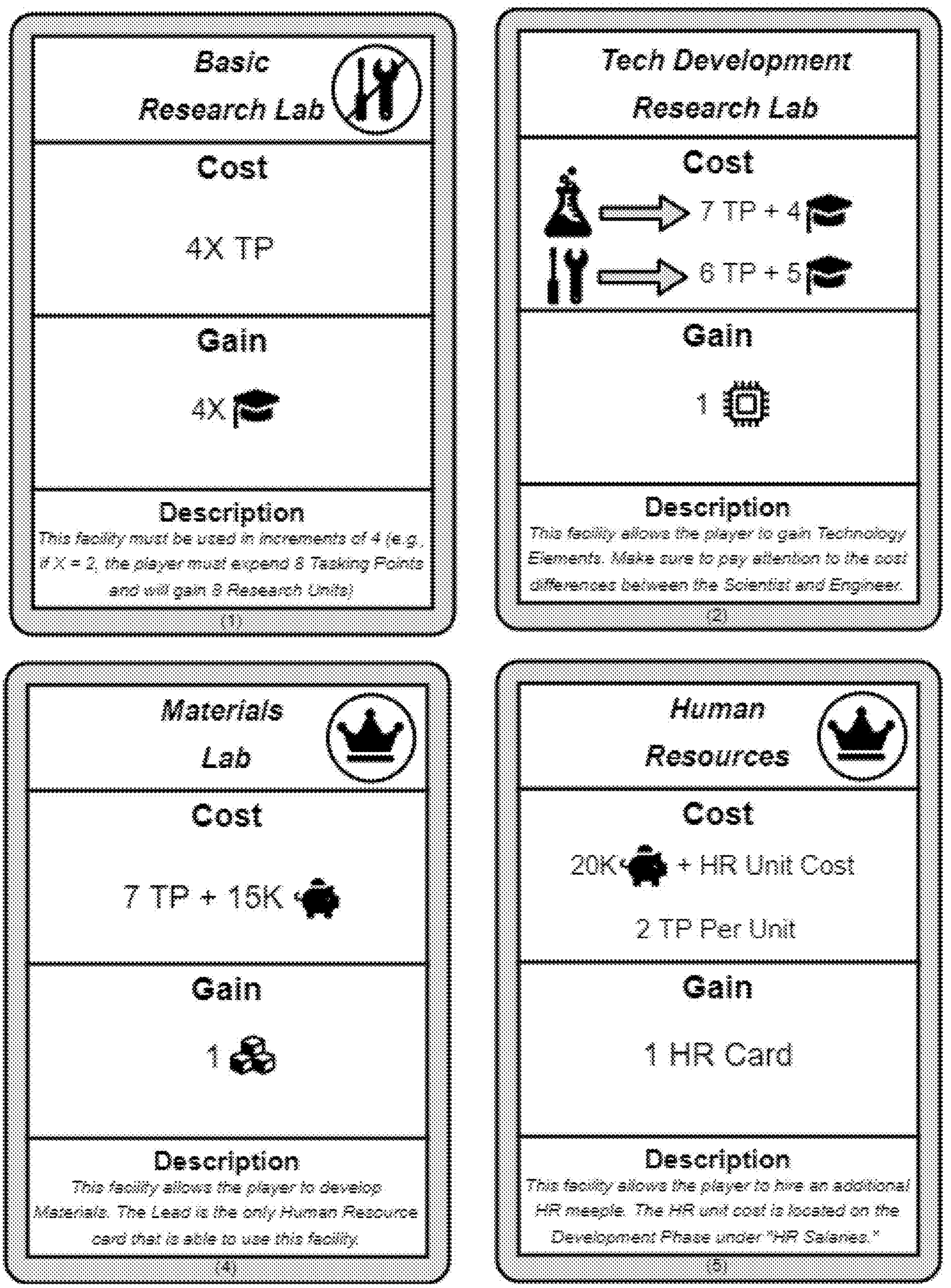
FIGS. 18A-18B illustrate 7 Facility Cards . . . the backside of the cards is shown as the eighth card.
Figure 18B:
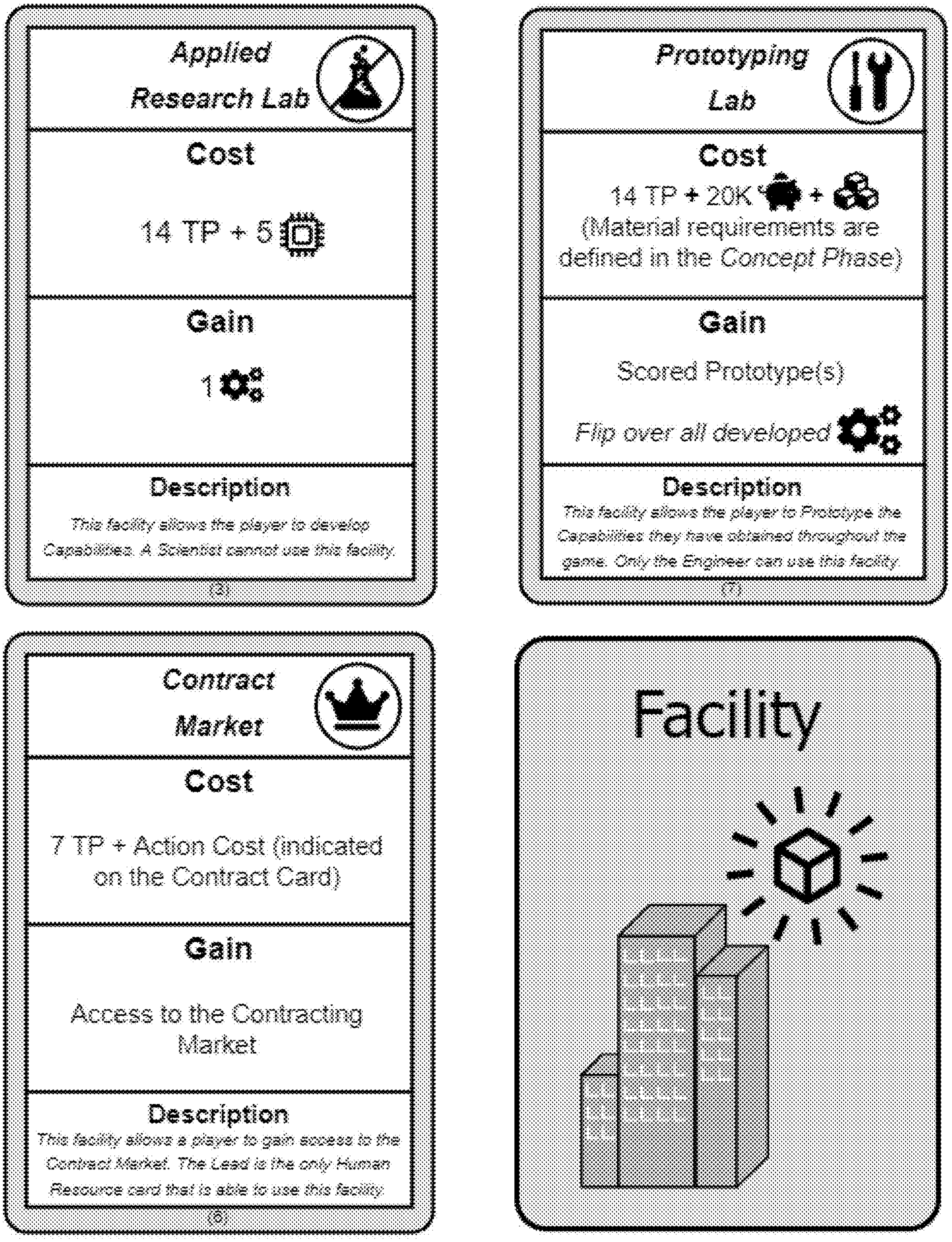

FIG. 18 shows an exemplary setup for 4 people.

Gameplay

Gameplay may be conducted through four phases: concept phase, development phase, prototyping phase, and production phase. Each of these may correspond to a specific step in the acquisitions process.

Phase 1: Concept 2400

Figure 24:
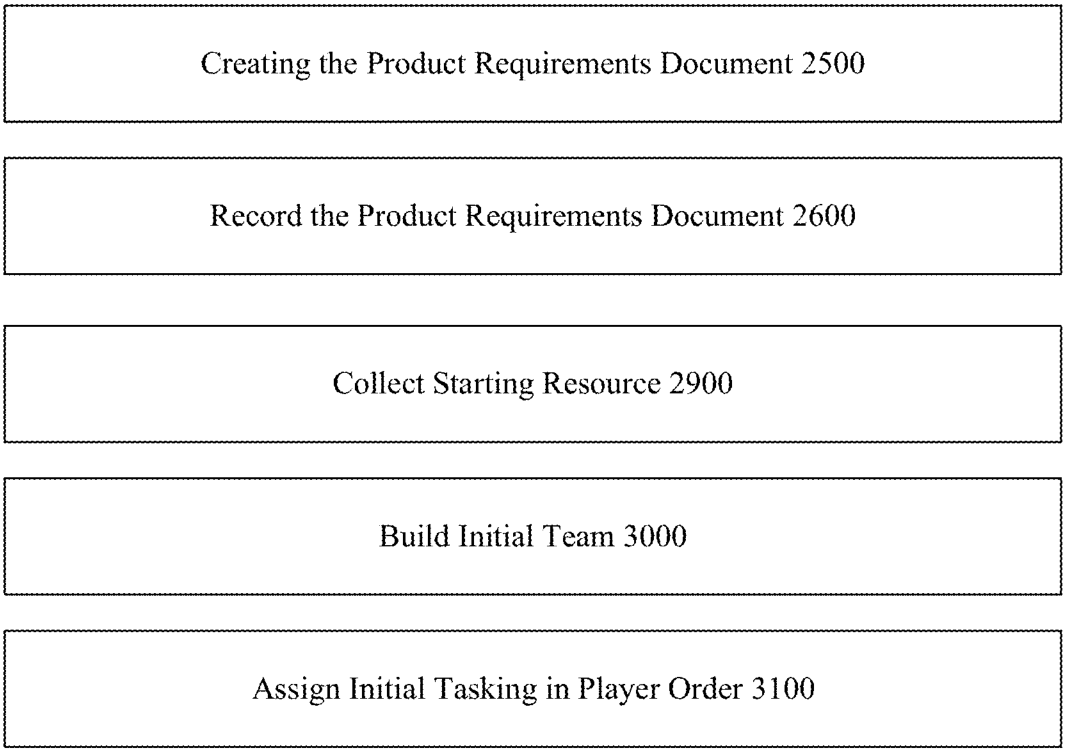
FIG. 24 illustrates a process of the concept phase.

FIG. 24 shows the concept phase. It represents the first part of acquisition in which a needed product is defined, and pre-project planning is completed. The concept phase may comprise five steps:

1. Creating the product requirements document 2500,
2. Recording the product requirement document 2600 into the concept phase dashboard,
3. Collecting any starting resources 2900,
4. Building the initial teams 3000,
5. Assigning initial tasking in player order 3100.

Step 1: Create the Product Requirements Document. 2500

Figure 25:
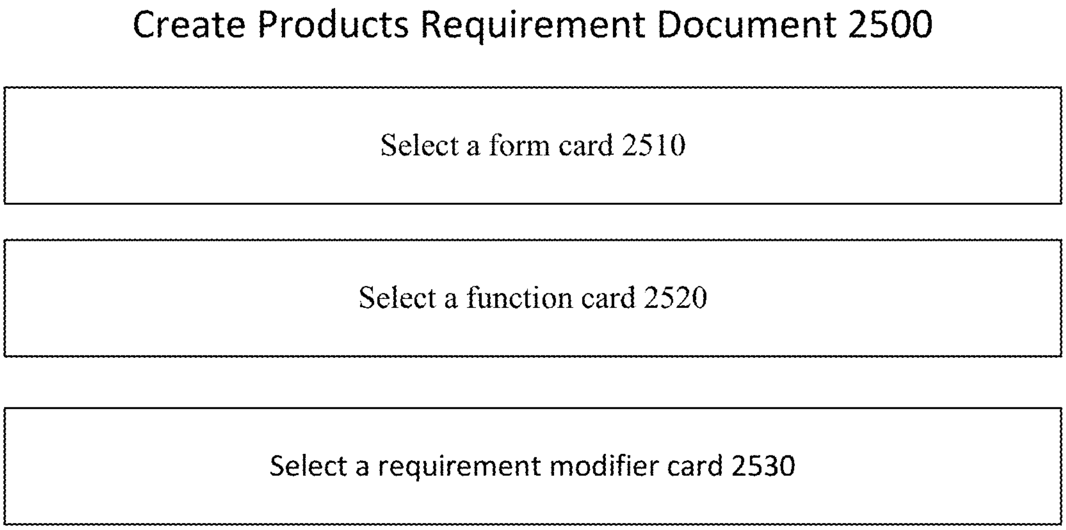
FIG. 25 illustrates a process to create a products requirements document.

In FIG. 25, example steps of creating a product requirements document are shown. The product requirements document represents the mission requirements that all players are attempting to fulfill. The method of creating the products requirements document may include:

1. Selecting a form card 2510,
2. Selecting a function card 2520, and
3. Selecting a requirements modifier card 2530.

Function cards represent six potential warfighting functions: maneuver, fires, intelligence & information, sustainment, command & control, and force protection.

Form cards represent ten potential realms of capabilities in which the product may fall under: aircraft systems, generic systems, missile systems, seas systems, space systems, ground vehicle systems, autonomous systems, information technology systems, unmanned systems, and cyber systems. The combination of these two cards may provide the basic requirements of the product.

Requirements modifier cards adjust at least one of the RU, TE, Capabilities, Rounds, Materials Requirements, Budget, etc. provided and/or required for researching and/or building the product. The product requirements document may feature a large technology gap. To reduce this gap, players may add a requirements modifier card. This may also provide some additional context in the form of round & budget modifiers.

Step 2: Record the Product Requirements Document 2600

After the product requirements document are defined, the requirements may be recorded on the central board in the concept phase section.

FIG. 26 shows how to the requirement document may be tracked with a method.

1. Capability requirements: sum up the values across all cards in the product requirements document and mark this value on the capabilities track on the central board using one of the green central board tracking cubes. 2610
2. Material requirements: sum up the values across all cards in the product requirements document and mark this value on the material track on the central board using one of the green central board tracking cubes. 2620
3. Round limit:
   a. Sum up the values across all cards in the product requirements document and mark this value on the central board using the appropriate round tokens. 2630
   b. Place a green Central Board Tracking Cube on the Fiscal Year Tracker in the Development Phase of the Central Board. 2640

Figure 27:
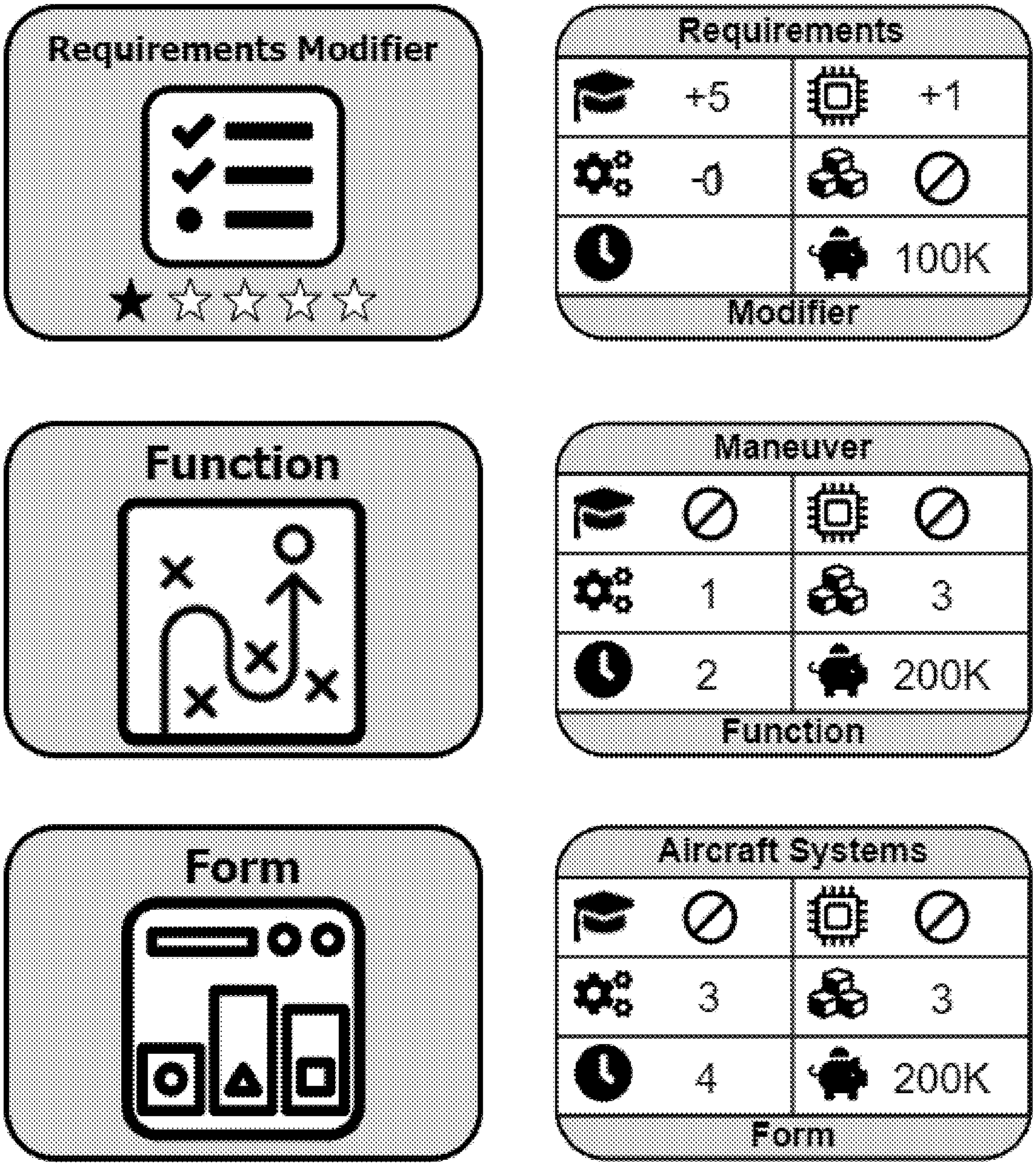
FIG. 27 illustrates an example of the cards needed to generate a product requirements document.
Figure 28:
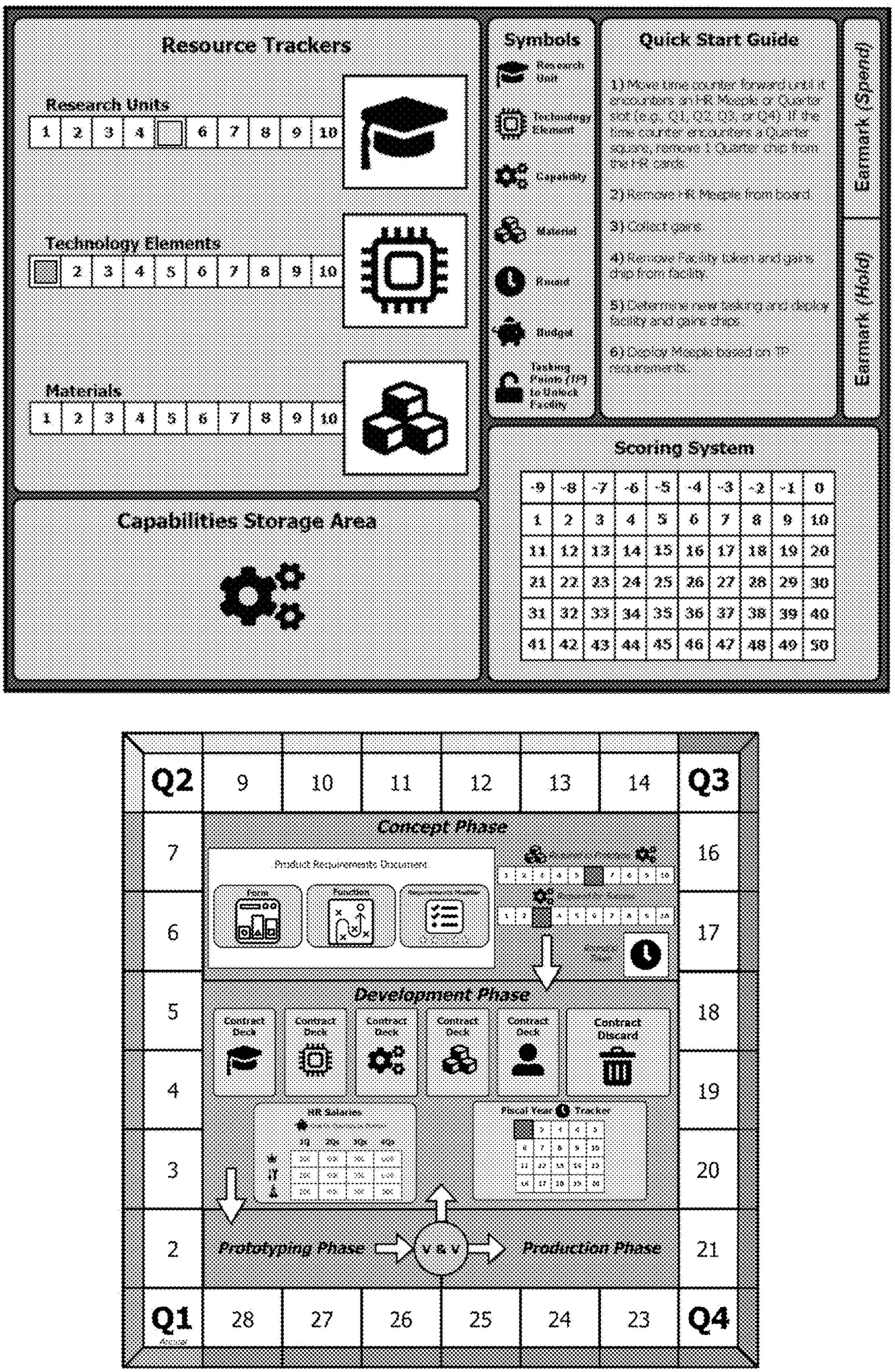
FIG. 28 illustrates a player board and central board setup according to the products requirements document.

FIG. 27 shows an example section product requirement documents. Based on these example cards, the central board would be setup as shown in FIG. 28.

Step 3: Collect Starting Resource(s) 2900

Figure 29:
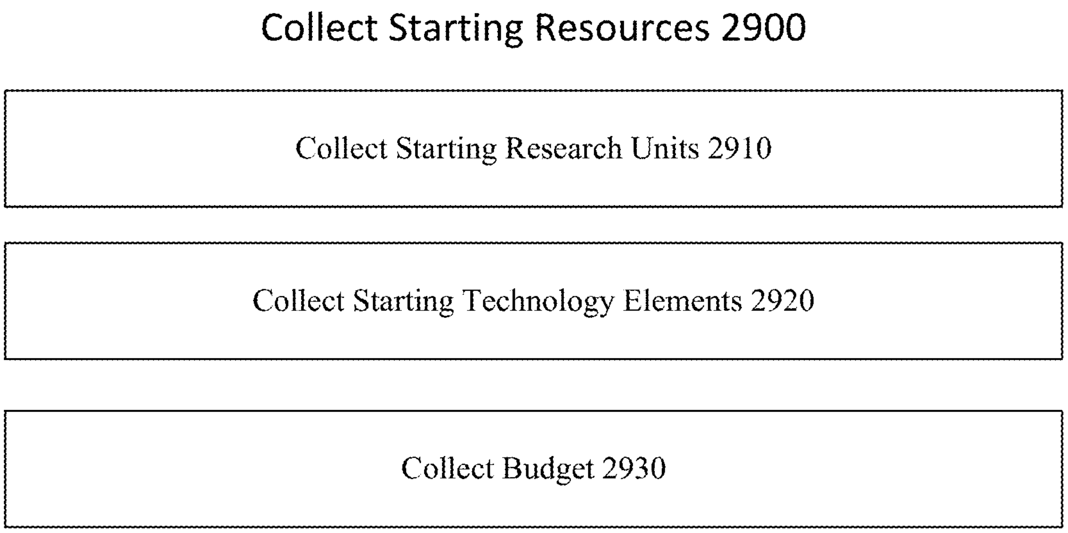
FIG. 29 illustrates a process to collect starting resources.

FIG. 29, players may now collect starting resource(s) as indicated in the product requirements document according to the following exemplary method.

1. Starting Research Units 2910. Note any starting RU values on the requirements modifier card (as applicable). This may be marked on the research unit track on the player board using the yellow RU cubes.
2. Starting Technology Elements 2920. Note any starting TE values on the requirements modifier card (as applicable). This may be marked on the technology elements track on the player board using the orange TE cubes.
3. Collect Budget 2930. Sum up the values across all cards in the Product Requirements Document and note this value for all players. Players may claim their initial budget for the first fiscal year.

Step 4: Build Initial Team 3000

Figure 30:
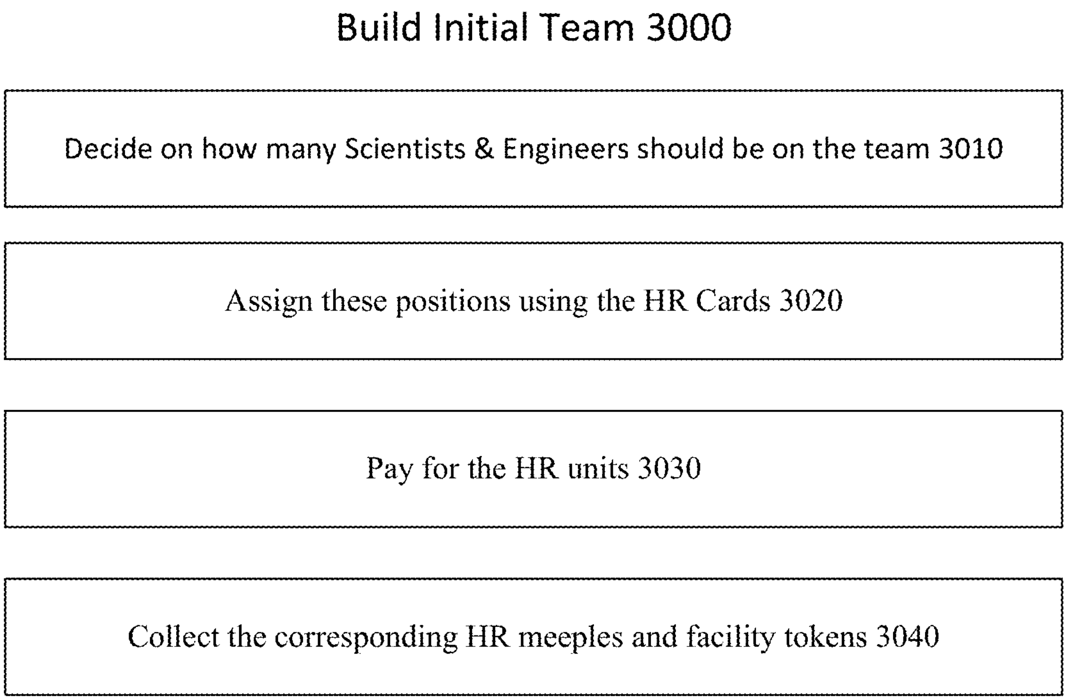
FIG. 30 illustrates a process of building an initial team.

FIG. 30, in player order, players may decide their initial team for the first fiscal year. This may be done in the following steps:

1. Decide on how many Scientists & Engineers should be on the team. 3010
2. Assign these positions using the HR Cards. 3020
3. Pay for the HR Units by Quarter and Unit Price (listed in the HR Salaries Table in the Development Phase section of the Central Board). For each Quarter paid, place a green counter.
4. In FIG. 43, the example on the right shows the red player has selected three units to form their team: 2 Scientists and 1 Engineer. They have paid for their 2 Scientists for 4 quarters. The total cost for the team can be broken down as shown on the chart.
5. Players may then collect the corresponding HR Meeples and Facility Tokens. 3040 Now that the players have built their initial team, they must task their HR Units.

Step 5: Assign Initial Tasking in Player Order 3100

FIG. 31, in player order, players may assign their HR Units tasking. This is done in the following steps for each HR Unit:

1. Determine which facility action to assign the HR Unit to and the required tasking points (TP) to accomplish the task. 3110
2. Deploy the facility token to the facility card. If an “X” value multiplier is required, mark the “X” value using the yellow resource multiplier tokens (Also referred to as “Gains Chips”. 3120
3. Deploy the HR Meeple the TP cost forward along the fiscal year track. 3130 In the case that there are existing HR Meeple on the space the currently tasked unit is moving, simply add the HR Meeple to the end of the line.

Once Player 1 has deployed all of their units, the next player will task and deploy their team and so on until all players have tasked their teams. At this point the development phase gameplay begins.

HR Units are represented through multiple components—HR cards, HR Meeple, and facility tokens. The HR card represents the unit’s expertise, The HR Meeple tracks the time an HR Unit needs to accomplish their tasking, while the facility token tracks the tasking the HR Unit has been assigned.

Phase 2: Development Phase 3200

The development phase 3200 spans a number of rounds which may be equal to the time limit defined by the product requirements document. Each of these rounds may comprise four quarters. Players may take turns addressing team tasking throughout the rounds until they meet the requirements to prototype (see Phase 3 for details). Gameplay comprises turns, rounds, and actions.

Figure 32:
FIG. 32 illustrates the development phase.
Figure 34:
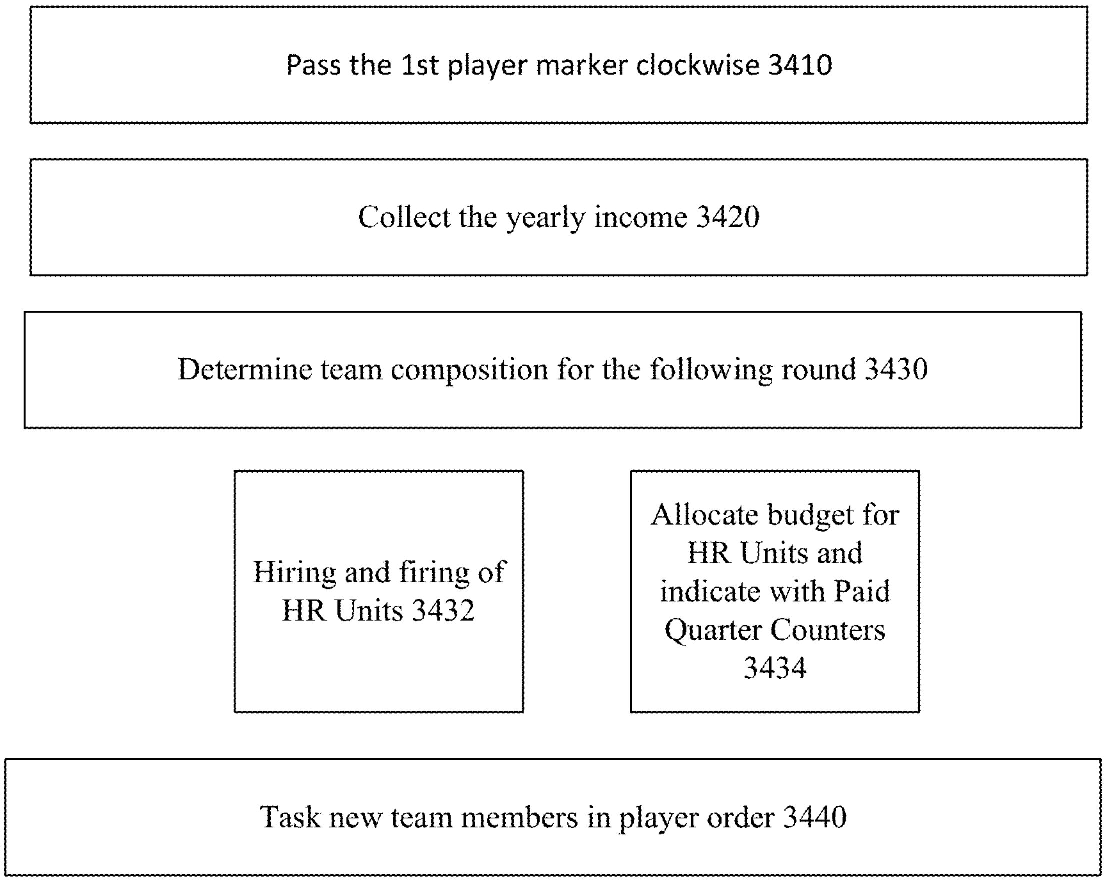
FIG. 34 illustrates the round rules.
Figure 35:
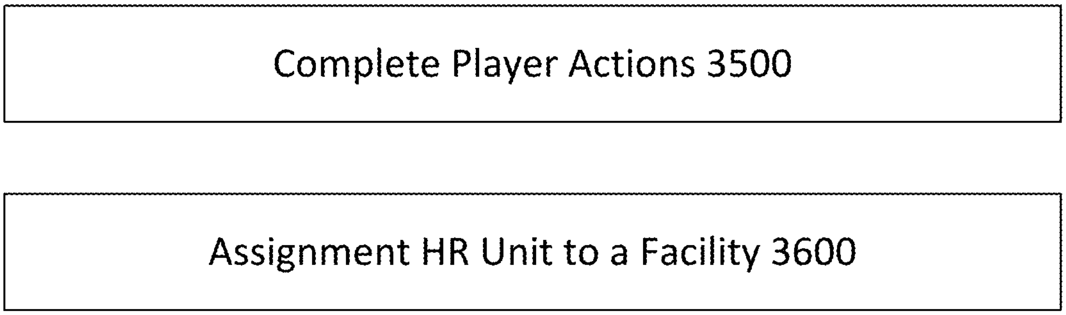
FIG. 35 illustrates a process of complete player actions.
Figure 36:
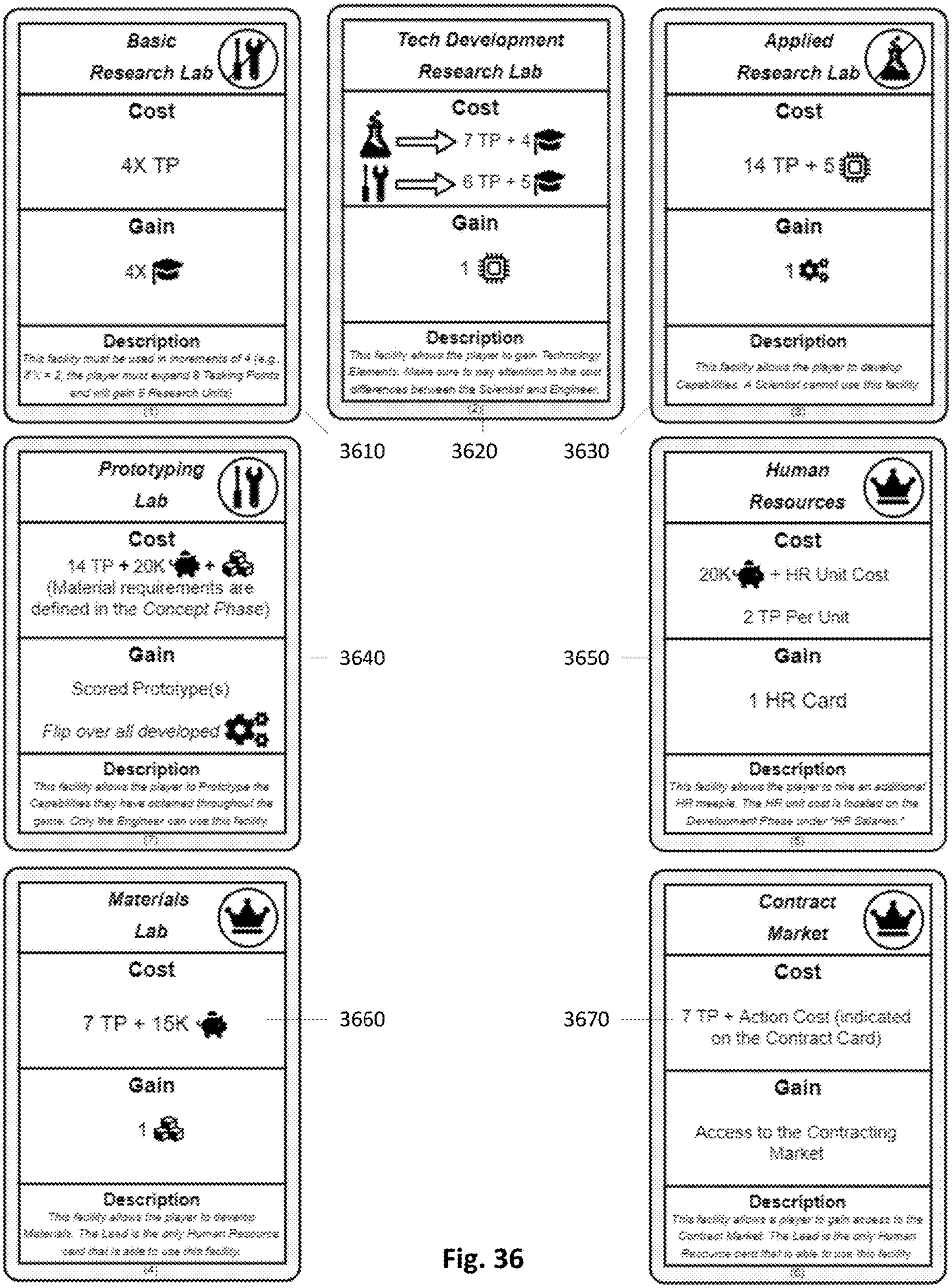
FIG. 36 illustrates the contact market cards.
Figure 38:
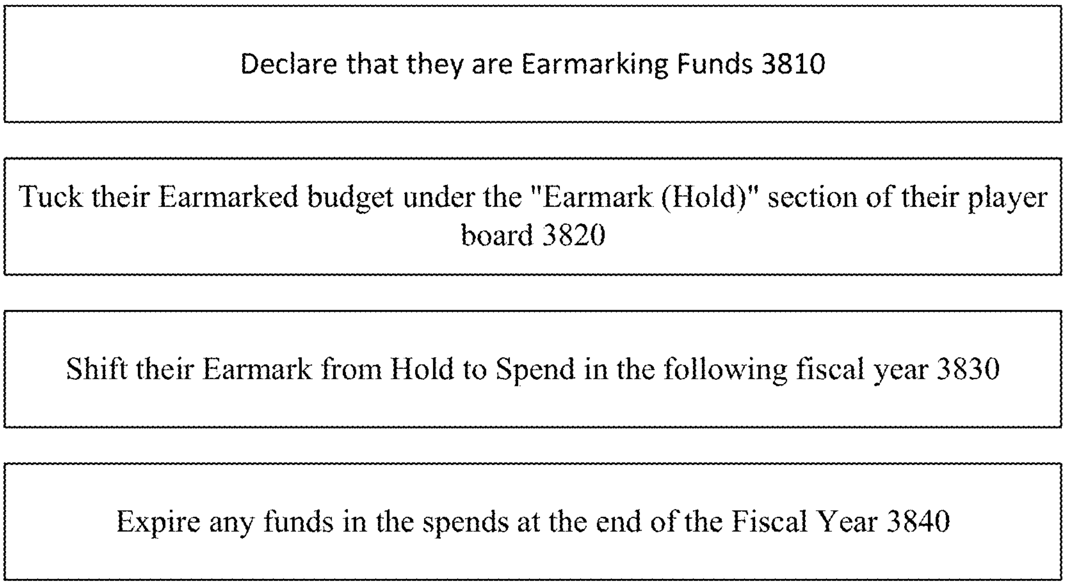
FIG. 38 illustrates a process of earmarking funds.

There may be six chief steps in the development phase method 3200, FIG. 32:

1. Follow turn rules 3300
2. Follow round rules 3400
3. Complete player actions 3500
4. Assign HR Units to a facility 3600
5. Earmark funds 3800
6. Fire HR Unit 3900

Follow Turn Rules 3300

Turns begin with the fiscal year track pawn moving forward along the fiscal year track. The fiscal year tracking pawn 1340 begins the round at the Q1 position and will continue to move forward along the track until it encounters either a Quarter Marker space (Q1, Q2, Q3, or Q4) or an HR Meeple 1930 in the same space as the fiscal year track pawn 1340.

If a quarter marker space is encountered gameplay pauses to address quarter tasks.

1. Pay day for team members: all players remove 1 Quarters Paid Counter from each HR Card 3310. This represents the teams being paid for the work they have accomplished in the past quarter. Team pay may be handled by HR who received the funds when the team was initially arranged. Players do not need to pay from their budget unless they wish to retain a team member who has run out of funding.
2. If any team members have run out of Quarters Paid Counters, the player may decide if they will allocate more funds to that team member or remove the HR Unit from their team 3320.
   a. Allocating more funds 3322: The player may declare how many more Quarters they will fund the team member, pay the cost according to the HR Salaries, and may add that many Quarters Paid Counters to the HR Card.
   b. Removing HR Unit from the team 3324: The player may declare the team member is leaving the team, remove the HR Meeple from the fiscal year track without gaining any resources, remove the facility token from assigned facility, and return the corresponding HR card to their HR card stack.

3. Follow rules for encountering an HR Meeple 3330. If an HR Meeple is encountered, the player who oversees that HR Meeple's tasking will do the following:
   a. Remove the HR Meeple from the Fiscal Year Track. 3331
   b. Identify the facility that the corresponding Facility Token is assigned to and collect the gain indicated on the card and/or by the Resource Multiplier Counters. 3332
   c. Remove the Facility Token and the corresponding Resource Multiplier Counters from the Facility Card. 3333
   d. Determine the new tasking for the HR Unit and deploy the Facility Token and (as needed) Resource Multiplier Counters. 3334
   e. Deploy the HR Meeple based upon the TP requirements of the assigned tasking. 3335
   f. Continue moving the Fiscal Year Track Pawn along the Fiscal Year Track. 3336

The above process may continue until the Fiscal Year Track Pawn reaches the Q1 annual square, indicating the conclusion of one round and the beginning of another. Note: In some cases, there are multiple HR Meeple occupying a single space. In which case, address each HR Unit one at a time starting with the HR Meeple at the back of the line.

Follow Round Rules 3400

Each round is defined as a loop around the Fiscal Year Track and represents a Fiscal Year. Each round consists of multiple turns. The players begin a new round when the Fiscal Year Track Pawn crosses the Q1 annual square. Players will complete the following actions in addition to the Quarterly Tasks:

1. Pass the 1st player marker clockwise 3410.
2. Collect the yearly income 3420.
3. Determine team composition for the following round 3430.
   a. Hiring and firing of HR Units 3432. This counts as a "free" action costing no TP.
   b. Allocate budget for HR Units and indicate with Paid Quarter Counters. 3434
4. Task new team members in player order. 3440

Note: If a player switches out an HR Unit (ex. Changing Skills from scientist to engineer), the player loses may lose progress the HR Unit made on their current task and must be retasked as if they were a new HR Unit. This includes if there is a change to the Lead.

Complete Player Actions 3500

Players may perform a primary action of assigning HR Units to a facility to influence their project's progress 3510. Additionally, players have access to two free actions: Earmarking Funds and Firing an HR Unit. This section will discuss these actions in depth.

Assignment HR Unit to a Facility: 3600

The base game has 7 facilities players may interact with. The facility anatomy is described in the figure to the right. Facility requirements are indicated with an open circle and require that HR Unit type in order to use that facility. Facility restrictions are indicated by a strikethrough circle. HR Unit types indicated in the facility restriction may not be used at the facility indicated.

Facility cost and gain are indicated in their specific areas of the card. Note that an "X" indicates that the facility may utilize the multiplier mechanic.

The basic research facility 3610 restricts access to engineers. For the cost of TP a player may gain RU. Note that this facility utilizes the multiplier mechanic.

The developmental research lab 3620 has variable cost based on the type of HR Unit deployed. The cost requires the player to spend TP and RU in order to gain TE.

The applied research lab restricts 3630 the access of researchers. The player may pay TP and TE in order to gain capabilities.

The prototyping lab 3640 is the facility that allows players to enter the prototyping phase. This facility requires an engineer for access. Cost to prototype is TP, budget, and a materials cost as indicated in the product requirements document.

The human resources facility 3650 allows the player to gain an HR Unit. The Budget and TP costs are in addition to the HR Salaries which makes hiring HR Units mid-round more expensive than planning ahead at the beginning of the round.

The following facilities are lead specific facilities—only the team lead may be assigned to these facilities.

The materials lab 3660 allows players to generate materials for the cost of TP and budget.

The contracting market facility 3670 allows players to access the contract market.

Contract Facility Card Process 3700

The player will task their HR Unit as usual with a few additional steps:

1. Once the player has deployed their HR Meeple the TP cost forward the player may select a contract card of their choice 3710.
2. The player may pay the cost of the contract card 3720 (indicated on the contract card)
3. The player may then select a matching pair of contract meeple and contract facility token 3730.
4. Deploy the contract meeple in the fiscal year track 3740 the delivery time amount of TP ahead of the lead HR Meeple.
5. Deploy the contract facility token to the contract card 3750 to indicate which contract the contract meeple is tied to.
6. Once the Fiscal Year Track Pawn reaches the Contract Meeple the player may claim the gain listed on the contract 3760 and will remove the Contract Meeple and Contract Facility Token from the play area 3770. The player may also discard the contract to the contract discard pile. 3780

Special Rules: The HR Contracts (contracts allowing players to gain a scientist or an engineer at a discount cost), may be limited one per player at any time. The contract Meeple may act as a normal HR Meeple for the contract time and may be deployed to the end of the HR Meeple line, behind the lead HR Meeple. The contract facility token is deployed to the fiscal year track ahead of the contract meeple equal to the TP indicated under the contract completion time.

Earmark Funds: 3800

Prior to the team lead crossing the Q3 Marker, a player may choose to Earmark Funds to be spent in the following Fiscal Year (i.e. round). To do so, the player must:

1. Declare that they are Earmarking Funds. 3810
2. They will then tuck or place their Earmarked budget under the "Earmark (Hold)" section of their player board. These funds will not be available for the remainder of the Fiscal Year. 3820
3. Upon the beginning of the next Fiscal Year, during the Annual Events step of a new round, players will shift their Earmark from Hold to Spend. 3830

4. Any funds remaining in the Spend category at the end of Fiscal Year will expire and be returned to the "bank" 3840.

Fire HR Unit. 3900

Players may at any time choose to fire any HR Unit. This process may be identical to the removing an HR Unit from the team 3324, FIG. 33.

The player may declare the team member is leaving the team, remove the HR Meeple from the fiscal year track without gaining any resources, remove the facility token from assigned facility, and return the corresponding HR card to their HR card stack 3324, FIG. 39.

Players may not receive funds back for the current Quarter but can claim funds for excess Quarters minus one, which will cover the team member until they find a new project.

Phase 3: Prototyping 4000

Prototyping Requirements

Requirements to prototype are defined by the Capability Requirements, Material Cost to Prototype each Capability, an Engineer, and the action cost to prototype as defined by the Prototyping Lab facility. Once a player has gathered at LEAST the required number of capabilities, the total material cost to prototype the capabilities, a free Engineer, and the financial cost to prototype (determined by the Prototyping Lab facility card), the player may assign their engineer to the Prototype Lab.

Prototyping Process 4005

Player may complete the following steps to Prototype their capabilities.

1. Assign an engineer to the Prototype Lab, spending the required budget and TP 4010.
2. For each capability to be prototyped, the player must spend the required number of Materials from their Materials Tracker 4020.
3. Player may flip each Capability Token over that has been paid for 4030.
4. Successful capabilities will have a Quality Score (number 1 to 5) which indicates the success rate of the capability 4040. The higher the quality score, the better the capability will perform. A failed capability is indicated with an "X". Failed capabilities should be discarded.

Resolving Prototyping Phase

Once a player has prototyped their capabilities, they may resolve the Prototyping Phase. In order to move to the production phase, the player must have exactly the number of capabilities indicated in the product requirements document. If players have fewer than the required number of capabilities, the player may return to the development phase. If players have excess capabilities, they must discard down to the required number of capabilities and may proceed to the production phase. Players may choose to decline to proceed to production phase and instead return to the development phase.

Phase 4: Production—Scoring Rules 4100

Players will score their quality score directly to their Scoring System Track on their Player Board 4110. The quality score is equal to values shown on the capability tokens. Having a sufficient number of capability tokens represents the success of their developed product.

Endgame Resolution 4200

The game ends when either all players have finished production 4210, or when the round limit has been reached 4220. If any players have failed to finish production, they may score any capabilities (up to the capabilities requirement) that have already been prototyped 4230. They will then be deducted 5 points for failing to deliver a polished product.

The winner is the player who produced the product that was the most successful.

Advanced Modules

Advanced Facilities

An extension to the base game consists of advanced facilities with which players may interact. The Advanced Facility anatomy is identical to that of the basic facility, and both advanced and basic facilities are used in the same way. An advanced facility simply presents more nuanced facility capabilities.

Figure 44:
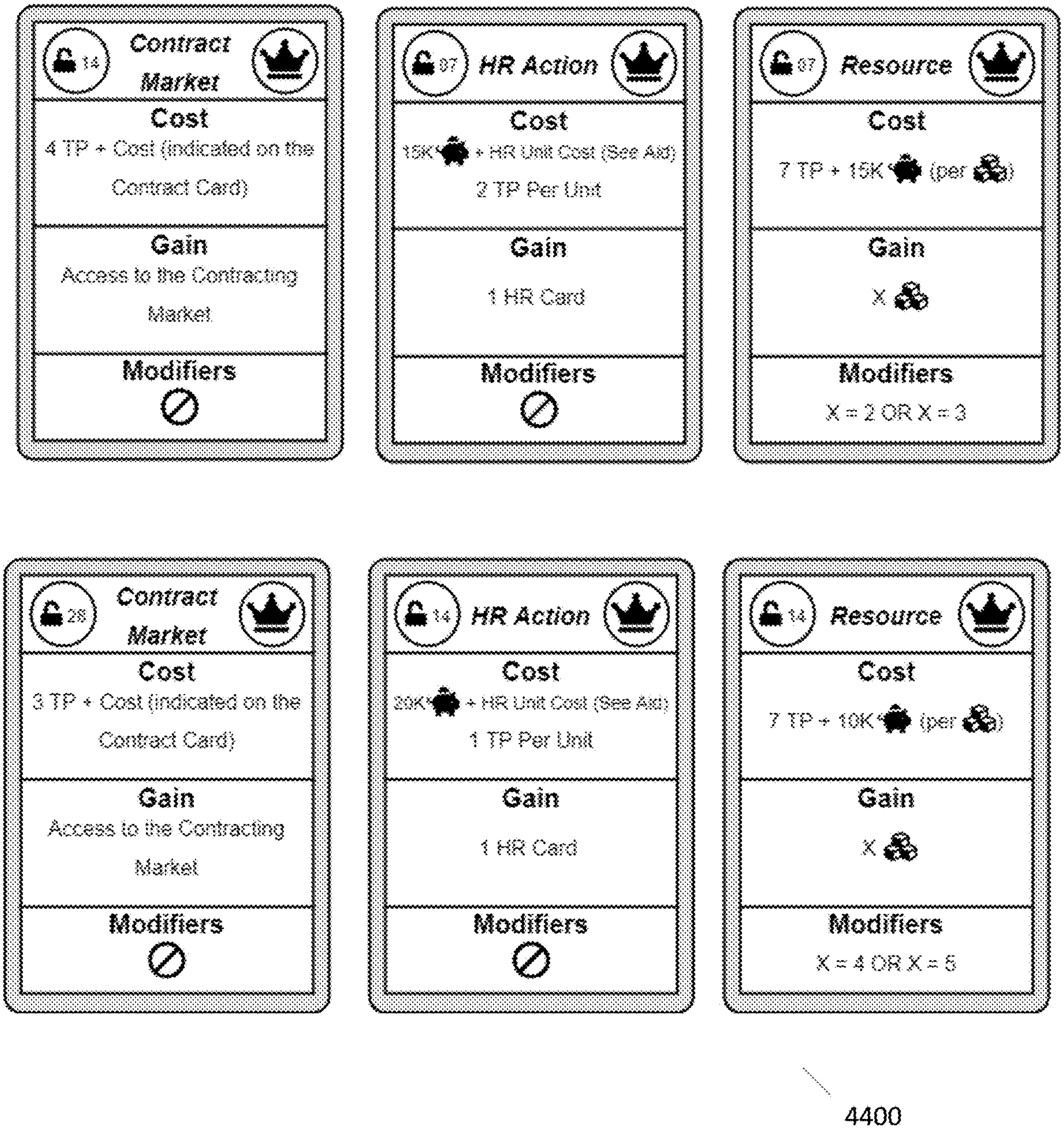
FIG. 44 illustrates an advanced facilities card.

To begin using advanced facilities, the advanced facilities basic facility card must first be added to the basic facility card inventory. FIG. 44, 4400. The advanced facility deck must also be added to the game board for each player. In order to enable access to the advanced facilities, a player must first unlock this access via the advanced facilities basic facility card which can only be un-locked by a lead HR Meeple. The advanced facilities basic facility card has cost that is dependent on the advanced facility that the player wants to unlock FIG. 45, 4500. This cost is specified in the upper left corner of the advanced facility card. Once unlocked, the advanced facility cards function just like the basic facility cards.

Figure 45:
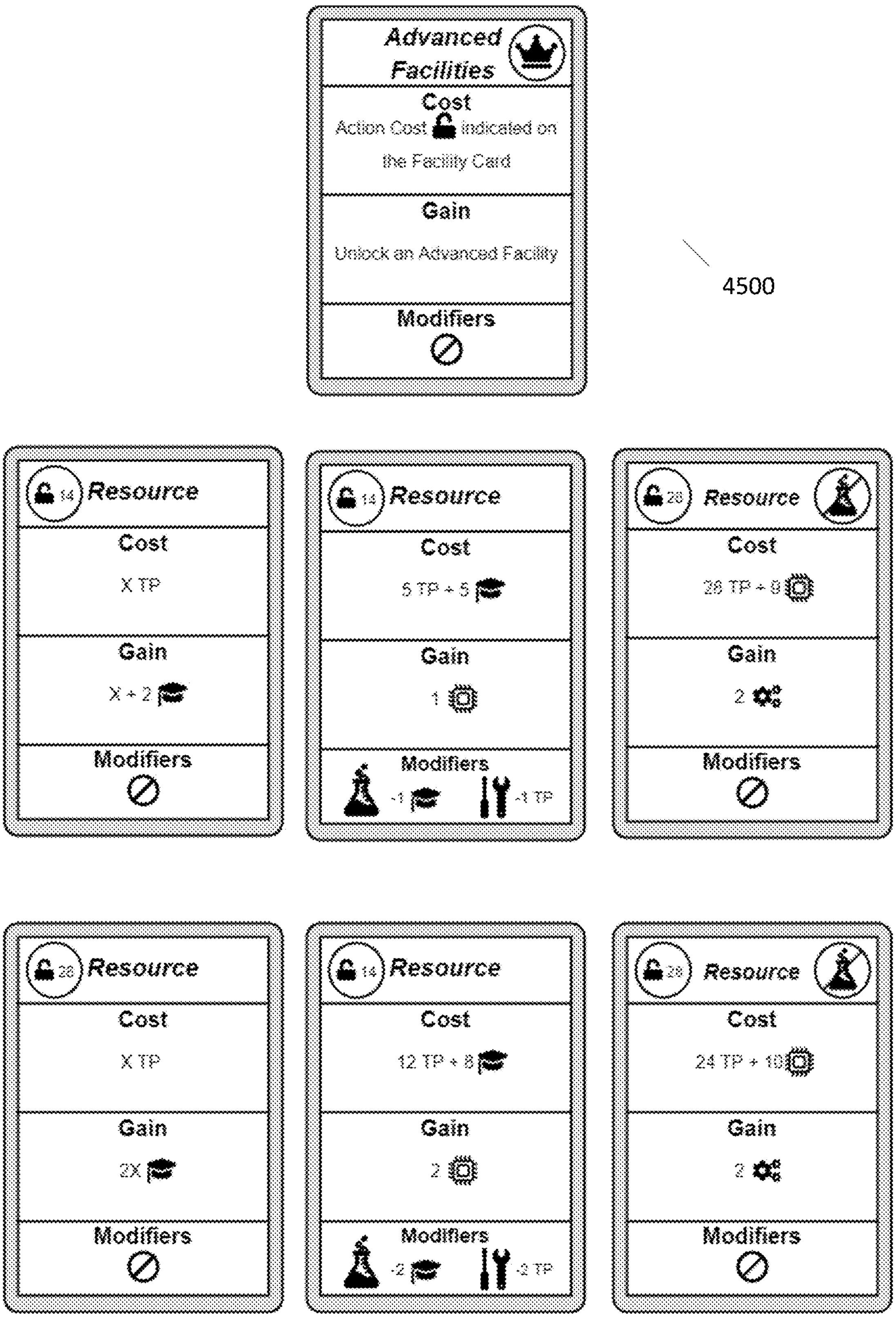
FIG. 45 illustrates more advanced facilities cards.

FIGS. 44-45 shows example of the Advanced Facilities Cards.

National Context

National context is instantiated by calibrating facility abilities and costs to be in line with a target nation's trends. Here are two examples:

1. A nation's education level will impact basic research ability due to limitations in human resources. Since Germany's education ranking is higher than Russia's, then the virtualization of Germany will have a Basic Research Lab facility that produces more research points that that of the virtualization of Russia.
2. A country virtualization inspired by a resource rich nation means that the cost for materials would be relatively lower. Since China ranks higher than Australia for Natural Resource Availability, then the virtualization of China has a Materials Lab basic facility that generates materials at a lower cost than the virtualization of Australia.

National context implementation will result in the specification of basic facilities with advantages/disadvantages based on virtualized country context. When playing with national context instantiated, the advanced facility cards cannot be incorporated into gameplay.

Figure 46:
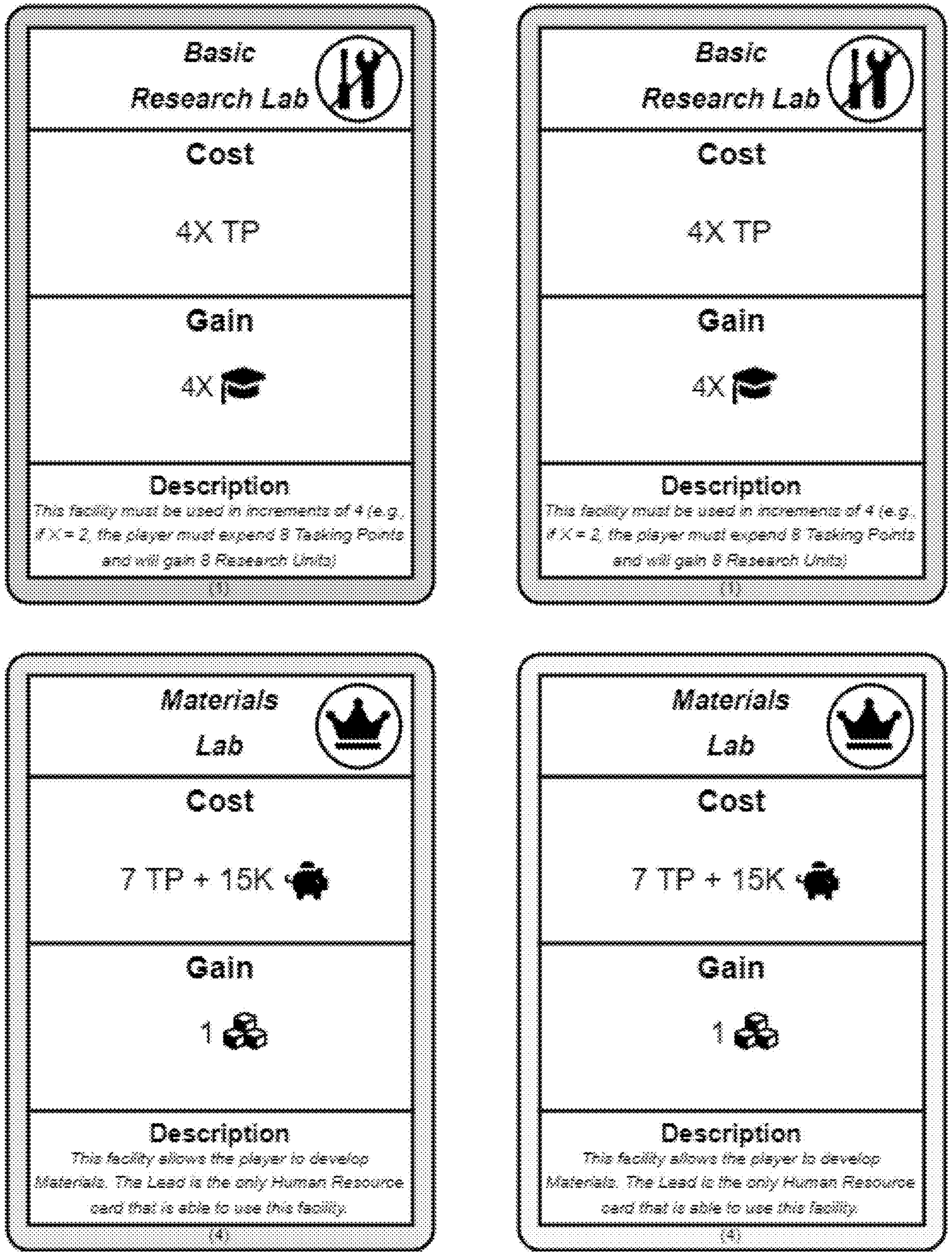
FIG. 46 illustrates country specific variations of base facility cards.

FIG. 46 shows examples of country specific research lab and materials lab.

| Country | Education Ranking | Rank |
|---|---|---|
| Russia | 23$^{rd}$ | 5 |
| Germany | 3$^{rd}$ | 1 |
| China | 22$^{nd}$ | 4 |
| Canada | 4$^{th}$ | 2 |
| Australia | 8$^{th}$ | 3 |

| Country | Natural Resource Availability | Rank |
|---|---|---|
| Russia | 5th | 3 |
| Germany | Not listed | 5 |
| China | $1^{st}$ | 1 |
| Canada | $3^{rd}$ | 2 |
| Australia | $10^{th}$ | 4 |

Annual Events

Annual events add context modifiers to gameplay and are implemented as a card describing an alteration to gameplay that must occur for the current round or "year" being executed and must impact all players. To play with annual events, add the annual event deck to the game board. Upon crossing the annual square (i.e., Q1), the player with the "1st" card flips the top annual event card prior to any other annual tasks occurring (e.g., budget distribution). This event is active for the whole table.

Score Achievements & Penalties

As the acquisition game is underway, players may be able to accumulate achievement and penalty tokens along the way as specified by Scoring Achievements & Penalties (SA&P). SA&P are implemented as a set of cards that describe a rule for earning or punishing player actions. SA&P are earned/acquired as defined based on the achievement or punishment. For example, the first to complete their product gains the "First to Market" achievement which is worth +5 points. A punishment would work similarly but would detract points rather than add them. For example, if in the prototyping phase it is revealed that a player does not have enough capability points to move to production, a "Bad Reviews/Performance" penalty is earned resulting from pushing a product without all the functioning capabilities and results in a −5-point deduction In order to play with SA&P, the scoring achievement & penalty tokens must be added to the gameboard. Each token is claimed based on a player realizing the condition described in the text on the token. Players add score/score penalty on the token in the production phase of gameplay.

The claimed invention is:

1. A game simulating an acquisition process for developing a product that meets one or more requirements, comprising:

a computerized system implemented by non-transitory computer-readable code executable by a processor that is stored on a tangible media, wherein the computerized system uses 1) system dynamics modeling (SDM) to identify at least one of resources and actions involved in the acquisition process and 2) behavior modeling is used to identify decision points based on at least one of the identified resources and actions, wherein a decision point is a stage within the acquisition process where a specific action is performed based on at least one of a resource or an action; and digitally implemented virtual components including: a central board, function cards, and form cards, wherein the central board comprises a region configured to receive a form card that represents a product capability and a function card that represents a product functionality, wherein the form card and function card are associated with a product requirement, the satisfaction of which is influenced by one or more decision points.

2. The game of claim 1, wherein the virtual components further comprise requirement modifier cards.

3. The game of claim 1, wherein the virtual components further comprise capability tokens, round tokens, a fiscal year track pawn, and a central board tracking cube.

4. The game of claim 1, wherein the virtual components further comprise resource multiplier counters, quarters paid counters, technology element cubes, research unit cubes, material cubes, and currency.

5. The game of claim 1, wherein the virtual components include virtual central components that are shared amongst all players of the game and player-specific virtual components that are colored to correspond to a specific player of the game.

6. The game of claim 1, wherein the central board comprises a virtual outer track having virtual track markers.

7. The game of claim 6, wherein the virtual outer track includes one or more virtual rectangle regions, each virtual rectangle region corresponding to a virtual location a virtual HR meeple can move to.

8. The game of claim 1, comprising a virtual stack of form cards representing aircraft systems, generic systems, missile systems, seas systems, space systems, ground vehicle systems, autonomous systems, information technology systems, unmanned systems, and cyber systems.

9. The game of claim 1, wherein the region comprises a virtual concept phase region for receiving the form card, and the function card and a virtual component comprising a requirements modifier card.

10. The game of claim 9, wherein the form card, function card, and requirements modifier card compose a virtual product requirements document.

11. The game of claim 10, wherein the form card comprises 6 virtual symbols, each virtual symbol having a value.

12. The game of claim 11, wherein the 6 virtual symbols represent 1) a research unit, 2) a technology element, 3) a capability, 4) a material, 5) a round, and 6) a budget.

13. The game of claim 1, further comprising a plurality of virtual components comprising virtual capability tokens, each comprising a value.

14. The game of claim 13, wherein a winner of the game is the player who has developed the product with capabilities represented by the virtual capability tokens with a highest total value.

15. The game of claim 1, wherein the computer system is implemented as a digital video game playable on a gaming console or computer having a digital central board and player pieces.

16. The game of claim 1, wherein the virtual components further comprise a virtual contract meeple, and virtual contract facility tokens.

17. The game of claim 1, wherein the acquisition process includes a development phase that comprises tasking virtual human resources at virtual facilities to generate virtual capability points.

18. The game of claim 1, wherein virtual events and virtual uncertainties occur randomly during the game to simulate acquisition risks.

19. The game of claim 17, wherein virtual tasking points are used to determine eligibility to perform actions at certain virtual facilities.

20. The game of claim 1, wherein the acquisition process includes a prototyping phase that evaluates whether virtual capabilities and materials fulfill the product requirement.

21. The game of claim 1, further comprising a virtual endgame scoring system that is based on virtual capability quality, time used, and budget remaining.

22. The game of claim 1, wherein the computerized system is implemented on a gaming console or computer, enabling players to play the game.

23. The game of claim 1, wherein the computerized system is implemented online game is non-transitory computer readable code stored on tangible computer readable media configured to be executed by a microprocessor of gaming console or computer; the gaming console or computer configured to generate a digital version of the game.

* * * * *